US007899266B2

(12) United States Patent
Mitsunaga

(10) Patent No.: US 7,899,266 B2
(45) Date of Patent: Mar. 1, 2011

(54) IMAGE PROCESSING APPARATUS AND METHOD, RECORDING MEDIUM, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1037 days.

(21) Appl. No.: 11/500,386

(22) Filed: Aug. 8, 2006

(65) Prior Publication Data

US 2007/0053607 A1    Mar. 8, 2007

(30) Foreign Application Priority Data

Aug. 11, 2005  (JP)  ............................ P2005-233320

(51) Int. Cl.
| G06K 9/00 | (2006.01) |
| G06K 9/36 | (2006.01) |
| G06K 9/40 | (2006.01) |
| G06K 1/00 | (2006.01) |
| G06F 15/00 | (2006.01) |
| H04N 1/40 | (2006.01) |
| H04N 5/202 | (2006.01) |
| H04N 5/00 | (2006.01) |
| G03F 3/08 | (2006.01) |

(52) U.S. Cl. ........................ 382/274; 382/168; 382/276; 358/1.9; 358/461; 358/520; 358/522; 348/254; 348/607

(58) Field of Classification Search ......... 382/168–169, 382/254, 260, 264, 274–276; 358/1.1, 1.9, 358/3.1, 448, 461, 463, 518–523; 348/222.1, 348/254, 607
See application file for complete search history.

(56) References Cited

U.S. PATENT DOCUMENTS 6,480,300 B1 * 11/2002 Aoyama ..................... 358/1.9
6,700,685 B1 *  3/2004 Matama ....................... 358/487

(Continued)

FOREIGN PATENT DOCUMENTS

JP    2000 115534    4/2000

(Continued)

*Primary Examiner*—Vu Le
*Assistant Examiner*—Nathan Bloom
(74) *Attorney, Agent, or Firm*—Finnegan, Henderson, Farabow, Garrett & Dunner, L.L.P.

(57) ABSTRACT

An image processing apparatus tone-compresses input luminance values representing luminance values of an input image. The image processing apparatus includes a conversion-curve calculator configured to calculate a conversion curve that is used for tone-compressing luminance values, on the basis of a distribution of the input luminance values; a global-luminance calculator configured to calculate global luminance values representing luminance values of a global-luminance image composed of low-frequency components of the input image; a tone compressor configured to tone-compress the input luminance values and the global luminance values according to the conversion curve; and a contrast corrector configured to correct contrast of a tone-compressed input image composed of the tone-compressed input luminance values, on the basis of a slope of the conversion curve and the tone-compressed global luminance values.

21 Claims, 30 Drawing Sheets

U.S. PATENT DOCUMENTS

| | | | |
|---|---|---|---|
| 6,766,064 B1 * | 7/2004 | Langan et al. | 382/274 |
| 6,856,429 B1 * | 2/2005 | Noguchi et al. | 358/1.9 |
| 6,956,977 B2 * | 10/2005 | Langan et al. | 382/272 |
| 7,065,257 B2 * | 6/2006 | Soga et al. | 382/274 |
| 7,149,358 B2 * | 12/2006 | Langan | 382/214 |
| 7,570,390 B2 * | 8/2009 | Mitsunaga | 358/1.9 |
| 2005/0180629 A1 * | 8/2005 | Masuno et al. | 382/169 |
| 2005/0195291 A1 * | 9/2005 | Kubo | 348/229.1 |
| 2008/0043120 A1 * | 2/2008 | Mitsunaga | 348/238 |
| 2008/0199074 A1 * | 8/2008 | Mitsunaga | 382/169 |
| 2008/0252791 A1 * | 10/2008 | Mitsunaga | 348/673 |

FOREIGN PATENT DOCUMENTS

| | | |
|---|---|---|
| JP | 2000 278529 | 10/2000 |
| JP | 2001 346043 | 12/2001 |
| JP | 2002 125130 | 4/2002 |
| JP | 2004-221644 | 8/2004 |
| JP | 2004 221645 | 8/2004 |
| JP | 2004-221645 | 8/2004 |

* cited by examiner

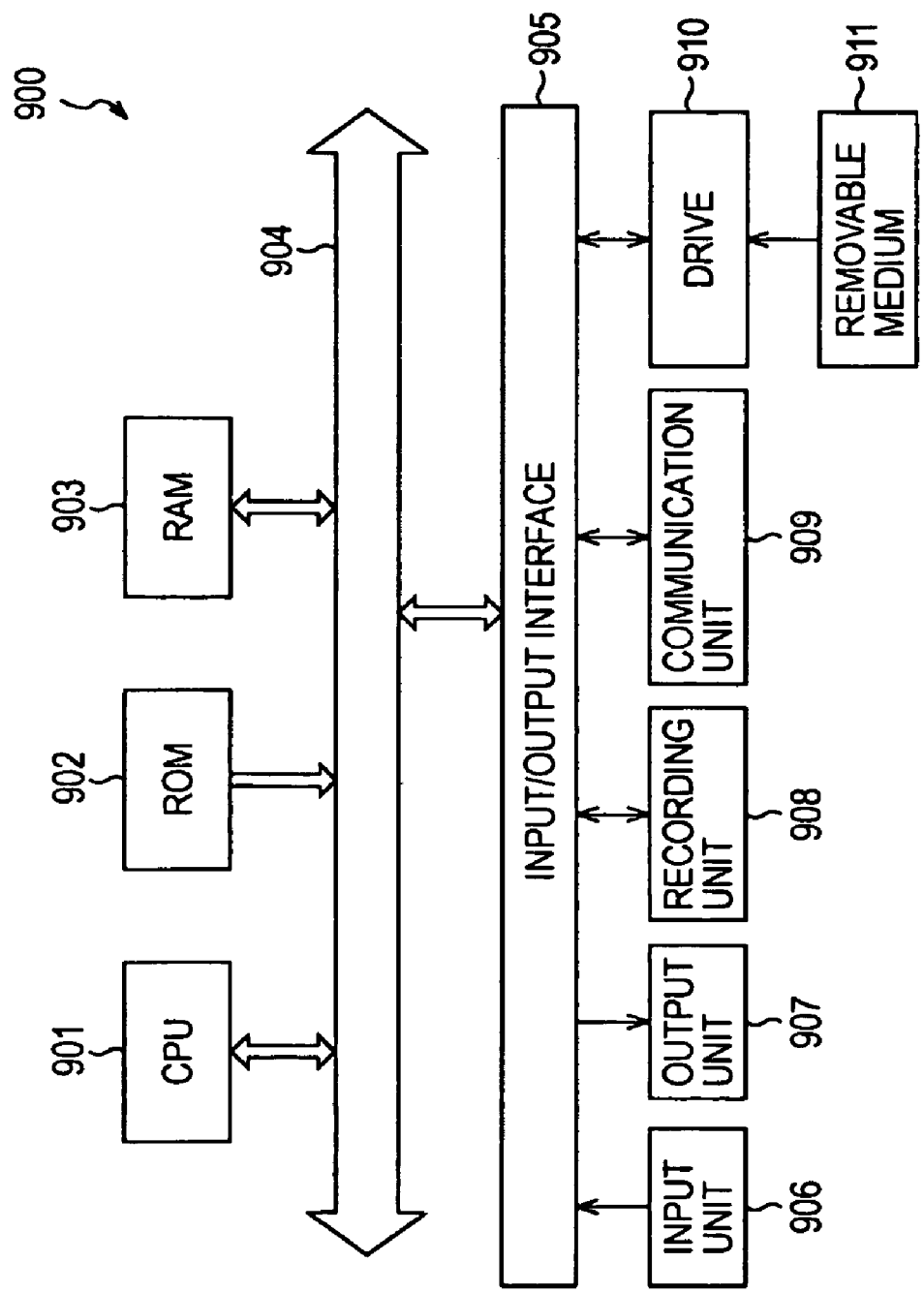

IMAGE PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2005-233320 filed in the Japanese Patent Office on Aug. 11, 2005, the entire contents of which are incorporated herein by reference.

BACKGROUND OF THE INVENTION

1. Field of the Invention

The present invention relates to image processing apparatuses and methods, recording media, and programs. More specifically, the present invention relates to an image processing apparatus and method, recording medium, and program that can be used suitably when a dynamic range of an image is converted to a narrower dynamic range.

2. Description of the Related Art

Recently, with the improvement in the performance of image sensors, the dynamic range of images that can be captured by a video camera is increasing. However, in some cases, a dynamic range of display possible with a display device is narrower than the dynamic range of an image captured by a video camera that is capable of capturing images with a large dynamic range. In view of this situation, tone compression techniques for reducing the dynamic range of an image while avoiding substantial reduction in the contrast of the image have been proposed, for example, as disclosed in Japanese Unexamined Patent Application Publication No. 2004-221644 and Japanese Unexamined Patent Application Publication No. 2004-221645.

FIG. 1 is a block diagram showing an example of the functional configuration of a digital signal processor (DSP) that tone-compresses pixel values of an image, described in Japanese Unexamined Patent Application Publication No. 2004-221645.

A logarithmic converter 11 logarithmically converts luminance values L(p) of an input image, and outputs resulting logarithmic luminance values logL(p) to a tone-curve corrector 12. The tone-curve corrector 12 tone-compresses the logarithmic luminance values logL(p) according to a predefined tone curve, and outputs resulting logarithmic luminance values $logL_c(p)$ to a reduced-image generator 13 and a contrast corrector 15. Also, the tone-curve corrector 12 outputs a representative value γ representing the slope of the tone curve used to the contrast corrector 15.

The reduced-image generator 13 generates a reduced image $logL_{c1}$ on the basis of the logarithmic luminance values $logL_c(p)$ of one frame, input from the tone-curve corrector 12, and stores the reduced image $logL_{c1}$ in a reduced-image memory 14.

The contrast corrector 15 corrects the contrast, which has been reduced through the tone-curve-based correction of the logarithmic luminance values $logL_c(p)$ of a current frame input from the tone-curve corrector 12, on the basis of the representative value γ and a reduced image $logL_{c1}$ of an immediately preceding frame, stored in the reduced-image memory 14. The contrast corrector 15 then outputs resulting logarithmic luminance values $logL_u(p)$ to an inverse logarithmic converter 16. The inverse logarithmic converter 16 executes inverse logarithmic conversion of the contrast-corrected logarithmic luminance values $logL_u(p)$, and outputs resulting luminance values $L_u(p)$ on a linear axis to a gamma corrector 17.

The gamma corrector 17 executes gamma correction on the luminance values $L_u(p)$ input from the inverse logarithmic converter 16, in consideration of gamma characteristics of a display device used, and outputs gamma-corrected luminance values Y(p) to a luminance-information calculator 18 and a luminance-range normalizer 20. The luminance-information calculator 18 calculates luminance-range information [Yd, Yb] representing a highest luminance value Yd and a lowest luminance value Yb of the luminance values Y(p) of one frame input from the gamma corrector 17, and stores the luminance-range information [Yd, Yb] in a luminance-range-information memory 19.

The luminance-range normalizer 20 converts the luminance values Y(p) of the current frame, input from the gamma corrector 17, on the basis of luminance-range information [Yd, Yb] of the immediately preceding frame, stored in the luminance-range-information memory 19, so that the range of distribution thereof matches a range that can be displayed by the display device. The luminance-range normalizer 20 then outputs resulting luminance values Yn(p) to a subsequent stage as pixel values of reduced-dynamic-range image.

SUMMARY OF THE INVENTION

However, according to the techniques disclosed in Japanese Unexamined Patent Application Publication No. 2004-221644 and Japanese Unexamined Patent Application Publication No. 2004-221645, since the shape of the tone curve used for tone compression is fixed, in some cases, suitable tone compression is not achieved when the dynamic range is wider than expected or when image data captured with insufficient exposure is input.

Furthermore, according to the techniques disclosed in Japanese Unexamined Patent Application Publication No. 2004-221645, the logarithmic converter 11, the tone-curve converter 12, the contrast corrector 15, the gamma corrector 17, and the luminance-range normalizer 20 complete processing on a pixel-by-pixel basis, while generation of a reduced image by the reduced-image generator 13 and calculation of luminance-range information by the luminance-range-information calculator 18 is completed only after scanning all the pixels in an image. Furthermore, generation of a reduced image and calculation of luminance-range information are executed sequentially, and parallel processing is not allowed.

Thus, according to the techniques disclosed in Japanese Unexamined Patent Application Publication No. 2004-221645, when tone conversion is executed on the basis of a reduced image and luminance-range information generated and calculated within the same frame, the contrast corrector 15 waits until generation of a reduced image is completed, and the luminance-range normalizer 20 waits until calculation of luminance-range information is completed, so that the processing time increases. Furthermore, even when tone conversion is executed using a reduced image and luminance-range information generated and calculated in processing of the immediately preceding frame, it is not possible to calculate luminance-range information until generation of a reduced image is completed. Thus, the contrast corrector 15 waits until generation of a reduced image is completed, so that the processing time increases.

It is desired that it is possible to execute tone compression of luminance values or color values more quickly without degrading contrast, suitably in accordance with individual images.

According to a first embodiment of the present invention, there is provided an image processing apparatus that tone-compresses input luminance values representing luminance values of an input image. The image processing apparatus includes conversion-curve calculating means for calculating a conversion curve that is used for tone-compressing luminance values, on the basis of a distribution of the input luminance values; global-luminance calculating means for calculating global luminance values representing luminance values of a global-luminance image composed of low-frequency components of the input image; tone compressing means for tone-compressing the input luminance values and the global luminance values according to the conversion curve; and contrast correcting means for correcting contrast of a tone-compressed input image composed of the tone-compressed input luminance values, on the basis of a slope of the conversion curve and the tone-compressed global luminance values.

The conversion-curve calculating means may calculate the conversion curve on the basis of an average luminance value representing an average of the input luminance values, a first boundary value with which the ratio of the number of pixels having luminance values less than or equal to the first boundary value to the number of pixels in the input image is substantially a first predetermined value, and a second boundary value with which the ratio of the number of pixels having luminance values greater than or equal to the second boundary value to the number of pixels in the input image is substantially a second predetermined value.

The conversion-curve calculating means may calculate the conversion curve so that the conversion curve monotonically increases and so that the slope of the conversion curve becomes smaller in the proximity of a point where the luminance value before tone compression becomes the average luminance value and becomes substantially 1 in the proximities of points where the luminance value before tone compression becomes the first boundary value or the second boundary value.

The average luminance value may be an average luminance value of luminance values in a user-specified region in the input image.

The image processing apparatus may further include temporal smoothing means for temporally smoothing the average luminance value, the first boundary value, and the second boundary value between a current frame and a frame preceding the current frame by one or more intervals so that the conversion-curve calculating means can calculate the conversion curve on the basis of the temporally smoothed average value, the temporally smoothed first boundary value, and the temporally smoothed second boundary value.

The global-luminance calculating means may include reduced-image generating means for generating a reduced image by reducing the input image; and interpolating means for calculating the global luminance values by interpolating the reduced image so that the global-luminance image has the same number of pixels as the input image.

The reduced image generating means may generate the reduced image by dividing the input image into a predetermined number of blocks and arranging block average luminance values correspondingly to an order of the blocks, the block average luminance values representing averages of luminance values of pixels included in the individual blocks.

The interpolating means may calculate the global luminance values by interpolating a reduced image corresponding to an input image of an immediately preceding frame.

The tone compressing means may tone-compress the input luminance values and the global luminance values according to a conversion curve that is based on a distribution of input luminance values of an input image of an immediately preceding frame.

The contrast correcting means may correct the contrast of the tone-compressed input image on the basis of the slope of the conversion curve in the proximity of a point where the luminance value before tone compression becomes an average luminance value.

The contrast correcting means may correct the contrast of the tone-compressed input image so that contrast of luminance values in the proximity of a predetermined intermediate level of the tone-compressed input image is enhanced compared with contrast of luminance values in the proximity of a minimum value or a maximum value of possible luminance values of the tone-compressed input image.

The contrast correcting means may enhance contrast of frequency components of the tone-compressed input image except frequency components included in the tone-compressed global-luminance image.

The image processing apparatus may further include non-linear converting means for logarithm-converting or gamma-converting the input luminance values. In this case, the conversion-curve calculating means calculates the conversion curve on the basis of a distribution of the logarithm-converted or gamma-converted input luminance values, the global-luminance calculator calculates the global luminance values representing luminance values of the global-luminance image composed of low-frequency components of the input image composed of the logarithm-converted or gamma-converted input luminance values, the tone-compressing means tone-compresses the logarithm-converted or gamma-converted input luminance values, and the contrast correcting means corrects the contrast of the tone-compressed input image composed of the input luminance values that have been logarithm-converted or gamma-converted and that have been tone-compressed.

According to the first embodiment of the present invention, there is also provided an image processing method for tone-compressing input luminance values representing luminance values of an input image, or a program for allowing a computer to execute the image processing. The image processing method or image processing includes the steps of calculating a conversion curve that is used for tone-compressing the luminance values, on the basis of a distribution of the input luminance values; calculating global luminance values representing luminance values of a global-luminance image composed of low-frequency components of the input image; tone-compressing the input luminance values and the global luminance values according to the conversion curve; and correcting contrast of a tone-compressed input image composed of the tone-compressed input luminance values, on the basis of a slope of the conversion curve and the tone-compressed global luminance values.

According to a second embodiment of the present invention, there is provided an image processing apparatus that tone-compresses color values representing values of color components of an input image. The image processing apparatus includes input-luminance calculating means for calculating input luminance values representing luminance values of individual pixels of the input image, on the basis of the color values; conversion-curve calculating means for calculating a conversion curve that is used for tone-compressing luminance values, on the basis of a distribution of the input luminance values; global-luminance calculating means for calculating global luminance values representing luminance values of a global-luminance image composed of low-frequency components of a luminance image composed of the input luminance values; tone compressing means for tone-compressing the input luminance values and the global luminance values according to the conversion curve; contrast correcting means for correcting contrast of a tone-compressed luminance image composed of the tone-compressed input luminance values, on the basis of a slope of the conversion curve and the tone-compressed global luminance values; and tone converting means for tone-converting the color values of the input image by multiplying individual pixel values of a differential image by a predetermined coefficient, the differential image representing a difference between the input image and the luminance image, and adding the contrast-corrected tone-compressed luminance image.

The image processing apparatus may further include first non-linear converting means for logarithm-converting or gamma-converting the input luminance values; and second non-linear converting means for logarithm-converting or gamma-converting the color values of the input image. In this case, the conversion-curve calculating means calculates the conversion curve on the basis of a distribution of the logarithm-converted or gamma-converted input luminance values, the global-luminance calculator calculates the global luminance values representing luminance values of the global-luminance image composed of low-frequency components of the luminance image composed of the logarithm-converted or gamma-converted input luminance values, the tone-compressing means tone-compresses the logarithm-converted or gamma-converted input luminance values, the contrast correcting means corrects the contrast of the tone-compressed input image composed of the input luminance values that have been logarithm-converted or gamma-converted and that have been tone-compressed, and the tone converting means tone-converts the color values of the input image by multiplying individual pixel values of a differential image by a predetermined coefficient, the differential image representing a difference between the input image composed of the logarithm-converted or gamma-converted color values and the luminance image composed of the logarithm-converted or gamma converted input luminance values, and adding the contrast-corrected tone-compressed luminance image.

According to the second embodiment of the present invention, there is also provided an image processing method for tone-compressing color values representing values of color components of an input image, or a program for allowing a computer to execute the image processing. The image processing method or image processing includes the steps of calculating input luminance values representing luminance values of individual pixels of the input image, on the basis of the color values; calculating a conversion curve that is used for tone-compressing luminance values, on the basis of a distribution of the input luminance values; calculating global luminance values representing luminance values of a global-luminance image composed of low-frequency components of a luminance image composed of the input luminance values; tone-compressing the input luminance values and the global luminance values according to the conversion curve; correcting contrast of a tone-compressed luminance image composed of the tone-compressed input luminance values, on the basis of a slope of the conversion curve and the tone-compressed global luminance values; and tone-converting the color values of the input image by multiplying individual pixel values of a differential image by a predetermined coefficient, the differential image representing a difference between the input image and the luminance image, and adding the contrast-corrected tone-compressed luminance image.

According to the first embodiment of the present invention, a conversion curve that is used for tone-compressing luminance values is calculated on the basis of a distribution of input luminance values representing luminance values of an input image, global luminance values representing luminance values of a global-luminance image composed of low-frequency components of the input image are calculated, the input luminance values and the global luminance values are tone-compressed according to the conversion curve, and contrast of a tone-compressed input image composed of the tone-compressed input luminance values is corrected on the basis of a slope of the conversion curve and the tone-compressed global luminance values.

According to the second embodiment of the present invention, input luminance values representing luminance values of individual pixels of an input image are calculated on the basis of color values representing values of color components of the input image, a conversion curve that is used for tone-compressing luminance values is calculated on the basis of a distribution of the input luminance values, global luminance values representing luminance values of a global-luminance image composed of low-frequency components of a luminance image composed of the input luminance values are calculated, the input luminance values and the global luminance values are tone-compressed according to the conversion curve, contrast of a tone-compressed luminance image composed of the tone-compressed input luminance values is compressed on the basis of a slope of the conversion curve and the tone-compressed global luminance values, and the color values of the input image are tone-converted by multiplying individual pixel values of a differential image by a predetermined coefficient, the differential image representing a difference between the input image and the luminance image, and adding the contrast-corrected tone-compressed luminance image.

As described above, according to the first or second embodiment of the present invention, it is possible to tone-compress luminance values or color values of an image. Also, according to the first or second embodiment of the present invention, it is possible to tone-compress luminance values or color values more quickly without degrading contrast, suitably in accordance with individual images.

BRIEF DESCRIPTION OF THE DRAWINGS

FIG. 30 is a block diagram showing an example of the configuration of a personal computer.

DESCRIPTION OF THE PREFERRED EMBODIMENTS

Figure 1:
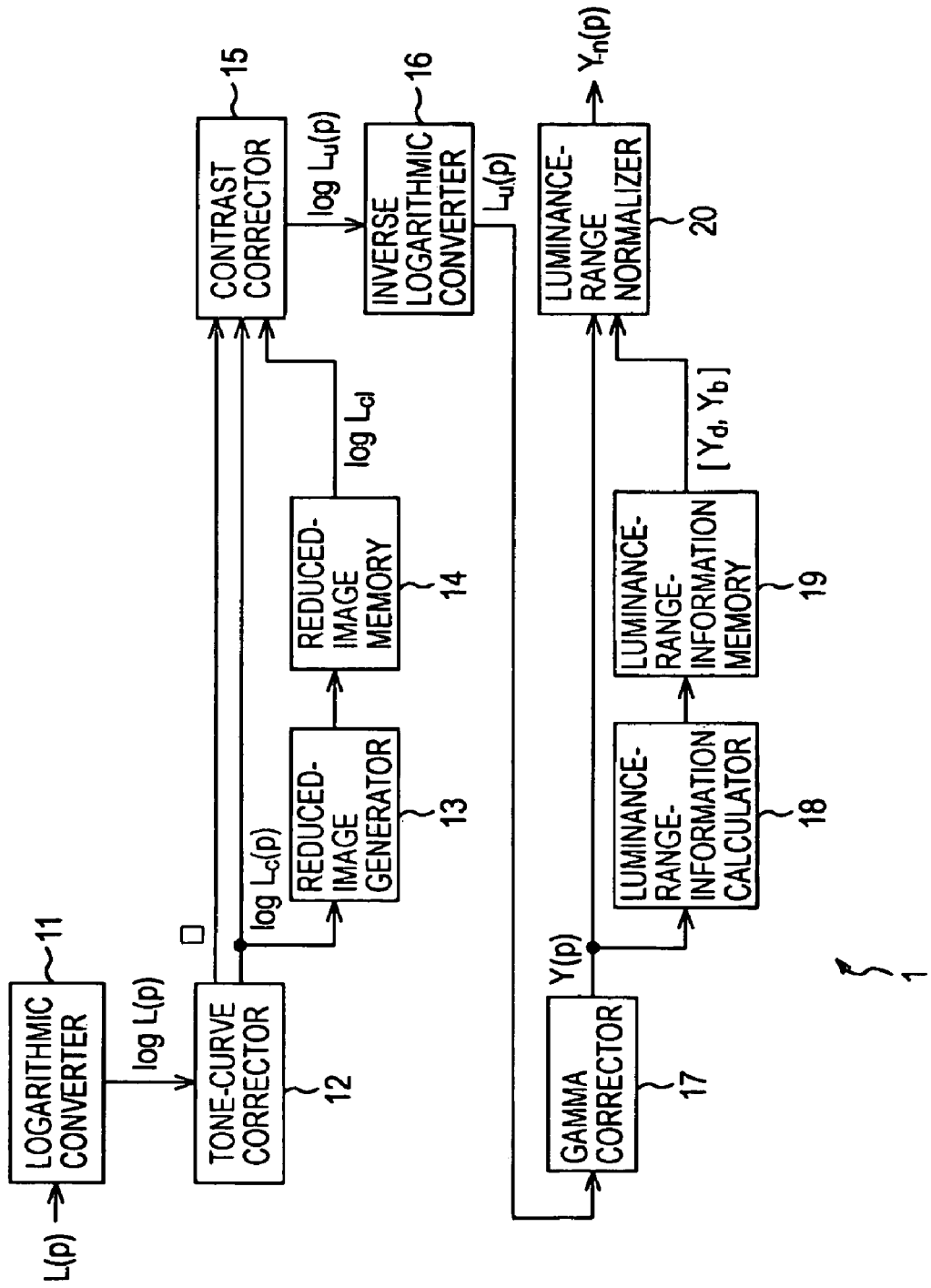
FIG. 1 is a block diagram showing an example of the functional configuration of a DSP according to the related art.

Before describing embodiments of the present invention, the correspondence between the features of the claims and specific examples in the embodiments of the present invention will be described below. This description is intended to assure that specific examples supporting the claimed invention are included in the description of the embodiments. Thus, even if a specific example in the following embodiments is not described as corresponding to a certain feature in the claims, that does not necessarily mean that the specific example does not correspond to that feature in the claims. Conversely, even if a specific example is described herein as corresponding to a certain feature in the claims, that does not necessarily mean that the element does not correspond to other features in the claims.

Furthermore, this description should not be construed to mean that all the aspects of the invention corresponding to the specific examples included in the description of the embodiments are described in the claims. That is, the description does not deny the existence of aspects of the present invention corresponding to specific examples included in the description of the embodiments but not claimed in this application, i.e., the existence of aspects of the present invention that in future may be claimed by a divisional application or additionally claimed through amendments.

An image processing apparatus (e.g., a tone converter 143 shown in FIG. 3) according to a first embodiment of the present invention is an image processing apparatus that tone-compresses input luminance values representing luminance values of an input image. The image processing apparatus includes conversion-curve calculating means (e.g., a tone-curve calculator 163 shown in FIG. 4) for calculating a conversion curve (e.g., a tone curve CL shown in FIG. 25) that is used for tone-compressing luminance values, on the basis of a distribution of the input luminance values; global-luminance calculating means (e.g., a global-luminance calculator 166 shown in FIG. 4) for calculating global luminance values representing luminance values of a global-luminance image composed of low-frequency components of the input image; tone compressing means (e.g., a tone converter 167 shown in FIG. 4) for tone-compressing the input luminance values and the global luminance values according to the conversion curve; and contrast correcting means (e.g., a contrast corrector 168 shown in FIG. 4) for correcting contrast of a tone-compressed input image composed of the tone-compressed input luminance values, on the basis of a slope of the conversion curve and the tone-compressed global luminance values.

In the image processing apparatus according to the first embodiment of the present invention, the conversion-curve calculating means may calculate the conversion curve on the basis of an average luminance value (e.g., an average level $L_{average}^{(n1)}$) representing an average of the input luminance values, a first boundary value (e.g., a skirt value $L_{dark}^{(n1)}$) with which the ratio of the number of pixels having luminance values less than or equal to the first boundary value to the number of pixels in the input image is substantially a first predetermined value, and a second boundary value (e.g., a skirt value $L_{bright}^{(n1)}$) with which the ratio of the number of pixels having luminance values greater than or equal to the second boundary value to the number of pixels in the input image is substantially a second predetermined value.

In the image processing apparatus according to the first embodiment of the present invention, the image processing apparatus may further include temporal smoothing means (e.g., a temporal smoothing unit 223 shown in FIG. 6) for temporally smoothing the average luminance value, the first boundary value, and the second boundary value between a current frame and a frame preceding the current frame by one or more intervals so that the conversion-curve calculating means can calculate the conversion curve on the basis of the temporally smoothed average value (e.g., an average level $L_{average-ts}^{(n1)}$) the temporally smoothed first boundary value (e.g., a skirt value $L_{dark-ts}^{(n1)}$) and the temporally smoothed second boundary value (e.g., a skirt value $L_{bright-ts}^{(n1)}$).

In the image processing apparatus according to the first embodiment of the present invention, the global-luminance calculating means may include reduced-image generating means (e.g., a reduced-image generator 181 shown in FIG. 4) for generating a reduced image by reducing the input image; and interpolating means (e.g., an interpolator 183 shown in FIG. 4) for calculating the global luminance values by interpolating the reduced image so that the global-luminance image has the same number of pixels as the input image.

The image processing apparatus according to the first embodiment of the present invention may further include non-linear converting means (e.g., a non-linear converter 162-4 shown in FIG. 4) for logarithm-converting or gamma-converting the input luminance values. In this case, the conversion-curve calculating means calculates the conversion curve on the basis of a distribution of the logarithm-converted or gamma-converted input luminance values, the global-luminance calculator calculates the global luminance values representing luminance values of the global-luminance image composed of low-frequency components of the input image composed of the logarithm-converted or gamma-converted input luminance values, the tone-compressing means tone-compresses the logarithm-converted or gamma-converted input luminance values, and the contrast correcting means corrects the contrast of the tone-compressed input image composed of the input luminance values that have been logarithm-converted or gamma-converted and that have been tone-compressed.

An image processing method or program according to the first embodiment of the present invention is an image processing method for tone-compressing input luminance values representing luminance values of an input image, or a program for allowing a computer to execute the image processing. The image processing method or image processing includes the steps of calculating a conversion curve that is used for tone-compressing the luminance values, on the basis of a distribution of the input luminance values (e.g., steps S26 and S36 shown in FIG. 17); calculating global luminance values representing luminance values of a global-luminance image composed of low-frequency components of the input image (e.g., steps S27, S28, and S37 shown in FIG. 16); tone-compressing the input luminance values and the global luminance values according to the conversion curve (e.g., step S29 shown in FIG. 16); and correcting contrast of a tone-compressed input image composed of the tone-compressed input luminance values, on the basis of a slope of the conversion curve and the tone-compressed global luminance values (e.g., step S30 shown in FIG. 16).

An image processing apparatus (e.g., the tone converter 143 shown in FIG. 3) according to a second embodiment of the present invention is an image processing apparatus that tone-compresses color values representing values of color components of an input image. The image processing apparatus includes input-luminance calculating means (e.g., a luminance calculator 161 shown in FIG. 4) for calculating input luminance values representing luminance values of individual pixels of the input image, on the basis of the color values; conversion-curve calculating means (e.g., the tone-curve calculator 163 shown in FIG. 4) for calculating a conversion curve (e.g., the tone curve CL shown in FIG. 25) that is used for tone-compressing luminance values, on the basis of a distribution of the input luminance values; global-luminance calculating means (e.g., the global-luminance calculator 166 shown in FIG. 4) for calculating global luminance values representing luminance values of a global-luminance image composed of low-frequency components of a luminance image composed of the input luminance values; tone compressing means (e.g., the tone converter 167 shown in FIG. 4) for tone-compressing the input luminance values and the global luminance values according to the conversion curve; contrast correcting means (e.g., the contrast corrector 168 shown in FIG. 4) for correcting contrast of a tone-compressed luminance image composed of the tone-compressed input luminance values, on the basis of a slope of the conversion curve and the tone-compressed global luminance values; and tone converting means (e.g., tone correctors 169-1 to 169-3 shown in FIG. 4) for tone-converting the color values of the input image by multiplying individual pixel values of a differential image by a predetermined coefficient, the differential image representing a difference between the input image and the luminance image, and adding the contrast-corrected tone-compressed luminance image.

The image processing apparatus according to the second embodiment of the present invention may further include first non-linear converting means (e.g., the non-linear converter 162-4 shown in FIG. 4) for logarithm-converting or gamma-converting the input luminance values; and second non-linear converting means (e.g., non-linear converters 162-1 to 162-3 shown in FIG. 4) for logarithm-converting or gamma-converting the color values of the input image. In this case, the conversion-curve calculating means calculates the conversion curve on the basis of a distribution of the logarithm-converted or gamma-converted input luminance values, the global-luminance calculator calculates the global luminance values representing luminance values of the global-luminance image composed of low-frequency components of the luminance image composed of the logarithm-converted or gamma-converted input luminance values, the tone-compressing means tone-compresses the logarithm-converted or gamma-converted input luminance values, the contrast correcting means corrects the contrast of the tone-compressed input image composed of the input luminance values that have been logarithm-converted or gamma-converted and that have been tone-compressed, and the tone converting means tone-converts the color values of the input image by multiplying individual pixel values of a differential image by a predetermined coefficient, the differential image representing a difference between the input image composed of the logarithm-converted or gamma-converted color values and the luminance image composed of the logarithm-converted or gamma converted input luminance values, and adding the contrast-corrected tone-compressed luminance image.

An image processing method or program according to the second embodiment of the present invention is an image processing method for tone-compressing color values representing values of color components of an input image, or a program for allowing a computer to execute the image processing. The image processing method or image processing includes the steps of calculating input luminance values representing luminance values of individual pixels of the input image, on the basis of the color values (e.g., step S24 shown in FIG. 16); calculating a conversion curve that is used for tone-compressing luminance values, on the basis of a distribution of the input luminance values (e.g., steps S26 and S36 shown in FIG. 17); calculating global luminance values representing luminance values of a global-luminance image composed of low-frequency components of a luminance image composed of the input luminance values (e.g., steps S27, S28, and S37 shown in FIG. 16); tone-compressing the input luminance values and the global luminance values according to the conversion curve (e.g., step S29 shown in FIG. 16); correcting contrast of a tone-compressed luminance image composed of the tone-compressed input luminance values, on the basis of a slope of the conversion curve and the tone-compressed global luminance values (e.g., step S30 shown in FIG. 16); and tone-converting the color values of the input image by multiplying individual pixel values of a differential image by a predetermined coefficient, the differential image representing a difference between the input image and the luminance image, and adding the contrast-corrected tone-compressed luminance image (e.g., step S32 shown in FIG. 17).

Now, embodiments of the present invention will be described with reference to the drawings.

Figure 2:
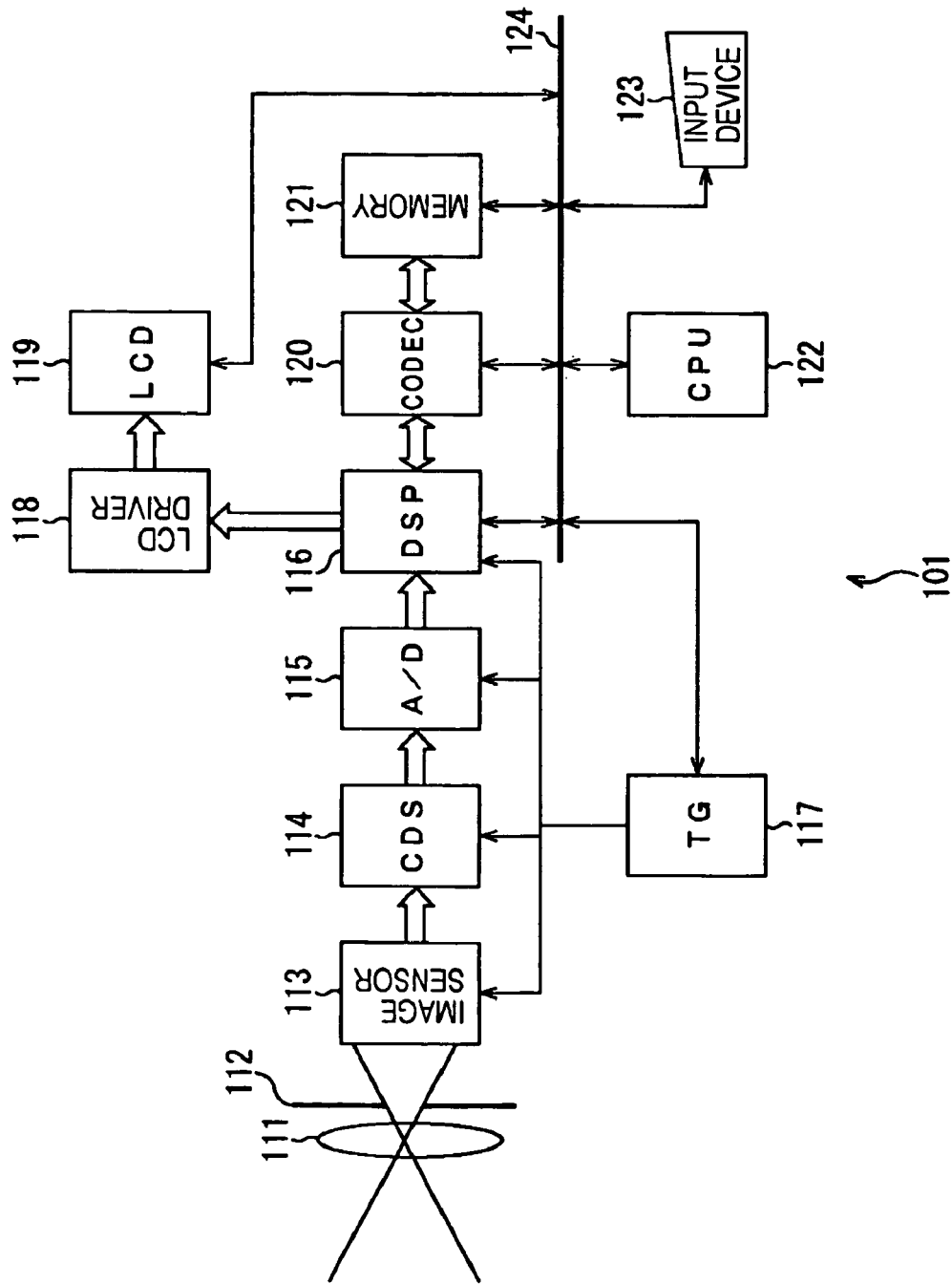
FIG. 2 is a block diagram of a digital video camera according to an embodiment of the present invention.

FIG. 2 is a block diagram of a digital video camera according to an embodiment of the present invention. A digital video camera 101 includes a lens 111, an iris 112, an image sensor 113, a correlated double sampling (CDS) circuit 114, an analog-to-digital (A/D) converter 115, a digital signal processor (DSP) block 116, a timing generator (TG) 117, a liquid crystal display (LCD) driver 118, an LCD 119, a compressor/decompressor (CODEC) 120, a memory 121, a central processing unit (CPU) 122, and an input device 123. The DSP block 116 is a block including a signal processor (e.g., a DSP), a memory such as a random access memory (RAM) for storing image data, and other associated parts. The signal processor executes image processing described later by executing a certain program. Hereinafter, the DSP block 116 will be referred to simply as a DSP 116.

Light coming from an object and passing through an optical system including the lens 111 and the iris 112 first reaches photoreceptors on an imaging surface of the image sensor 113 and converted into electric signals through photoelectric conversion by the photoreceptors. The correlated double sampling circuit 114 removes noise from the electric signals output from the image sensor 113, the A/D converter 115 digitizes the resulting signals, and the resulting digitized image data is temporarily stored in the memory of the DSP 116. The timing generator 117 controls the signal processing system including the correlated double sampling circuit 114, the A/D converter 115, and the DSP 116 so that image data is captured at a constant frame rate. That is, a stream of image data is supplied to the DSP 116 at a constant frame rate.

The image sensor 113 has a dynamic range wider than the dynamic range of an image sensor formed by an ordinary charge coupled device (CCD), so that it is possible to capture an image of an object including dark regions to bright regions without causing saturation or generating noise. Thus, the A/D converter 115 converts the electric signals input thereto into image data having a larger number of possible shades (e.g., the number of shades that can be represented by data having about 14 to 16 bits) than the number of possible shades of an ordinary digital video camera (e.g., the number of shades that can be represented by about 10 to 12 bits).

The DSP 116 executes image processing described later on the image data so that the dynamic range of the image data becomes compatible with, for example, the dynamic range of display by the LCD 119, and supplies the resulting image data to the LCD driver 118 or the CODEC 120 as appropriate.

The LCD driver 118 converts the image data supplied from the DSP 116 into analog image signals. The LCD driver 118 supplies the analog image signals to the LCD 119 that serves as a finder of the digital camera 101 so that an image based on the image signals is displayed.

The CODEC 120 encodes the image data supplied from the DSP 116 according to a predetermined scheme, and records the resulting encoded image data in the memory 121. The memory 121 is, for example, a semiconductor memory, a magnetic recording medium, a magneto-optical recording medium, or an optical recording medium.

The CPU 122 controls the overall operation of the digital video camera 101, for example, according to instructions input by a user by operating the input device 123. For example, the input device includes operation buttons, such as a shutter button.

Figure 3:
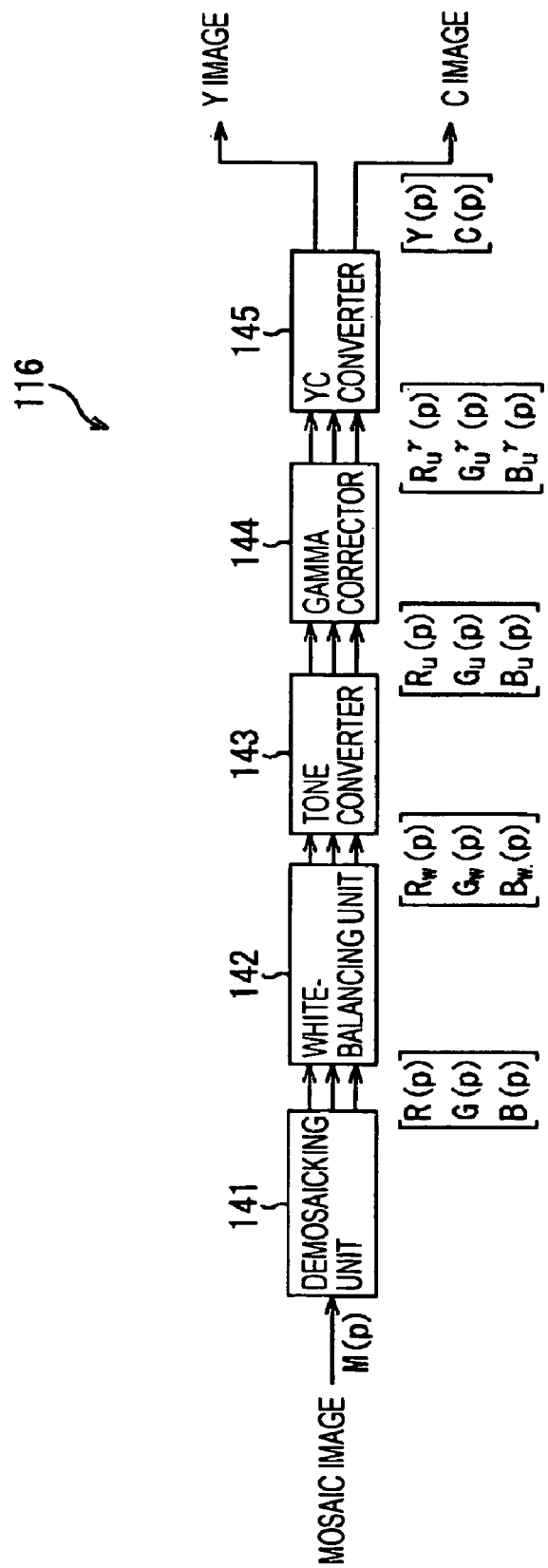
FIG. 3 is a block diagram showing an example of the functional configuration of a DSP block shown in FIG. 2.

FIG. 3 is a block diagram showing an example configuration of functions that are achieved by execution of certain programs by an internal processor (processing unit) of the DSP 116. By execution of the programs by the internal processor of the DSP 116, functions of a demosaicking unit 141, a white-balancing unit 142, a tone converter 143, a gamma corrector 144, a YC converter 145, and so forth are achieved.

The demosaicking unit 141 obtains a mosaic image, i.e., image data obtained through A/D conversion by the A/D converter 115. In the mosaic image, each pixel stores data corresponding to one of R, G, and B color components, and pixels are arranged according to what is called the Bayer pattern. The demosaicking unit 141 executes demosaicking on the mosaic image so that each single pixel has all R, G, and B components, thereby generating three pieces of image data, namely, an R image, a G image, and a B image corresponding to the three individual components of R, G, and B. The demosaicking unit 141 supplies the three pieces of image data generated, i.e., the R image, the G image, and the B image, to the white-balancing unit 142.

Hereinafter, the three pieces of image data, i.e., the R image, the G image, and the B image, will be referred to collectively as RGB images. Furthermore, the pixel value at a pixel position p of the mosaic image will be denoted as M(p). Furthermore, the pixel value at the pixel position p in the image data obtained through demosaicking will be denoted as [R(p), G(p), B(p)], where R(p) denotes the pixel value of the R component, G(p) denotes the pixel value of the G component, and B(p) denotes the pixel value of the B component.

The white-balancing unit 142 adjusts the white balance of the RGB images by multiplying the individual pixel values of the RGB images by appropriate coefficients so that the color balance of an achromatic region of an object is actually represented as achromatic. The white-balancing unit 142 supplies the RGB images with the white balance thereof having been adjusted to the tone converter 143. Hereinafter, the pixel value at the pixel position p of the image data having the adjusted white balance will be denoted as [$R_w(p)$, $G_w(p)$, and $B_w(p)$]; where $R_w(p)$ denotes the pixel value of the R component, $G_w(p)$ denotes the pixel value of the G component, and $B_w(p)$ denotes the pixel value of the B component.

Figure 16:
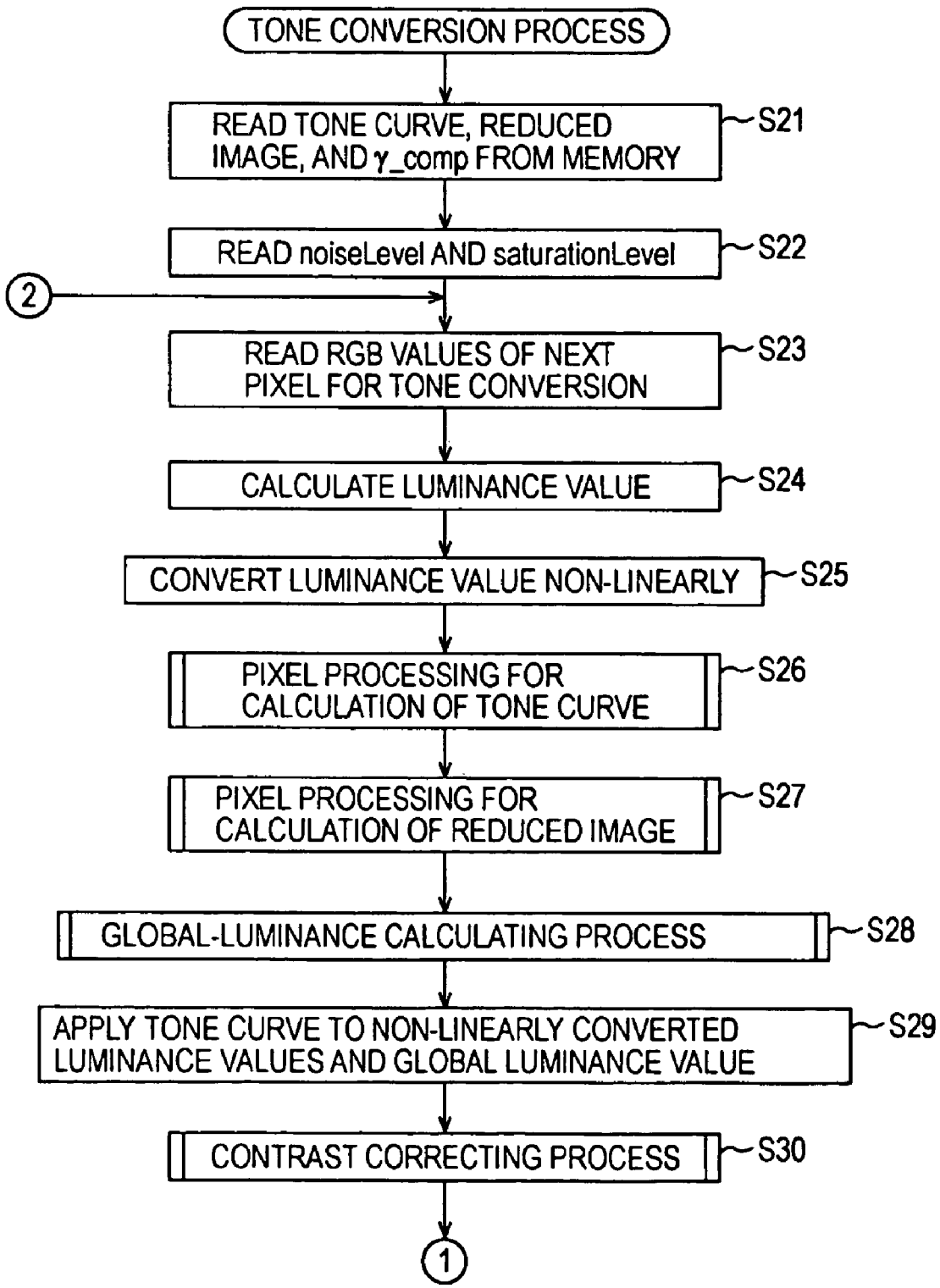
FIG. 16 is a flowchart for explaining details of a tone conversion process executed in step S4 shown in FIG. 15.

As will be described later with reference to FIG. 16 and other relevant figures, the tone converter 143 executes tone conversion on the RGB images having the adjusted white balance. The tone converter 143 supplies the RGB images obtained through the tone conversion to the gamma corrector 144. Hereinafter, the pixel value at the pixel position p of the image data obtained through the tone conversion will be denoted as [$R_u(p)$, $G_u(p)$, and $B_u(p)$], where $R_u(p)$ denotes the pixel value of the R component, $G_u(p)$ denotes the pixel value of the G component, and $B_u(p)$ denotes the pixel value of the B component.

The gamma corrector 144 executes gamma correction on the RGB images obtained through the tone conversion. The gamma corrector 144 supplies the RGB images obtained through the gamma correction to the YC converter 145. Hereinafter, the pixel value at the pixel position p of the image data obtained through the gamma correction will be denoted as [$R_u^\gamma(p)$, $G_u^\gamma(p)$, and $B_u^\gamma(p)$], where $R_u^\gamma(p)$ denotes the pixel value of the R component, $G_u^\gamma(p)$ denotes the pixel value of the G component, and $B_u^\gamma(p)$ denotes the pixel value of the B component.

The YC converter 145 executes YC matrix processing and chroma-component band limiting on the RGB images obtained through the gamma correction, thereby generating a Y image composed of a luminance component (Y component) and a C image composed of a chrominance component (Cb or Cr component). The YC converter 145 supplies the Y mage and C image generated to the LCD driver 118 or the CODEC 120 as appropriate. Hereinafter, the pixel value at the pixel position p of the image data output from the YC converter 145 will be denoted as [Y(p), C(p)], where Y(p) denotes the value of the luminance component in the Y image and C(p) denotes the value of the chrominance component in the C image.

Figure 4:
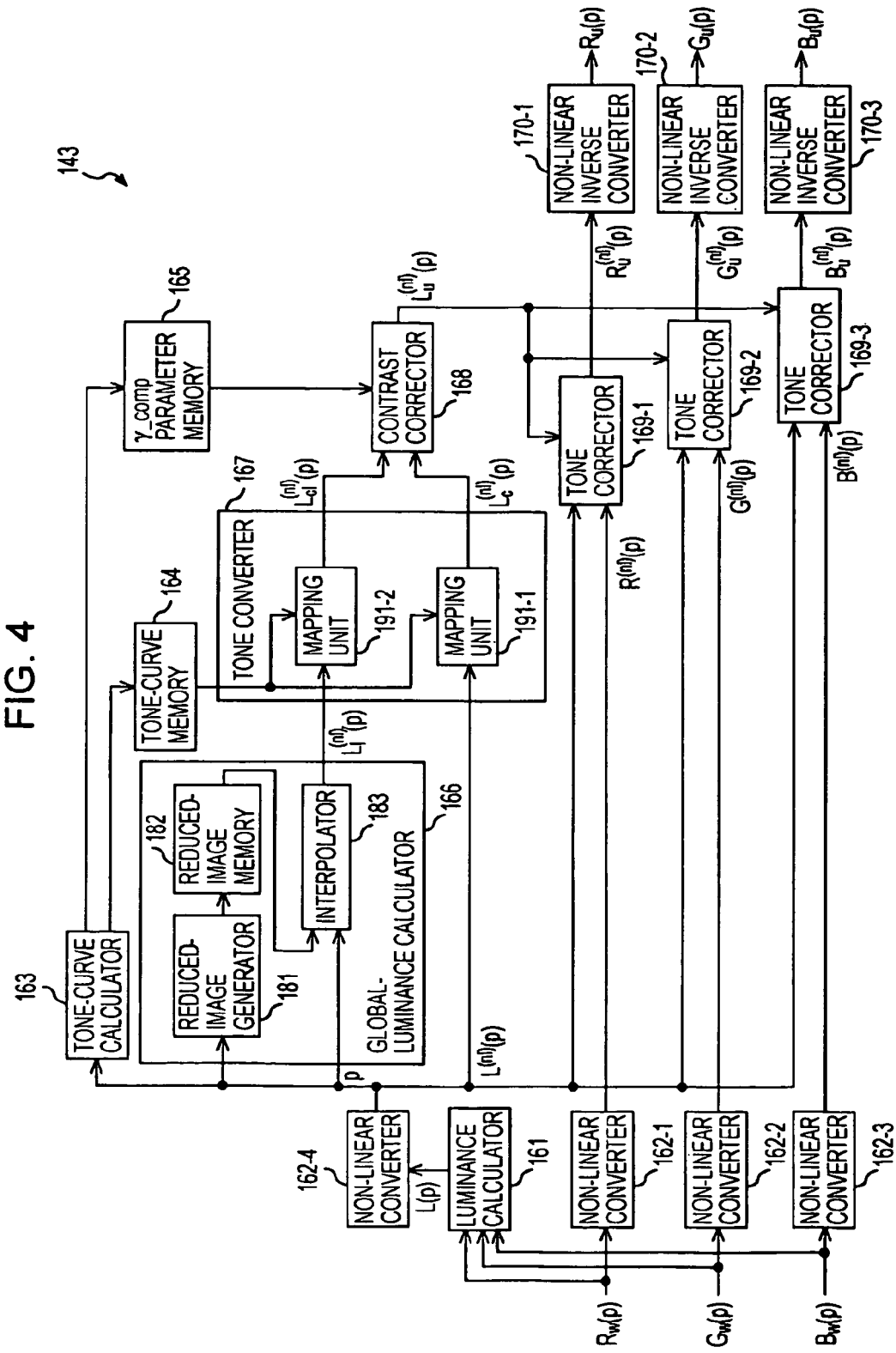
FIG. 4 is a block diagram showing an example of the functional configuration of a tone converter shown in FIG. 3.

FIG. 4 is a block diagram showing an example of the functional configuration of the tone converter 143. The tone converter 143 includes a luminance calculator 161, non-linear converters 162-1 to 162-4, a tone-curve calculator 163, a tone-curve memory 164, a γ_comp parameter memory 165, a global-luminance calculator 166, a tone converter 167, a contrast corrector 168, tone correctors 169-1 to 169-3, and non-linear inverse converters 170-1 to 170-3.

As will be described later with reference to FIG. 16, the luminance calculator 161 calculates the value of a luminance component (luminance value L(p)) at a pixel position from the pixel values $R_w(p)$, $G_w(p)$, and $B_w(p)$ at the corresponding pixel position of the RGB images having the adjusted white balance. The luminance calculator 161 outputs the luminance value L(p) to the non-linear converter 162-4.

As will be described later with reference to FIG. 16, the non-linear converters 162-1 to 162-3 non-linearly convert the pixel values $R_w(p)$, $G_w(p)$, and $B_w(p)$ of the RGB images having the adjusted white balance, respectively. The non-linear converters 162-1 to 162-3 outputs pixel values $R^{(n1)}(p)$, $G^{(n1)}(p)$, and $B^{(n1)}(p)$ calculated through the non-linear conversion to the tone correctors 169-1 to 169-3.

As will be described later with reference to FIG. 16, the non-linear converter 162-4 non-linearly converts the luminance value L(p). The non-linear converter 162-4 outputs a luminance value $L^{(n1)}(p)$ calculated through the non-linear conversion to the tone-curve calculator 163, the tone correctors 169-1 to 169-3, a reduced-image generator 181, an interpolator 183, and a mapping unit 191-1.

Hereinafter, each of the non-linear converters 162-1 to 162-4 will be referred to simply as a non-linear converter 162 unless distinction is to be made among the individual non-linear converters 162-1 to 162-4.

Figure 24:
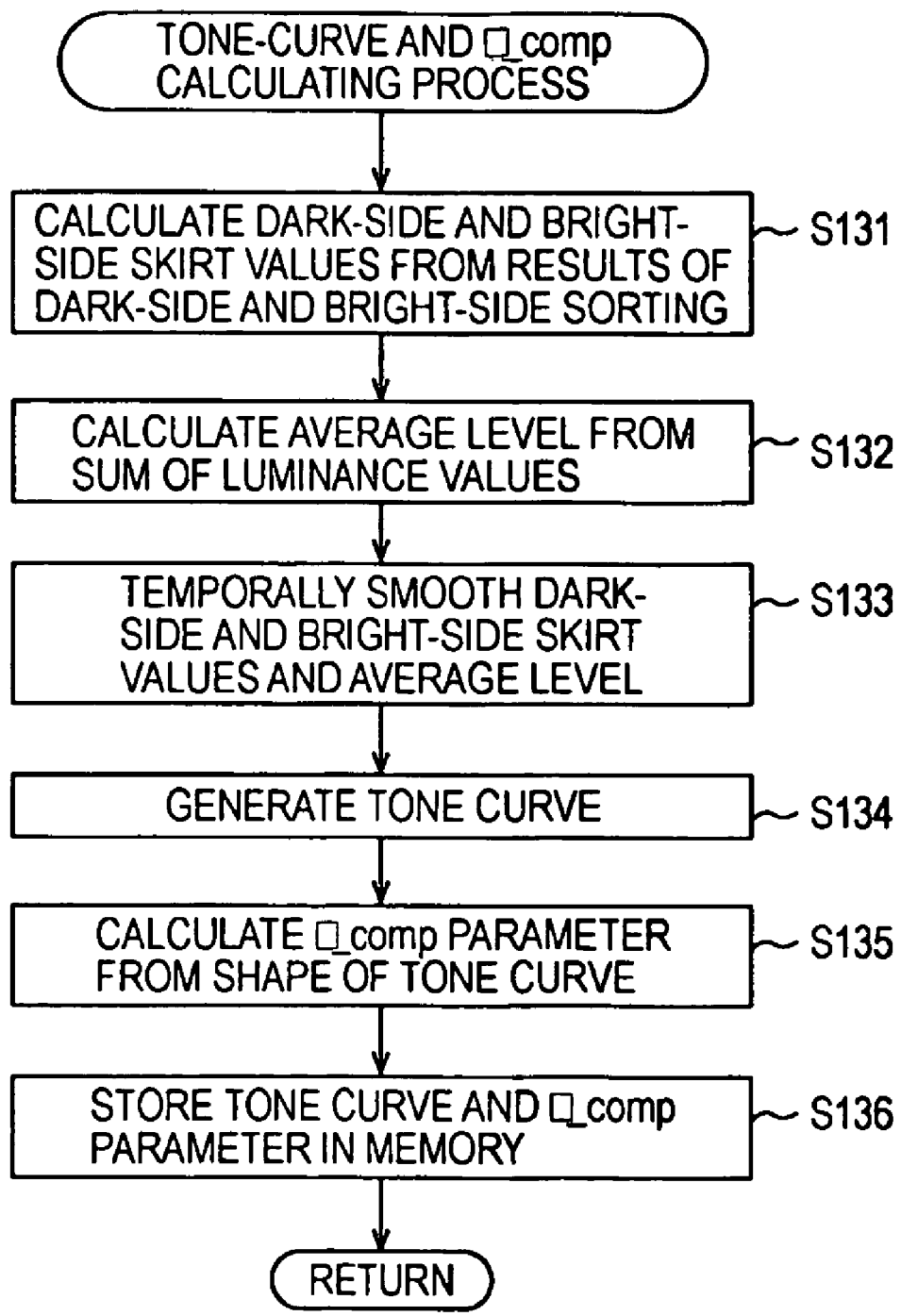
FIG. 24 is a flowchart for explaining details of a tone-curve and γ_comp calculating process executed in step S36 shown in FIG. 17.

As will be described later with reference to FIG. 24, the tone-curve calculator 163 calculates a tone curve that is used for tone-compressing luminance values $L^{(n1)}(p)$ obtained through the non-linear conversion and global luminance values $L_1^{(n1)}(p)$ described later. The tone-curve calculator 163 stores a lookup table (translation table of luminance values) representing the tone curve in the tone-curve memory 164. Furthermore, as will be described later with reference to FIG. 24, the tone-curve calculator 163 calculates a γ_comp parameter that serves as a representative value of the slope the tone curve. The tone-curve calculator 163 stores the γ_comp parameter in the γ_comp parameter memory 165.

The global-luminance calculator 166 calculates global luminance values $L_1^{(n1)}(p)$ representing luminance values of an image (hereinafter referred to as a global-luminance image) composed of quite-low-frequency components of an image composed of luminance values $L^{(n1)}(p)$. The global-luminance calculator 166 includes a reduced-image generator 181, a reduced-image memory 182, and an interpolator 183.

Figure 26:
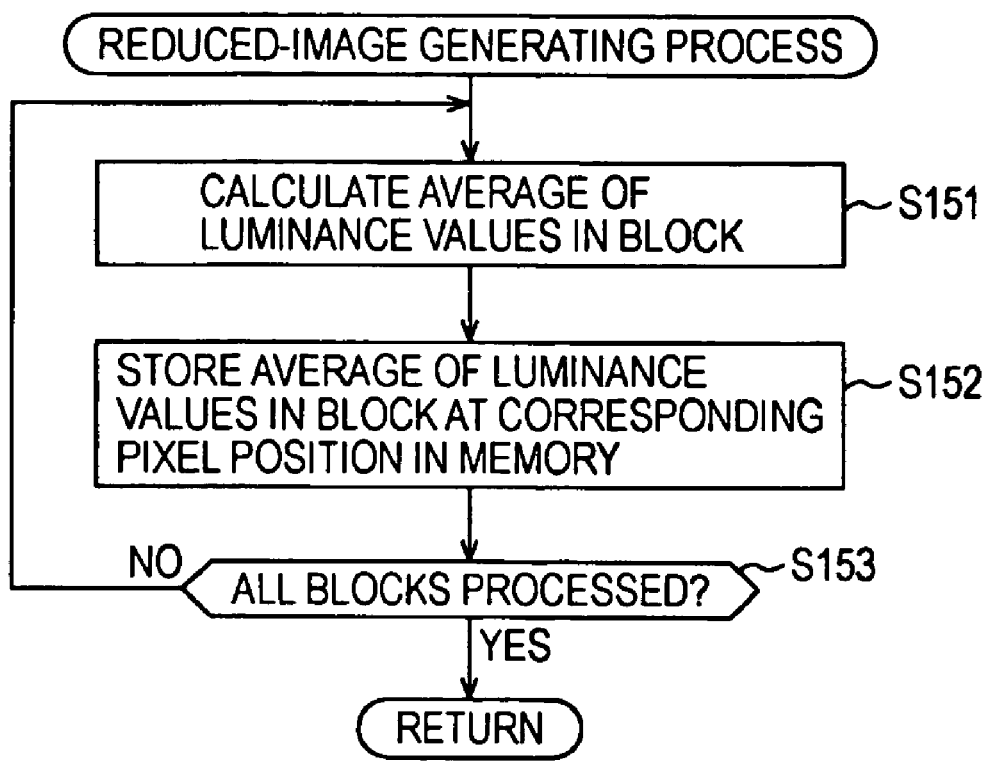
FIG. 26 is a flowchart for explaining details of a reduced-image generating process executed in step S37 shown in FIG. 17.

As will be described later with reference to FIG. 26, the reduced-image generator 181 generates a reduced image corresponding to the image composed of luminance values $L^{(n1)}(p)$. More specifically, the reduced-image generator 181 divides the image composed of luminance values $L^{(n1)}(p)$ into $w_r$ (horizontally)×$h_r$ (vertically) blocks, and generates a reduced image composed of $w_r$ (horizontally)×$h_r$ (vertically) pixels in which average values of the luminance values $L^{(n1)}(p)$ in the individual blocks are arranged correspondingly to the order of the blocks. The reduced-image generator 181 stores the reduced image in the reduced-image memory 182.

Figure 20:
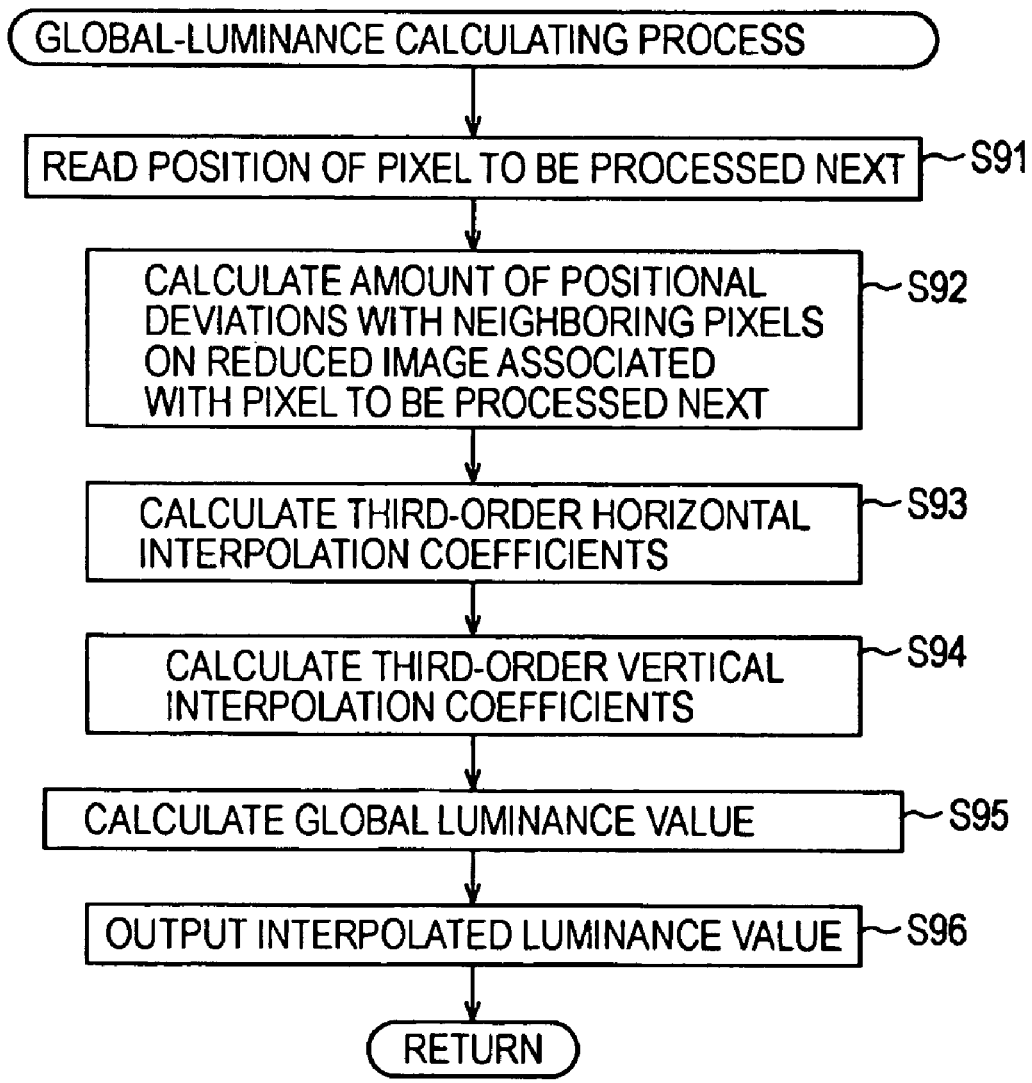
FIG. 20 is a flowchart for explaining details of a global-luminance calculating process executed in step S28 shown in FIG. 16.

As will be described later with reference to FIG. 20, the interpolator 183 calculates global luminance values $L_1^{(n1)}(p)$ of an enlarged image generated by enlarging the reduced image through third-order interpolation so that the enlarged image has the same number of pixels as the original image. The interpolator 183 outputs the global luminance values $L_1^{(n1)}(p)$ to a mapping unit 191-2.

The tone converter 167 tone-compresses the luminance values $L^{(n1)}(p)$ and the global luminance values $L_1^{(n1)}(p)$. The tone converter 167 includes mapping units 191-1 and 191-2.

The mapping unit 191-1 reads a lookup table representing a tone curve from the tone-curve memory 164. The mapping unit 191-1 compresses the tones of luminance values $L^{(n1)}(p)$ according to the lookup table, i.e., according to the tone curve. The mapping unit 191-1 outputs tone-compressed luminance values $L_c^{(n1)}(p)$ to the contrast corrector 168.

The mapping unit 191-2 reads the lookup table representing the tone curve from the tone-curve memory 164. The mapping unit 191-2 tone-compresses the global luminance values $L_1^{(n1)}(p)$ according to the lookup table, i.e., according to the tone curve. The mapping unit 191-2 outputs the tone-compressed global luminance values $L_{c1}^{(n1)}(p)$ to the contrast corrector 168.

Figure 22:
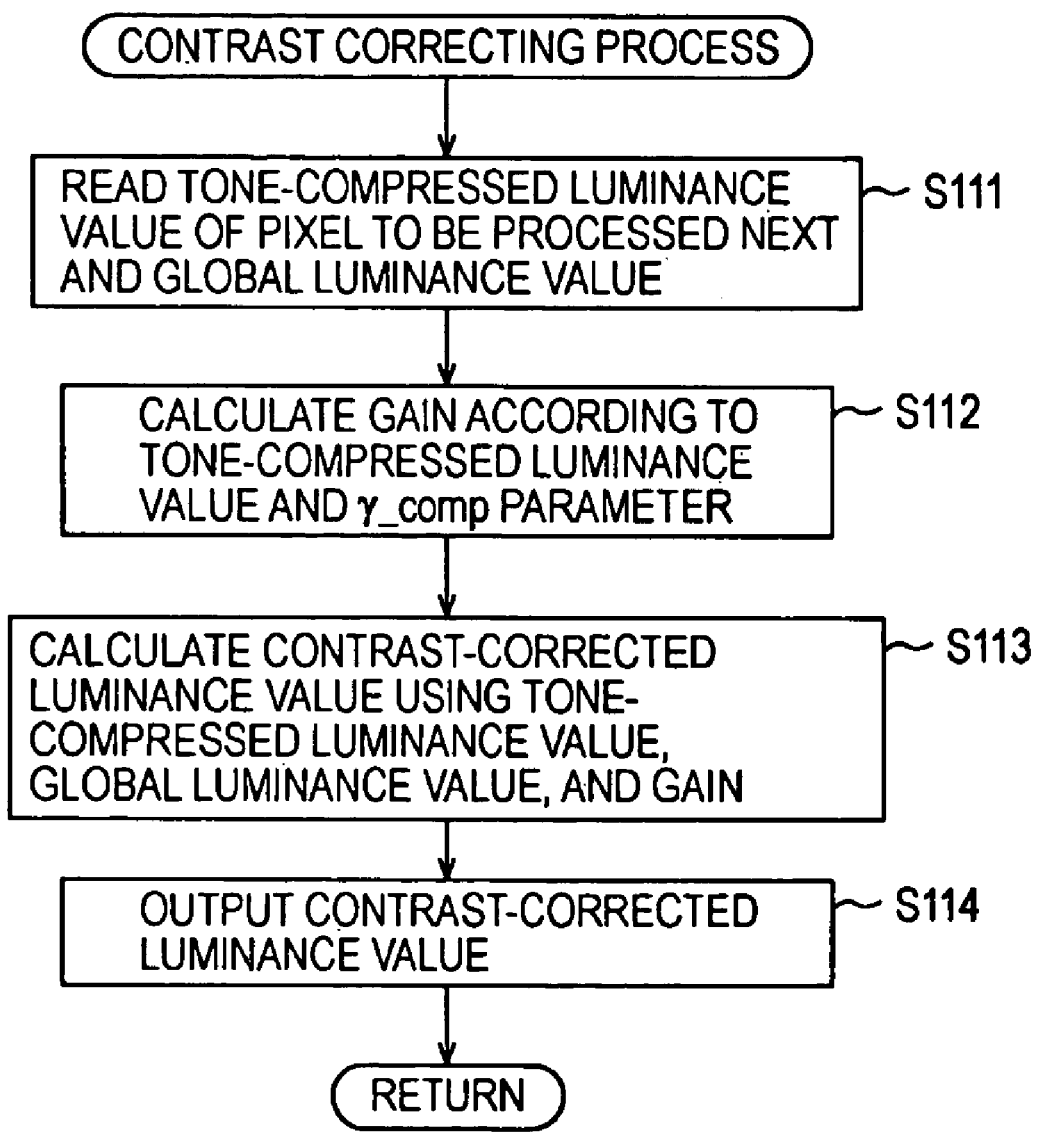
FIG. 22 is a flowchart for explaining details of a contrast correcting process executed in step S30 shown in FIG. 16.

As will be described later with reference to FIG. 22, the contrast corrector 168 corrects the contrast of an image composed of the luminance values $L_c^{(n1)}(p)$ that have been tone-compressed according to the tone curve, on the basis of the γ_comp parameter and the global luminance values $L_{c1}^{(n1)}(p)$ that have been tone-compressed according to the tone curve. The contrast corrector 168 outputs luminance values $L_u^{(n1)}(p)$ having the corrected contrast to the tone correctors 169-1 to 169-3.

Figure 17:
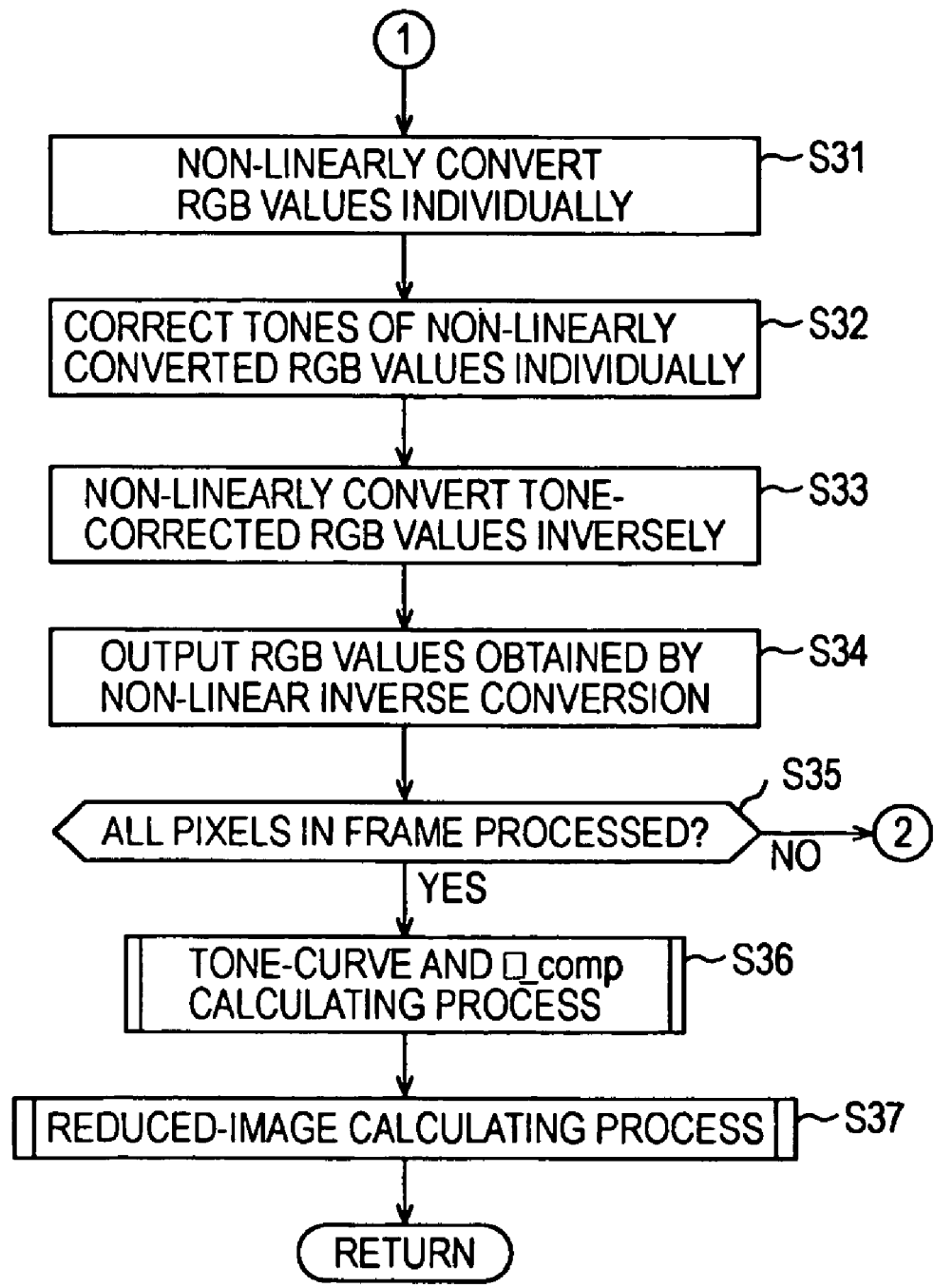
FIG. 17 is a flowchart for explaining details of the tone conversion process executed in step S4 shown in FIG. 15.

As will be described later with reference to FIG. 17, the tone correctors 169-1 to 169-3 correct (convert) the tones of pixel values $R^{(n1)}(p)$, $G^{(n1)}(p)$, and $B^{(n1)}(p)$ obtained through non-linear conversion, respectively. The tone correctors 169-1 to 169-3 output pixel values $R_u^{(n1)}(p)$, $G_u^{(n1)}(p)$, and $B_u^{(n1)}(p)$ having corrected tones to the non-linear inverse converters 170-1 to 170-3, respectively.

The non-linear inverse converters 170-1 to 170-3 execute non-linear inverse conversion on the pixel values $R_u^{(n1)}(p)$, $G_u^{(n1)}(p)$, and $B_u^{(n1)}(p)$ having corrected tones, the non-linear inverse conversion being the inverse of the non-linear conversion executed by the non-linear converters 162-1 to 162-3. The non-linear inverse converters 170-1 to 170-3 output pixel values $R_u(p)$, $G_u(p)$, and $B_u(p)$ obtained through the non-linear inverse conversion to the gamma corrector 144.

The tone converter 143 can be generally classified into three parts on the basis of the types of processing executed. A first part includes the luminance calculator 161, the non-linear converter 162-4, the tone-curve calculator 163, and the reduced-image generator 181. That is, the first part generates a reduced image and calculates a tone curve and a γ_comp parameter. A second part includes the luminance calculator 161, the non-linear converter 162-4, and the tone-curve calculator 163 to the contrast corrector 168. That is, the second part compresses the tones of luminance values of pixels of an input image to correct the contrast using the reduced image, the tone curve, and the γ_comp parameter generated and calculated by the first part. A third part includes the non-linear converters 162-1 to 162-3, the tone correctors 169-1 to 169-3, and the non-linear inverse converters 170-1 to 170-3. That is, the third part adjusts the tones of RGB values of pixels using the luminance values of the pixels having tones converted by the second part.

Figure 5:
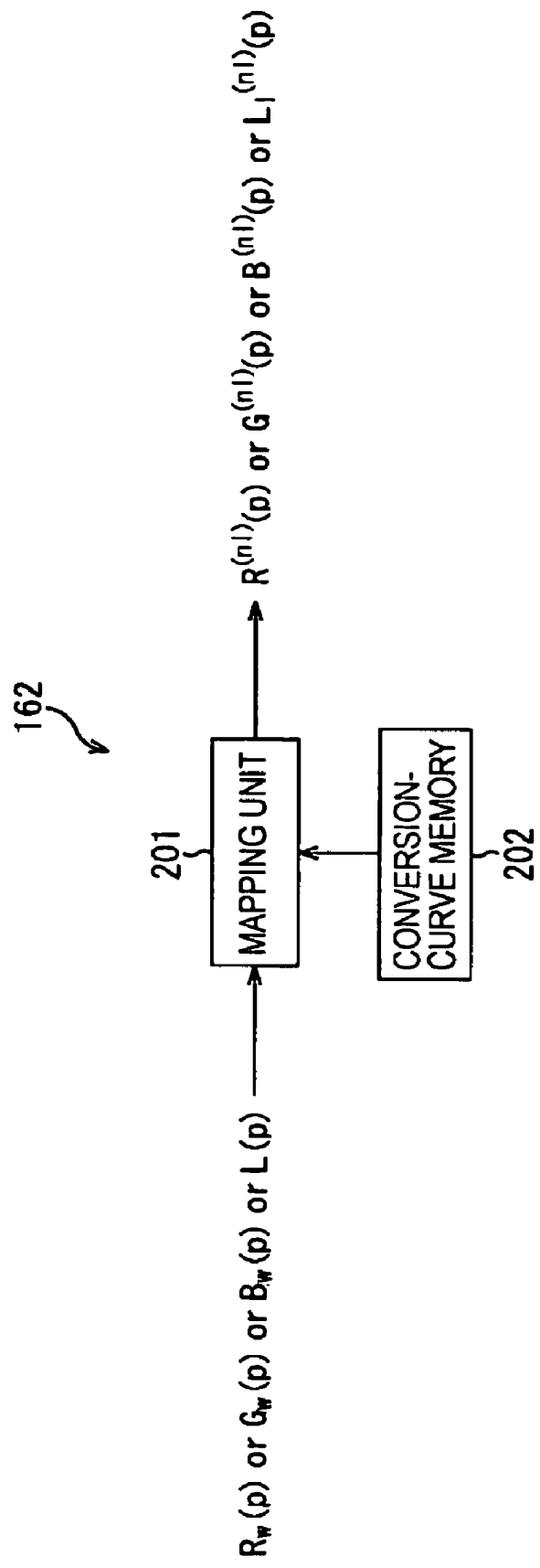
FIG. 5 is a block diagram showing an example of the functional configuration of a non-linear converter shown in FIG. 4.

FIG. 5 is a block diagram showing an example of the functional configuration of the non-linear converter 162 shown in FIG. 4. The non-linear converter 162 includes a mapping unit 201 and a conversion-curve memory 202.

The mapping unit 201 non-linearly converts a pixel value or luminance value input from outside, according to a lookup table representing a conversion curve, stored in the conversion-curve memory 202. The mapping unit 201 outputs a pixel value or luminance value obtained through the non-linear conversion to outside.

Figure 6:
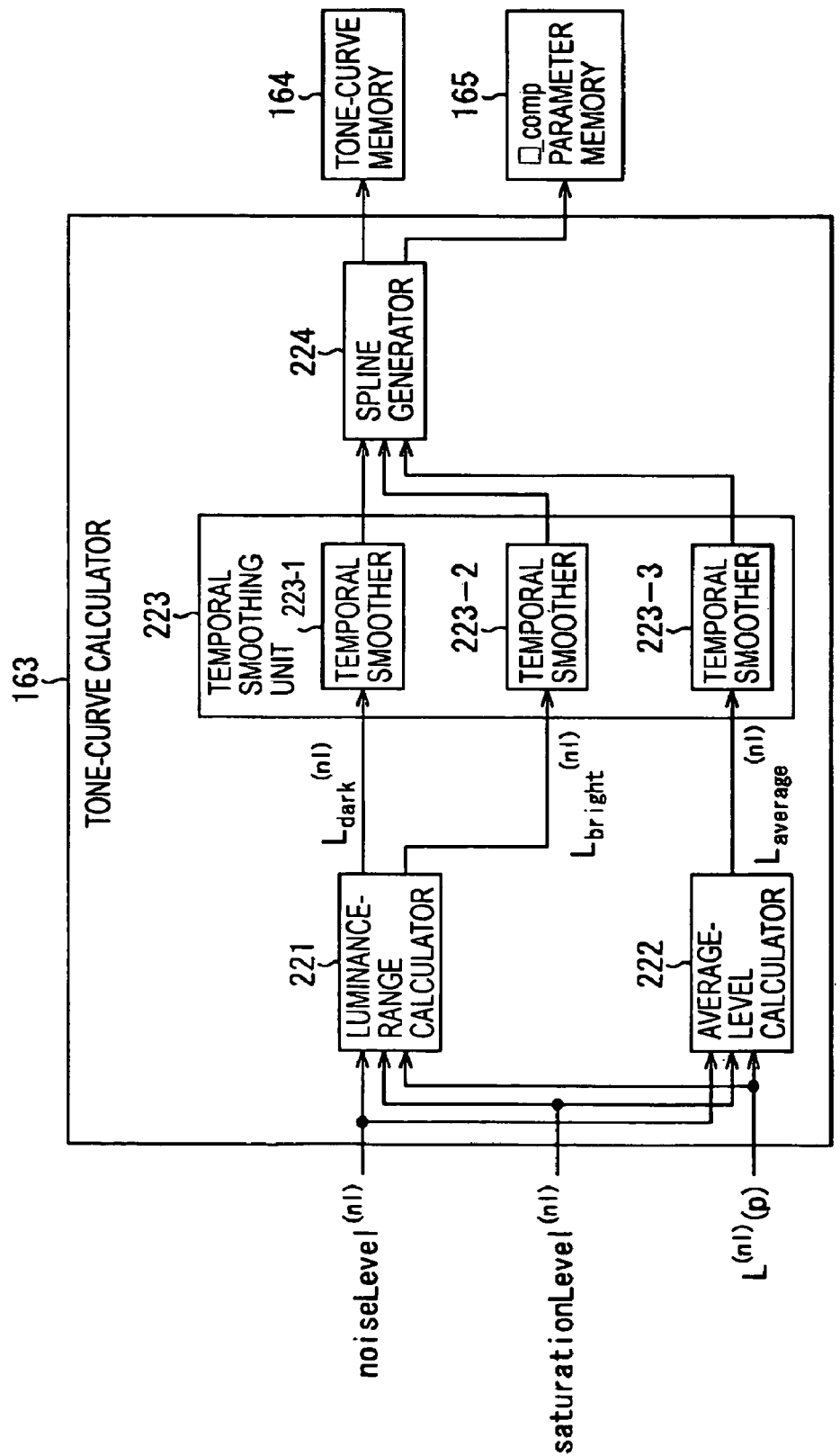
FIG. 6 is a block diagram showing an example of the functional configuration of a tone-curve generator shown in FIG. 4.

FIG. 6 is a block diagram showing an example of the functional configuration of the tone-curve calculator 163 shown in FIG. 4. The tone-curve calculator 163 includes a luminance-range calculator 221, an average-level calculator 222, a temporal smoothing unit 223, and a spline generator 224. The temporal smoothing unit 223 includes three temporal smoothers 223-1 to 223-3.

The luminance-range calculator 221 obtains luminance values $L^{(n1)}(p)$ from the non-linear converter 162-4. Also, the luminance-range calculator 221 reads noiseLevel$^{(n1)}$ representing a noise level of luminance values and saturationLevel$^{(n1)}$ representing a saturation level of luminance values from the internal memory (not shown) of the DSP 116. As will be described later with reference to FIG. 24, the luminance-range calculator 221 calculates a skirt value $L_{dark}^{(n1)}$ and a skirt value $L_{bright}^{(n1)}$. The skirt value $L_{dark}^{(n1)}$ is such a boundary value that the ratio of the number of pixels having luminance values less than or equal to a predetermined boundary value to the total number of pixels is substantially a predetermined value (e.g., 0.5%). the skirt value $L_{bright}^{(n1)}$ is such a boundary value that the ratio of the number of pixels having luminance values greater than or equal to a predetermined boundary value to the total number of pixels is substantially a predetermined value (e.g., 0.5%). The luminance-range calculator 221 outputs the skirt value $L_{dark}^{(n1)}$ to the temporal smoother 223-1 and outputs the skirt value $L_{bright}^{(n1)}$ to the temporal smoother 223-2.

The average-level calculator 222 obtains luminance values $L^{(n1)}(p)$ from the non-linear converter 162-4. The average-level calculator 222 reads noiseLevel$^{(n1)}$ and saturation Level$^{(n1)}$ from the internal memory (not shown) of the DSP 116. As will be described later with reference to FIG. 24, the average-level calculator 222 calculates an average level $L_{average}^{(n1)}$ of the luminance values $L^{(n1)}(p)$ The average-level calculator 222 outputs the average level $L_{average}^{(n1)}$ to the temporal smoother 223-3.

The temporal smoothers 223-1 to 223-3 are formed, for example, by infinite impulse response (IIR) filters. The temporal smoother 223-1 temporally smoothes the skirt value $L_{dark}^{(n1)}$ and outputs a temporally smoothed skirt value $L_{dark-ts}^{(n1)}$ to the spline generator 224. The temporal smoother 223-2 temporally smoothes the skirt value $L_{bright}^{(n1)}$, and outputs a temporally smoothed skirt value $L_{bright-ts}^{(n1)}$ to the spline generator 224. The temporal smoother 223-3 temporally smoothes the average level $L_{average}^{(n1)}$ and outputs a temporally smoothed average value $L_{average-ts}^{(n1)}$ to the spline generator 224.

As will be described later with reference to FIG. 24, the spline generator 224 generates (calculates) a tone curve on the basis of the skirt value $L_{dark-ts}^{(n1)}$, the skirt value $L_{bright-ts}^{(n1)}$, and the average value $L_{average-ts}^{(n1)}$. The spline generator 224 stores a lookup table representing the tone curve in the tone-curve memory 164. Also, as will be described later with reference to FIG. 24, the spline generator 224 generates a γ_comp parameter. The spline generator 224 stores a γ_comp parameter in the γ_comp parameter memory 165.

Figure 7:
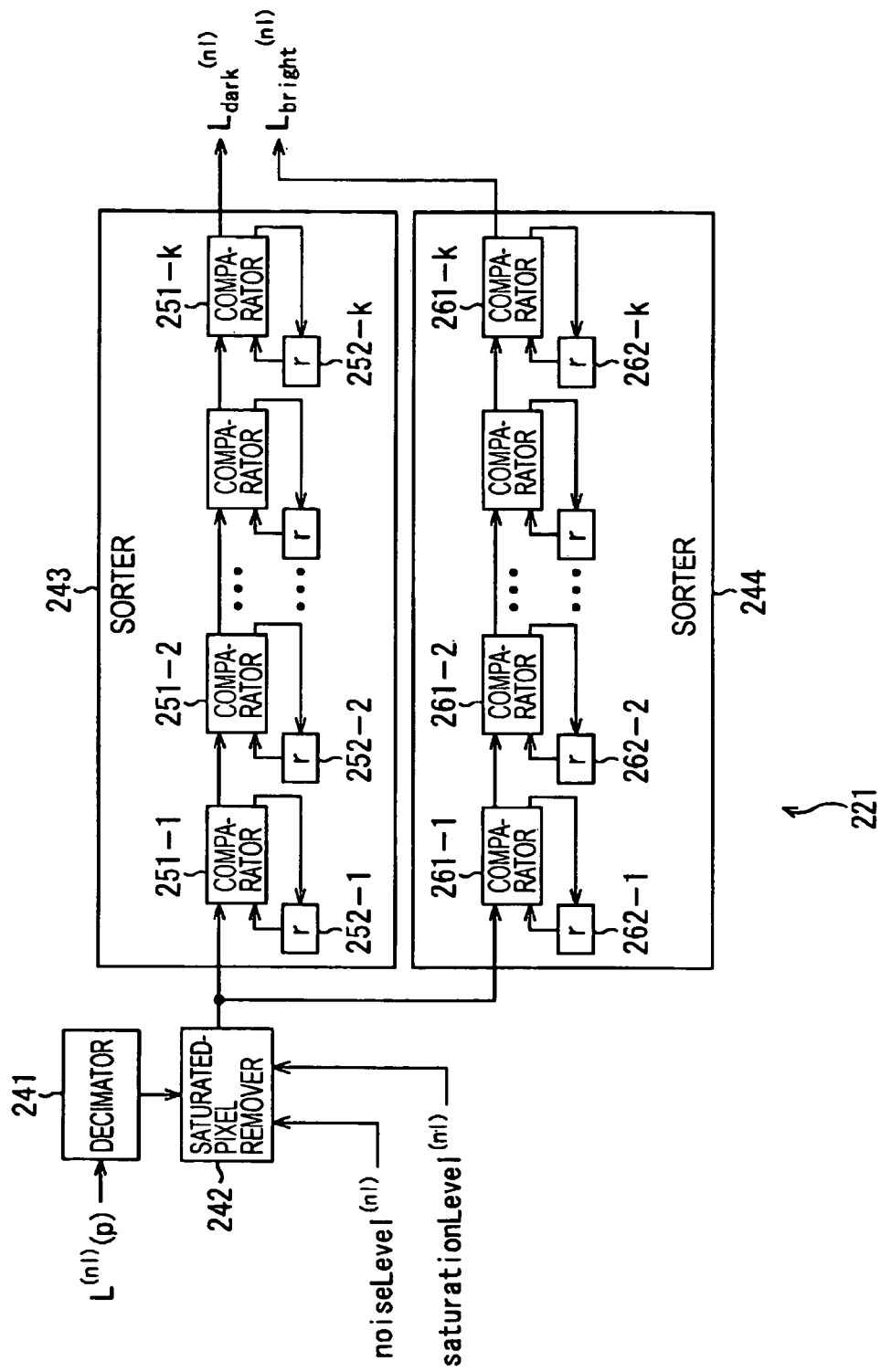
FIG. 7 is a block diagram showing an example of the functional configuration of a luminance-range calculator shown in FIG. 6.

FIG. 7 is a diagram showing an example of the functional configuration of the luminance-range calculator 221 shown in FIG. 6. The luminance-range calculator 221 includes a decimator 241, a saturated-pixel remover 242, a sorter 243, and a sorter 244.

The decimator 241 checks whether the pixel position p of a luminance value $L^{(n1)}(p)$ input from the non-linear converter 162-4 coincides with one of sampling positions provided at predetermined intervals. When it is determined that the pixel position p coincides with a sampling position, the decimator 241 outputs the luminance value $L^{(n1)}(p)$ to the saturated-pixel remover 242.

The saturated-pixel remover 242 reads noiseLevel$^{(n1)}$ and saturationLevel$^{(n1)}$ from the internal memory (not shown) of the DSP 116. When it is determined that the luminance value $L^{(n1)}(p)$ input from the decimator 241 is greater than or equal to noiseLevel$^{(n1)}$ and less than or equal to saturationLevel$^{(n1)}$, the saturated-pixel remover 242 outputs the luminance value $L^{(n1)}(p)$ to the sorters 243 and 244.

The sorter 243 includes comparators 251-1 to 251-k, and registers 252-1 to 252-k respectively associated with the comparators 251-1 to 251-k. Hereinafter, each of the comparators 251-1 to 251-k will be referred to simply as a comparator 251 unless distinction is to be made among the individual comparators 251-1 to 251-k. Also, each of the registers 252-1 to 252-k will be referred to simply as a register 252 unless distinction is to be made among the individual registers 252-1 to 252-k.

The comparator 251-1 compares the luminance value $L^{(n1)}(p)$ input from the saturated-pixel remover 242 with the value of the register 252-1. When the luminance value $L^{(n1)}(p)$ is less than the value of the register 252-1, the comparator 251-1 outputs the current value of the register 252-1 to the succeeding comparator 251-2, and stores the luminance value $L^{(n1)}(p)$ in the register 252-1. On the other hand, when the luminance value $L^{(n1)}(p)$ is greater than or equal to the value of the register 252-1, the comparator 251-1 outputs the luminance value $L^{(n1)}(p)$ directly to the succeeding comparator 251-2.

The comparator 251-2 compares the value input from the preceding comparator 251-1 with the value of the register 252-2. When the value input from the comparator 251-1 is less than the value of the register 252-2, the comparator 251-2 outputs the value of the register 252-2 to the succeeding comparator 251-3, and stores the value input from the comparator 251-1 in the register 252-2. On the other hand, when the value input from the comparator 251-1 is greater than or equal to the value of the register 252-2, the comparator 251-2 outputs the value input from the comparator 251-1 directly to the succeeding comparator 251-3. The comparators 251-3 to 251-k execute processing similarly to the comparator 251-2. Thus, among luminance values $L^{(n1)}(p)$ input, the smallest to k-th smallest values are stored in the registers 252-1 to 252-k in ascending order.

After sorting the luminance values $L^{(n1)}(p)$ of an image of one frame, the sorter 243 outputs the value stored in the register 252-k as a skirt value $L_{dark}^{(n1)}$ to the temporal smoother 223-1.

The sorter 244 includes comparators 261-1 to 261-k, and registers 262-1 to 262-k respectively associated with the comparators 261-1 to 261-k. Hereinafter, each of the comparators 261-1 to 261-k will be referred to simply as a comparator 261 unless distinction is to be made among the individual comparators 261-1 to 261-$k$. Also, each of the registers 262-1 to 262-$k$ will be referred to simply as a register 262 unless distinction is to be made among the individual registers 262-1 to 262-$k$.

The comparator 261-1 compares the luminance value $L^{(n1)}(p)$ input from the saturated-pixel remover 242 with the value of the register 262-1. When the luminance value $L^{(n1)}(p)$ is greater than the value of the register 262-1, the comparator 261-1 outputs the current value of the register 262-1 to the succeeding comparator 261-2, and stores the luminance value $L^{(n1)}(p)$ in the register 262-1. On the other hand, when the luminance value $L^{(n1)}(p)$ is less than or equal to the value of the register 262-1, the comparator 261-1 outputs the luminance value $L^{(n1)}(p)$ directly to the succeeding comparator 261-2.

The comparator 261-2 compares the value input from the preceding comparator 261-1 with the value of the register 262-2. When the value input from the comparator 261-1 is greater than the value of the register 262-2, the comparator 261-2 outputs the value of the register 262-2 to the succeeding comparator 261-3, and stores the value input from the comparator 261-1 in the register 262-2. On the other hand, when the value input from the comparator 261-1 is less than or equal to the value of the register 262-2, the comparator 261-2 outputs the value input from the comparator 261-1 directly to the succeeding comparator 261-3. The comparators 261-3 to 261-$k$ execute processing similarly to the comparator 261-2. Thus, among luminance values $L^{(n1)}(p)$ input, the largest to k-th largest values are stored in the registers 262-1 to 262-$k$ in descending order.

After sorting the luminance values $L^{(n1)}(p)$ of an image of one frame, the sorter 244 outputs the value stored in the register 262-$k$ as a skirt value $L_{bright}^{(n1)}$ to the temporal smoother 223-2.

Figure 8:
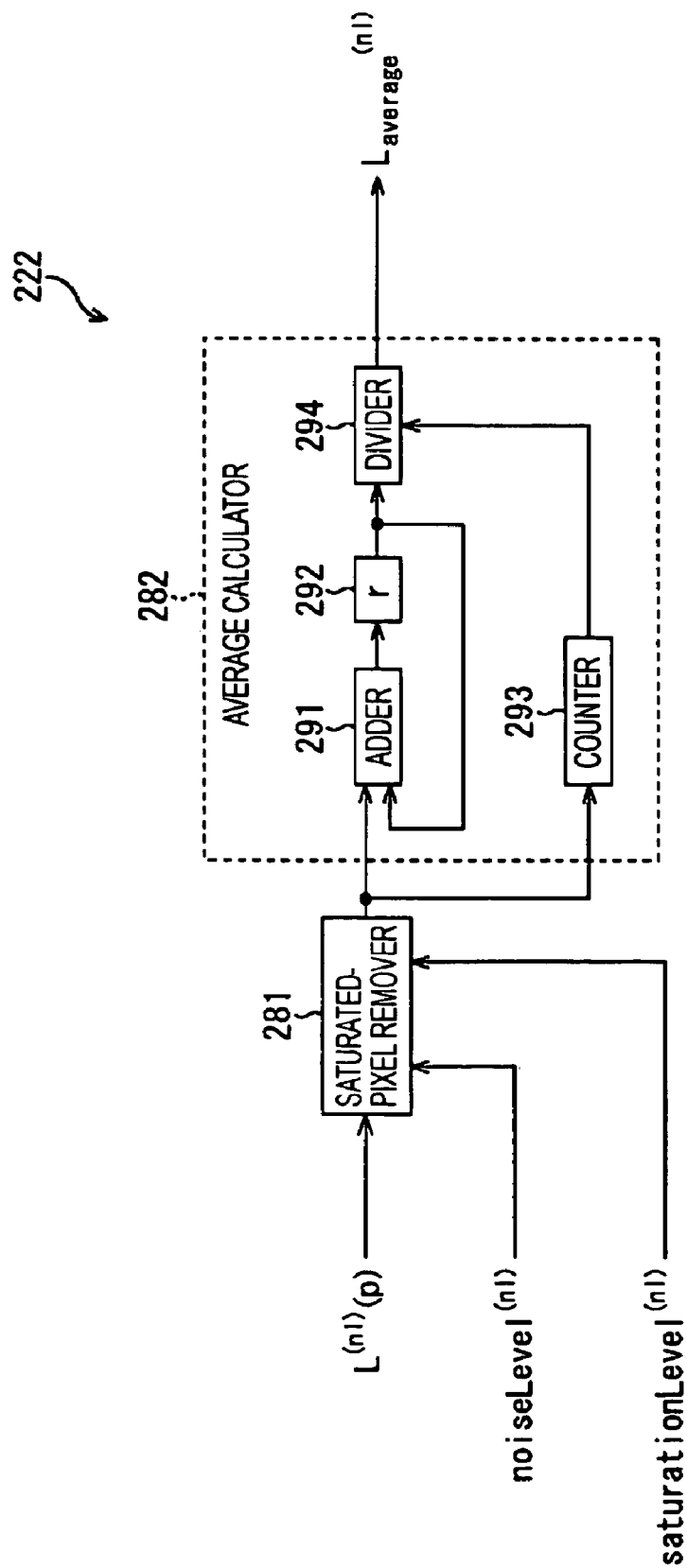
FIG. 8 is a block diagram showing an example of the functional configuration of an average-level calculator shown in FIG. 6.

FIG. 8 is a block diagram showing an example of the functional configuration of the average-level calculator 222 shown in FIG. 6. The average-level calculator 222 includes a saturated-pixel remover 281 and an average calculator 282.

The saturated-pixel remover 281 reads $noiseLevel^{(n1)}$ and $saturationLevel^{(n1)}$ from the internal memory (not shown) of the DSP 116. When a luminance value $L^{(n1)}(p)$ input from the non-linear converter 162-4 is greater than or equal to $noiseLevel^{(n1)}$ and less than or equal to $saturationLevel^{(n1)}$, the saturated-pixel remover 281 outputs the luminance value $L^{(n1)}(p)$ to an adder 291 and a counter 293 of the average calculator 282.

The average calculator 282 includes an adder 291, a register 292, a counter 293, and a divider 294.

The adder 291 adds the luminance value $L^{(n1)}(p)$ input from the saturated-pixel remover 281 to a value stored in the register 292 and stores the result in the register 292. That is, the register 292 stores a total luminance representing a sum of luminance values $L^{(n1)}(p)$.

The counter 293 increments its counter value each time a luminance value $L^{(n1)}(p)$ is input from the saturated-pixel remover 281, thereby counting the number of luminance values $L^{(n1)}(p)$ (number of pixels) included in the total luminance stored in the register 292.

The divider 294 divides the value of the register 292 by the counter value of the counter 293 after the luminance values $L^{(n1)}(p)$ of the pixels of one frame have been summed up, thereby calculating an average level $L_{average}^{(n1)}$ of the luminance values $L^{(n1)}(p)$. The divider 294 outputs the average level $L_{average}^{(n1)}$ to the temporal smoother 223-3.

Figure 9:
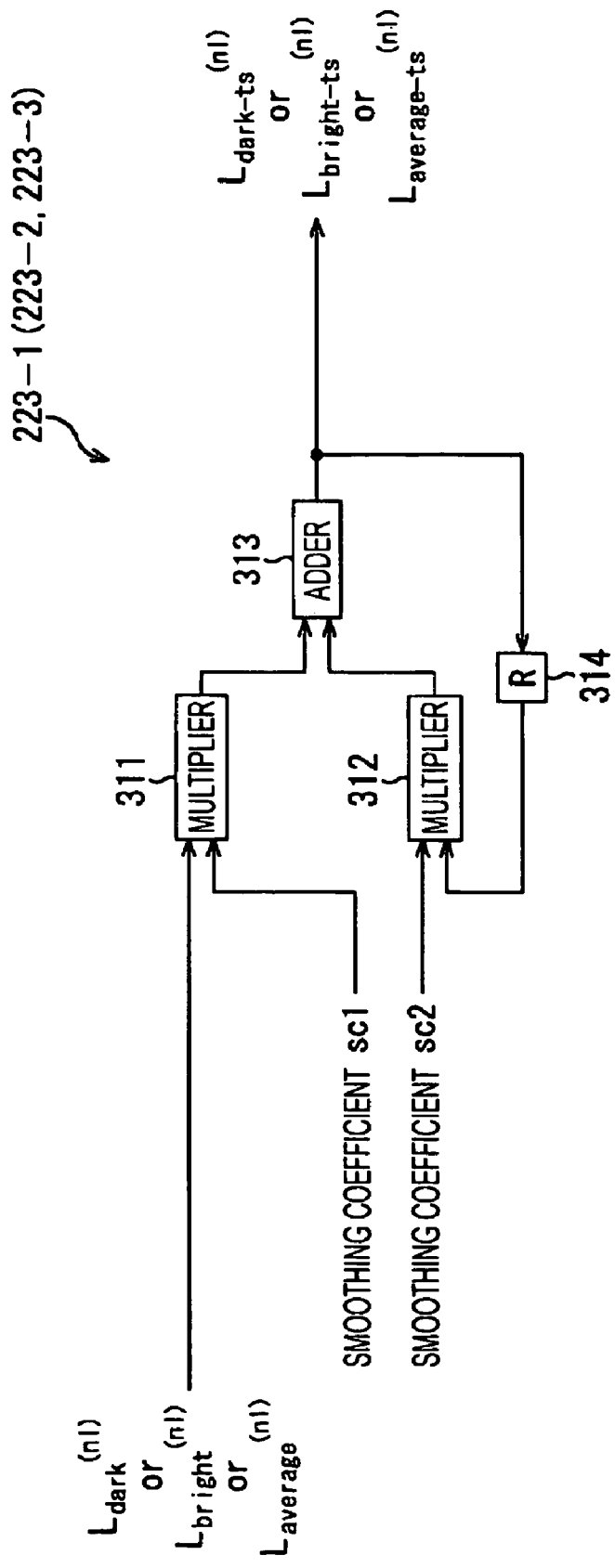
FIG. 9 is a block diagram showing an example of the functional configuration of a temporal smoother shown in FIG. 6.

FIG. 9 is a block diagram showing an example of the functional configuration of the temporal smoothers 223-1 to 223-3. Each of the temporal smoothers 223-1 to 223-3 includes a multiplier 311, a multiplier 312, an adder 313, and a register 314.

The multiplier 311 reads a predetermined smoothing coefficient sc1 from the internal memory (not shown) of the DSP 116. The multiplier 311 multiplies a value input from outside (e.g., a skirt value $L_{dark}^{(n1)}$, a skirt value $L_{bright}^{(n1)}$, or an average level $L_{average}^{(n1)}$) by the smoothing coefficient sc1, and outputs the result to the adder 313.

The multiplier 312 reads a predetermined smoothing coefficient sc2 from the internal memory (not shown) of the DSP 116. The multiplier 312 multiplies a value stored in the register 314 (e.g., a temporally smoothed skirt value $L_{dark\text{-}ts\text{-}pre}^{(n1)}$, a temporally smoothed skirt value $L_{bright\text{-}ts\text{-}pre}^{(n1)}$, or a temporally smoothed average value $L_{average\text{-}ts\text{-}pre}^{(n1)}$, associated with an immediately preceding frame), by the smoothing coefficient sc2, and outputs the result to the adder 313.

The adder 313 adds together the values input from the multipliers 311 and 312, and outputs the result (e.g., a temporally smoothed skirt value $L_{dark\text{-}ts}^{(n1)}$, a temporally smoothed skirt value $L_{bright\text{-}ts}^{(n1)}$ or a temporally smoothed average level $L_{average\text{-}ts}^{(n1)}$) to outside and stores the result in the register 314.

Figure 10:
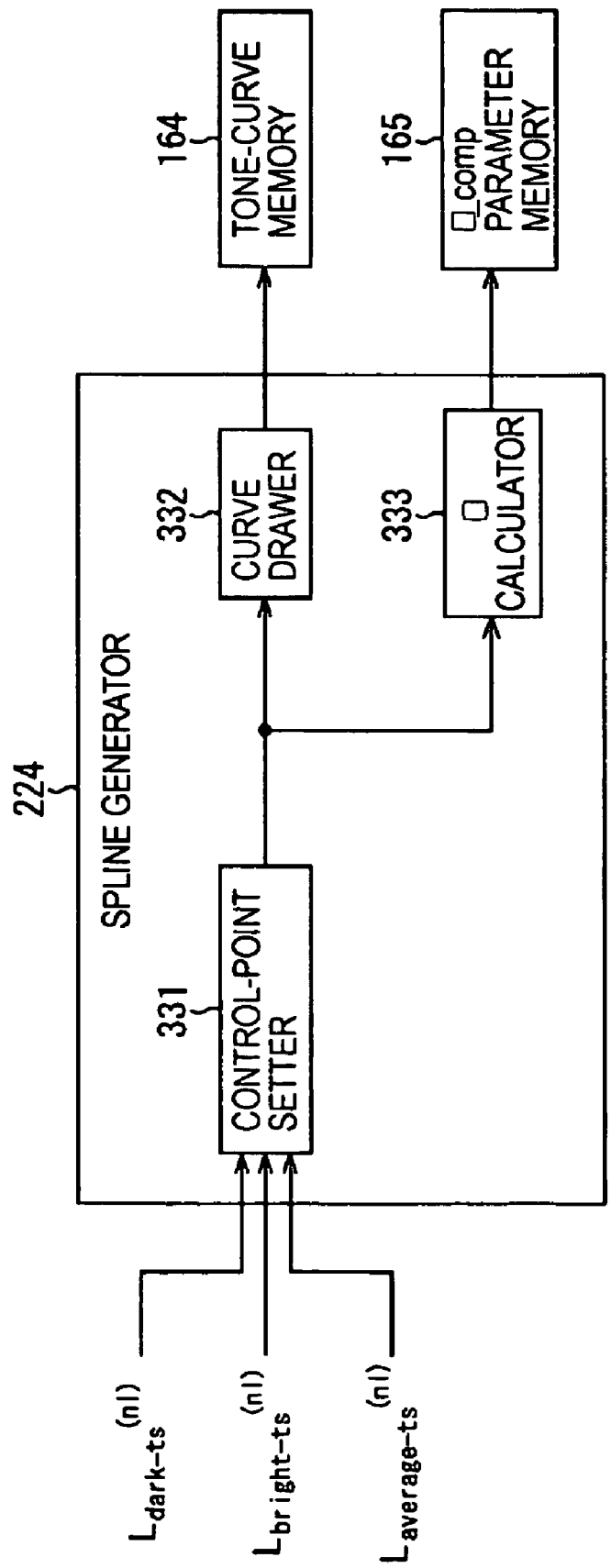
FIG. 10 is a block diagram showing an example of the functional configuration of a spline generator shown in FIG. 6.

FIG. 10 is a block diagram showing an example of the functional configuration of the spline generator 224 shown in FIG. 6. The spline generator 224 includes a control-point setter 331, a curve drawer 332, and a γ calculator 333.

The control-point setter 331 obtains a skirt value $L_{dark\text{-}ts}^{(n1)}$ from the temporal smoother 223-1, obtains a skirt value $L_{bright\text{-}ts}^{(n1)}$ from the temporal smoother 223-2, and obtains an average level $L_{average\text{-}ts}^{(n1)}$ from the temporal smoother 223-3. As will be described later with reference to FIG. 24, the control-point setter 331 sets control points for generating (calculating) a tone curve, and outputs a control-point set representing the positions of the control points to the curve drawer 332 and the γ calculator 333.

As will be described later with reference to FIG. 24, the curve drawer 332 draws (generates) a tone curve on the basis of the control points set by the control-point setter 331. The curve drawer 332 stores a lookup table representing the tone curve in the tone-curve memory 164.

As will be described later with reference to FIG. 24, the γ calculator 333 calculates a γ_comp parameter. The γ calculator 333 stores the γ_comp parameter in the γ_comp parameter memory 165.

Figure 11:
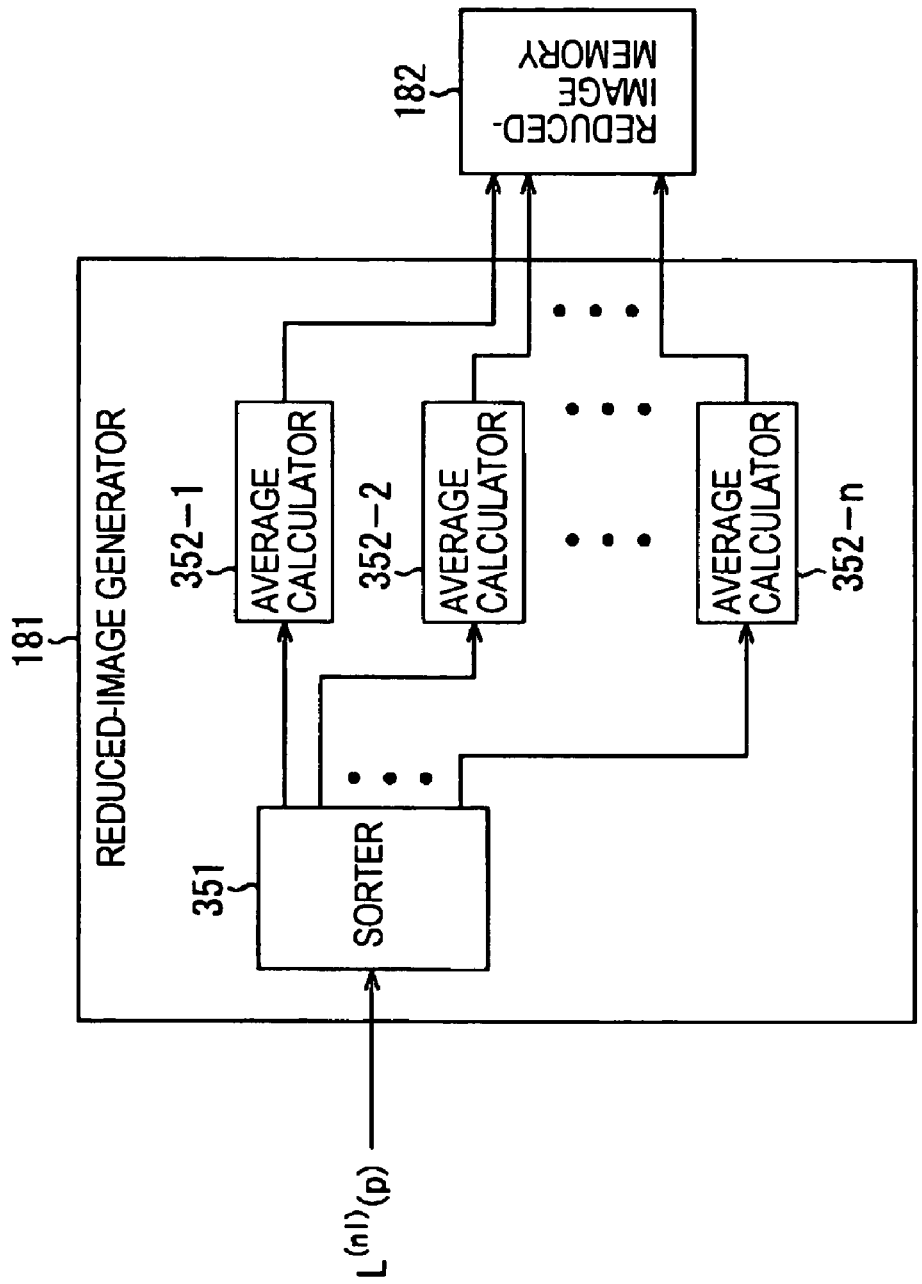
FIG. 11 is a block diagram showing an example of the functional configuration of a reduced-image generator shown in FIG. 4.

FIG. 11 is a diagram showing an example of the functional configuration of the reduced-image generator 181 shown in FIG. 4. The reduced-image generator 181 includes a sorter 351 and average calculators 352-1 to 352-$n$.

The sorter 351 divides an image composed of luminance values $L^{(n1)}(p)$ into $w_r$ (horizontally)×$h_r$ (vertically) blocks, and determines which of the blocks the pixel position p of a luminance value $L^{(n1)}(p)$ input from the non-linear converter 162-4 belongs to. The sorter 351 outputs the luminance value $L^{(n1)}(p)$ to an average calculator that calculates an average of luminance values in the block including the pixel position p among the average calculators 352-1 to 352-$n$.

Each of the average calculators 352-1 to 352-$n$ ($n=w_r \times h_r$) has the same configuration as the average calculator 282 shown in FIG. 8, and it calculates an average of luminance values $L^{(n1)}(p)$ included in a block associated with the average calculator. The average calculators 352-1 to 352-$n$ store average luminance values in the blocks individually associated therewith in the reduced-image memory 182 correspondingly to the order of blocks. Thus, a reduced image composed of $w_r$ (horizontally)×$h_r$ (vertically) pixels having average values of luminance values $L^{(n1)}(p)$ in the individual blocks is generated.

Figure 12:
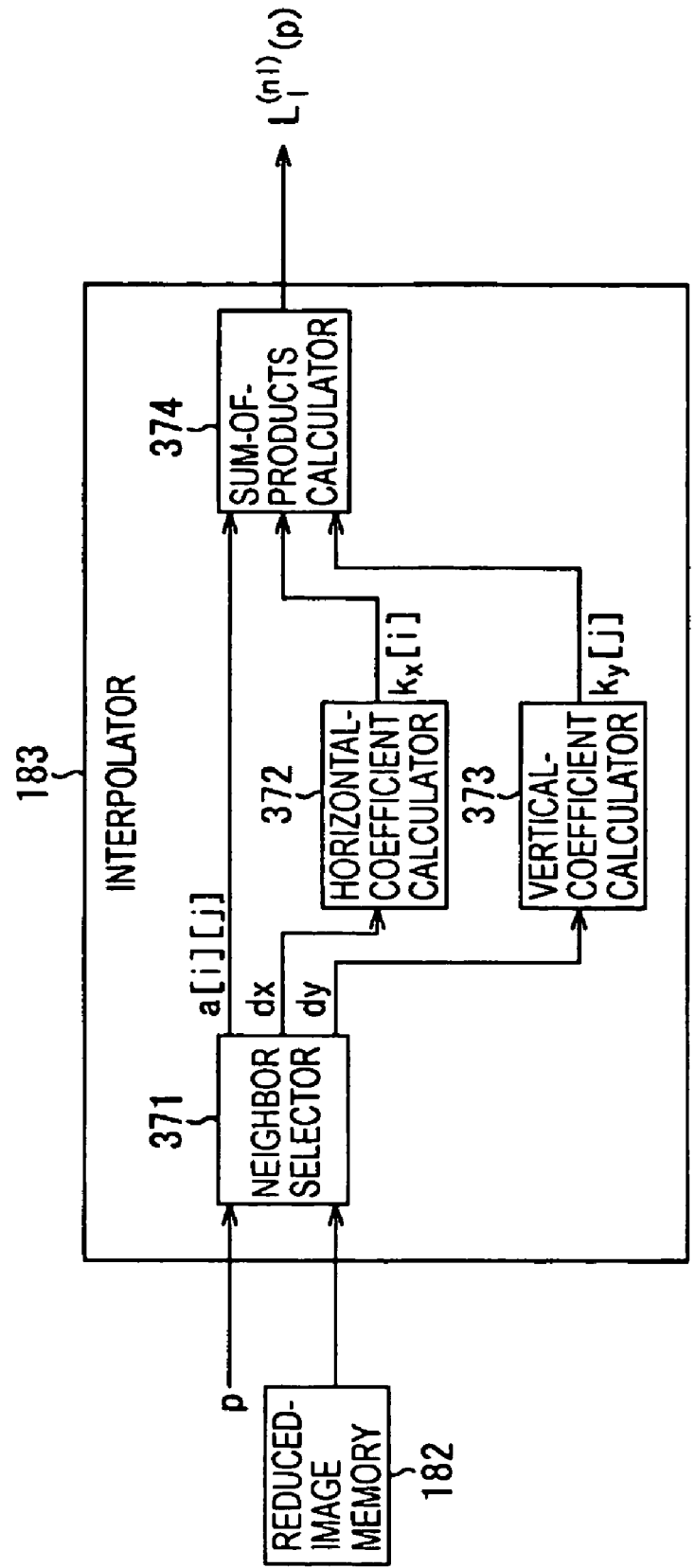
FIG. 12 is a block diagram showing an example of the functional configuration of an interpolator shown in FIG. 4.

FIG. 12 is a block diagram showing an example of the functional configuration of the interpolator 183. The interpolator 183 includes a neighbor selector 371, a horizontal-coefficient calculator 372, a vertical-coefficient calculator 373, and a sum-of-products calculator 374.

The neighbor selector 371 obtains the pixel position p of a pixel relevant to the non-linear conversion executed by the non-linear converter 162-4. As will be described later with reference to FIG. 20, the neighbor selector 371 calculates a position q on a reduced image corresponding to the pixel position p. The neighbor selector 371 extracts neighboring pixels included in a range of 4 (horizontally)×4 (vertically) pixels in the neighborhood of the position q. The neighbor selector 371 outputs pixel values a[i][j] (i and j are natural numbers in ranges of $1 \leq i \leq 4$ and $1 \leq j \leq 4$) of the neighboring pixels to the sum-of-products calculator 374. Also, the neighbor selector 371 calculates a horizontal positional deviation dx and a vertical positional deviation dy between the pixel position p and the neighboring pixels. The neighbor selector 371 outputs the horizontal positional deviation dx to the horizontal-coefficient calculator 372, and outputs the vertical positional deviation dy to the vertical-coefficient calculator 373.

As will be described later with reference to FIG. 20, the horizontal-coefficient calculator 372 calculates third-order horizontal-interpolation coefficients kx[i] (i is a natural number in a range of $1 \leq i \leq 4$) on the basis of the horizontal positional deviation dx. The horizontal-coefficient calculator 372 outputs the interpolation coefficients kx[i] to the sum-of-products calculator 374.

As will be described later with reference to FIG. 20, the vertical-coefficient calculator 373 calculates third-order vertical-interpolation coefficients ky[j] (j is a natural number in a range of $1 \leq j \leq 4$) on the basis of the vertical positional deviation dy. The vertical-coefficient calculator 373 outputs the interpolation coefficients ky[j] to the sum-of-products calculator 374.

As will be described later with reference to FIG. 20, the sum-of-products calculator 374 calculates global luminance values $L_1^{(n1)}(p)$ representing luminance values of a global-luminance image generated by enlarging the reduced image to the original size (number of pixels) through third-order interpolation, using the pixel values a[i][j] of the neighboring pixels, the horizontal-interpolation coefficients kx[i], and the vertical-interpolation coefficient ky[j]. The sum-of-products calculator 374 outputs the global luminance values $L_1^{(n1)}(p)$ to the mapping unit 191-2.

Figure 13:
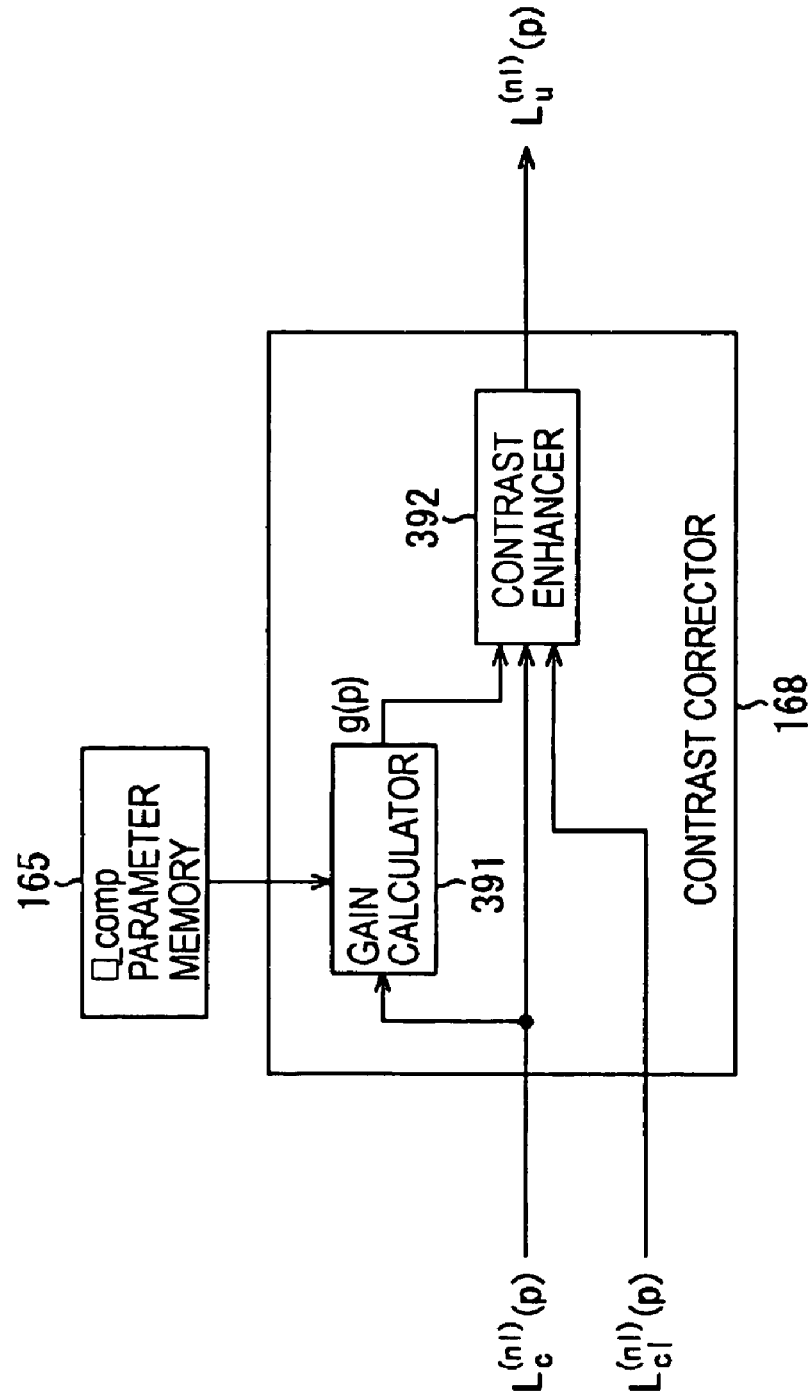
FIG. 13 is a block diagram showing an example of the functional configuration of a contrast corrector shown in FIG. 4.

FIG. 13 is a block diagram showing an example of the functional configuration of the contrast corrector 168 shown in FIG. 4. The contrast corrector 168 includes a gain calculator 391 and a contrast enhancer 392.

The gain calculator 391 obtains luminance values $L^{(n1)}(p)$ from the mapping unit 191-1. As will be described later with reference to FIG. 22, the gain calculator 391 calculates a gain g(p) that is used to correct the contrast of luminance values $L_c^{(n1)}(p)$ that have been tone-compressed according to a tone curve, on the basis of the γ_comp parameter stored in the γ_comp parameter memory 165. The gain calculator 391 outputs the gain g(p) to the contrast enhancer 392.

The contrast enhancer 392 obtains the luminance values $L_c^{(n1)}(p)$ from the mapping unit 191-1, and obtains the global luminance values $L_{c1}^{(n1)}(p)$ from the mapping unit 191-2. As will be described later with reference to FIG. 22, the contrast enhancer 392 corrects contrast so as to enhance the contrast of the image composed of the luminance values $L_c^{(n1)}(p)$, reduced by tone compression. The contrast enhancer 392 outputs the luminance values $L_u^{(n1)}(p)$ having the corrected contrast to the tone correctors 169-1 to 169-3.

Figure 14:
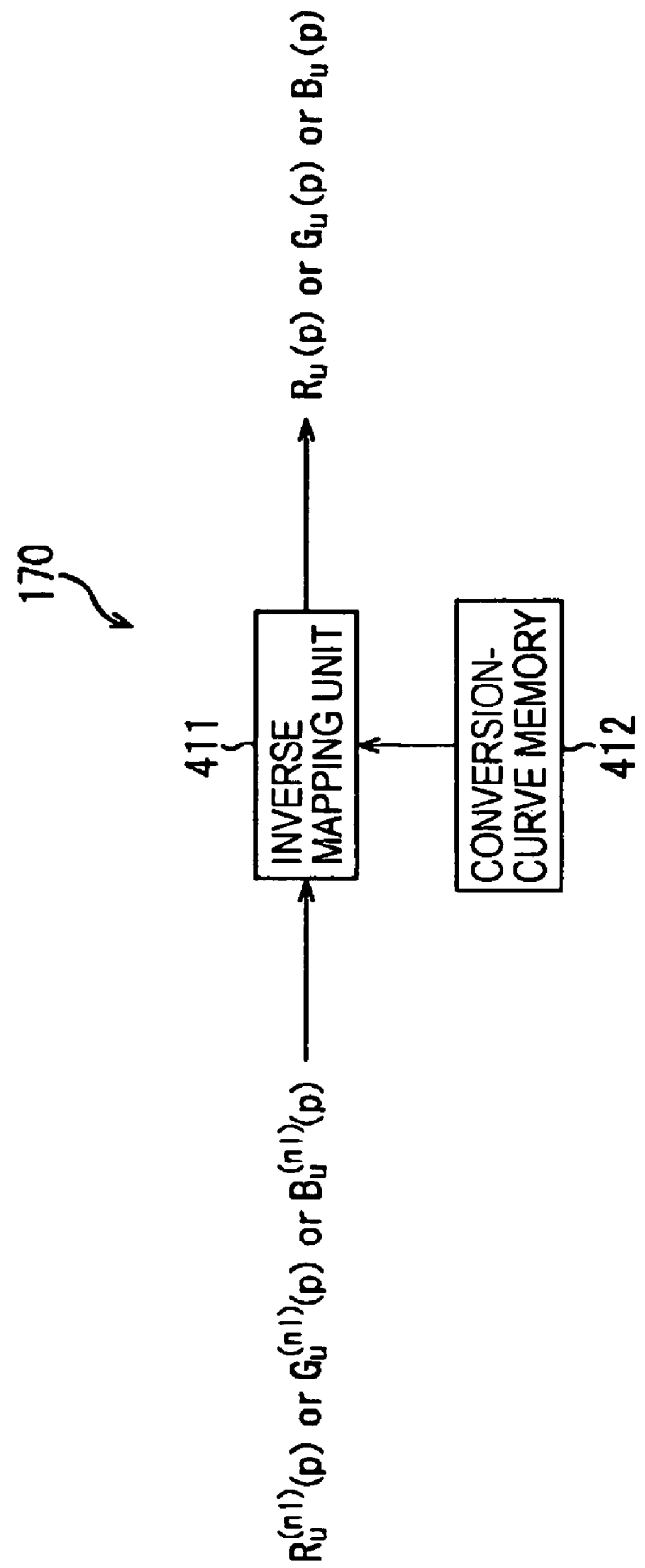
FIG. 14 is a block diagram showing an example of the functional configuration of a non-linear inverse converter shown in FIG. 4.

FIG. 14 is a block diagram showing an example of the functional configuration of the non-linear inverse converter 170. The non-linear inverse converter 170 includes an inverse mapping unit 411 and a conversion-curve memory 412.

The inverse mapping unit 411 executes non-linear inverse conversion on pixel values or luminance values input from outside, according to a lookup table representing a conversion curve, stored in the conversion-curve memory 412, the non-linear inverse conversion being the inverse of the non-linear conversion executed by the non-linear converter 162. The inverse mapping unit 411 outputs pixel values or luminance values obtained through the non-linear inverse conversion to outside.

Figure 15:
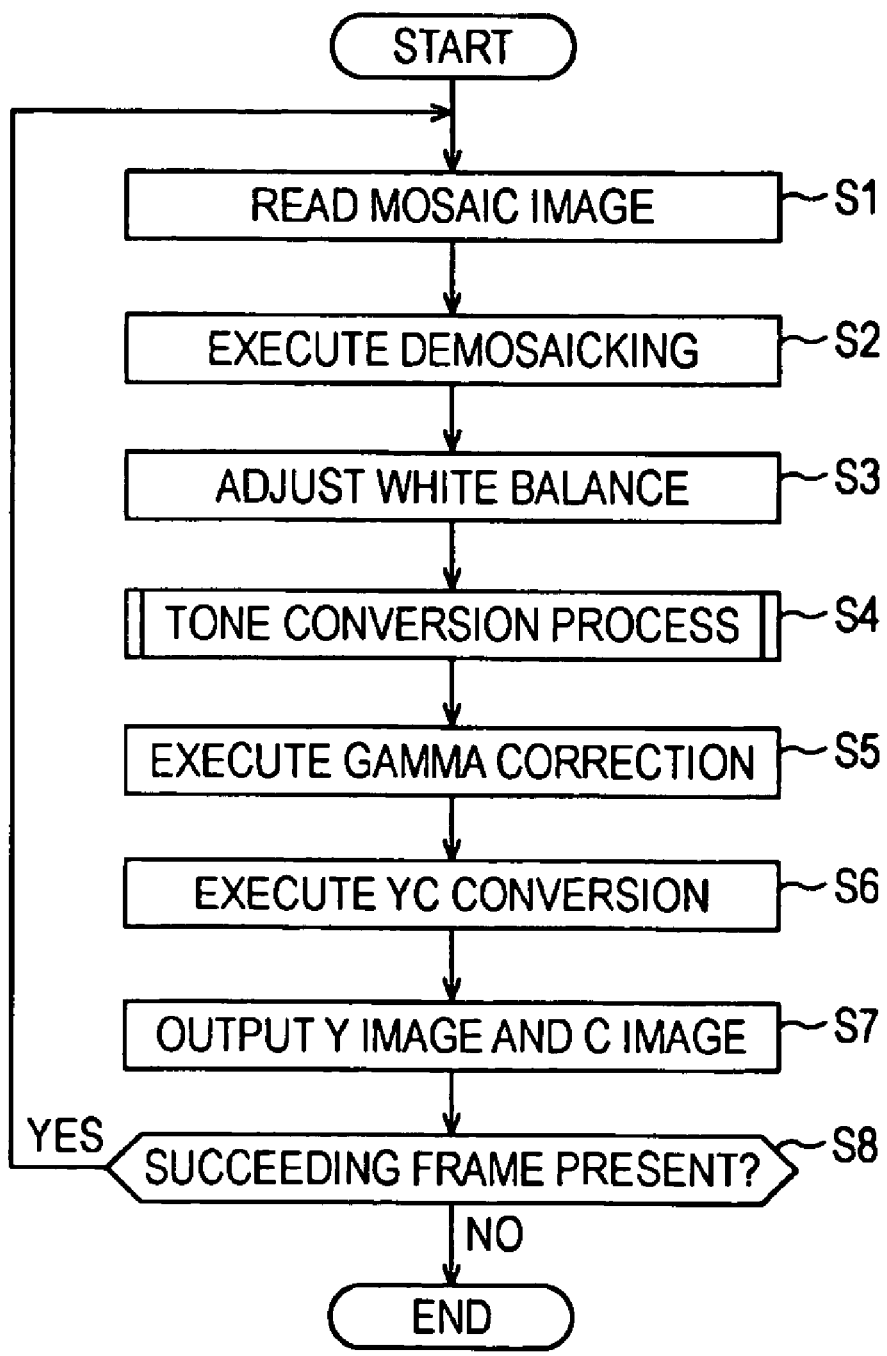
FIG. 15 is a flowchart for explaining image processing executed by the DSP block shown in FIG. 2.

Next, image processing executed by the DSP 116 will be described with reference to a flowchart shown in FIG. 15. The processing is started when, for example, imaging by the digital camera 101 has been started so that supply of a stream of image data (mosaic image) from the A/D converter 115 to the DSP 116 has been started. The image data supplied to the DSP 116 is stored in the internal memory (not shown) of the DSP 116 on arrival.

In step S1, the demosaicking unit 141 reads a mosaic image. More specifically, the demosaicking unit 141 reads a mosaic image of the first frame stored in the internal memory (not shown) of the DSP 116.

In step S2, the demosaicking unit 141 executes demosaicking. That is, the demosaicking unit 141 executes demosaicking on the mosaic image that has been read, thereby generating RGB images. The demosaicking unit 141 supplies the RGB images to the white-balancing unit 142.

In step S3, the white-balancing unit 142 adjusts the white balance of the RGB images. The white-balancing unit 142 supplies the RGB images having the adjusted white balance to the tone converter 143.

In step S4, the tone converter 143 executes a tone conversion process. As will be described later in detail with reference to FIGS. 16 and 17, through the tone conversion process, the tones of the RGB images are converted, and the RGB images having the converted tones are supplied to the gamma corrector 144.

In step S5, the gamma corrector 144 executes gamma correction on the RGB images the gamma corrector 144 supplies the RGB images obtained through the gamma correction to the YC converter 145.

In step S6, the YC converter 145 executes YC conversion. More specifically, the YC converter 145 executes YC matrix processing and chroma-component band limiting, thereby generating a Y image and a C image from the RGB images.

In step S7, the YC converter 145 outputs the Y image and the C image. More specifically, the YC converter 145 outputs the Y image and the C image to the LCD driver 118 or the CODEC 120 as appropriate.

In step S8, the demosaicking unit 141 determines whether a succeeding frame exists. The demosaicking unit 141 determines that a succeeding frame exists when a mosaic image of a succeeding frame is stored in the internal memory (not shown) of the DSP 116, and then the process returns to step S1.

The mosaic image of the next frame is read in step S1, and processing in step S2 and the subsequent steps are executed on the mosaic image.

Then, the processing in steps S1 to S8 is repeated until it is determined in step S8 that no succeeding frame exists, so that mosaic images supplied from the A/D converter 115 are processed sequentially on a frame-by-frame basis.

When it is determined in step S8 that no succeeding frame exists, the process is exited.

Next, the tone conversion process in step S4 shown in FIG. 15 will be described in detail with reference to flowcharts shown in FIGS. 16 and 17.

In step S21, the tone converter 143 reads a reduced image, a tone curve, and γ_comp. More specifically, in the tone converter 143, the neighbor selector 371 (FIG. 12) of the interpolator 183 reads from the reduced-image memory 182 a reduced image generated by the tone conversion process for an immediately preceding frame. The mapping units 191-1 and 191-2 read from the tone-curve memory 164 a lookup table representing a tone curve calculated by the tone conversion process for the immediately preceding frame. The gain calculator 391 (FIG. 13) of the contrast corrector 168 reads from the γ_comp parameter memory 165 a γ_comp parameter calculated by the tone conversion process for the immediately preceding frame.

In step S22, the tone-curve calculator 163 reads noise Level$^{(n1)}$ and saturationLevel$^{(n1)}$. More specifically, in the tone-curve calculator 163, the saturated-pixel remover 242 (FIG. 7) of the luminance-range calculator 221 and the saturated-pixel remover 281 (FIG. 8) of the average-level calculator 222 read noiseLevel$^{(n1)}$ and saturationLevel$^{(n1)}$ from the internal memory (not shown) of the DSP 116.

In step S23, the tone converter 143 reads RGB values of a next pixel for tone conversion. More specifically, in the tone converter 143, the luminance calculator 161 and the non-linear converters 162-1 to 162-3 read the pixel values $R_w(p)$, $G_w(p)$, and $B_w(p)$ at the pixel position p of a next pixel for tone conversion from the internal memory (not shown) of the DSP 116.

In step S24, the luminance calculator 161 calculates a luminance value. More specifically, the luminance calculator 161 calculates a luminance value L(p) associated with the pixel position p, for example, according to equation (1) below:

$$L(p) = \frac{c_R \cdot R_w(p) + c_G \cdot G_w(p) + c_B \cdot B_w(p)}{c_R + c_G + c_B} \quad (1)$$

In equation (1), coefficients $c_R$, $c_G$, and $c_B$ serve to balance the R, G, and B components. For example, $(c_R, c_G, c_B) = (0.3, 0.6, 0.1)$ or $(0.25, 0.5, 0.25)$.

The method of calculating the luminance value L(p) is not limited to the method described above. For example, the luminance value L(p) may be calculated according to equation (2) below, without limitation to a linear combination of the R, G, and B components.

$$L(p) = \max(R_w(p), G_w(p), B_w(p)) \quad (2)$$

The luminance calculator 161 outputs the luminance value L(p) to the non-linear converter 162-4.

In step S25, the non-linear converter 162-4 non-linearly converts the luminance value L(p). More specifically, in the non-linear converter 162-4, the mapping unit 201 (FIG. 5) reads a lookup table representing a conversion curve from the conversion-curve memory 202, and non-linearly converts the luminance value L(p) according to the lookup table (e.g., logarithmic conversion or gamma conversion).

The non-linear conversion in step S25 need not necessarily be executed. However, by executing non-linear conversion according to a monotonically increasing conversion curve as represented with reference to a horizontal axis representing luminance value before the non-linear conversion and a vertical axis representing luminance value after the non-linear conversion, the shape of a histogram of luminance values is prevented from becoming extremely biased towards the dark luminance side or the bright luminance side. This facilitates analysis of the histogram. For example, the conversion curve used for the non-linear conversion may be an exponential curve (with an exponent less than 1), a logarithmic curve, or a curve represented by a function based on an exponential function or logarithmic function.

The mapping unit 201 outputs the luminance value $L^{(n1)}(p)$ obtained through the non-linear conversion to the tone-curve calculator 163, the reduced-image generator 181, the mapping unit 191-1, and the tone correctors 169-1 to 169-3.

In step S26, the tone-curve calculator 163 executes pixel processing for calculating a tone curve. The pixel processing for calculating a tone curve will be described later in detail with reference to FIG. 18. In the pixel processing, luminance values $L^{(n1)}(p)$ are sorted and the total luminance of an entire image is calculated in order to calculate a tone curve.

In step S27, the reduced-image generator 181 executes pixel processing for generating a reduced image. The pixel processing for generating a reduced image will be described later in detail with reference to FIG. 19. In the pixel processing, the total luminance of luminance values $L^{(n1)}(p)$ in each block is calculated in order to generate a reduced image.

In step S28, the interpolator 183 executes a global-luminance calculating process. The global-luminance calculating process will be described later in detail with reference to FIG. 20. In the global-luminance calculating process, a global luminance value $L_1^{(n1)}(p)$ associated with the pixel position p is calculated.

In step S29, the tone converter 143 applies a tone curve to luminance values and global luminance values obtained through non-linear conversion. More specifically, in the tone converter 143, the mapping unit 191-1 converts the luminance values $L^{(n1)}(p)$ into luminance values $L_c^{(n1)}(p)$ according to the tone curve calculated in the tone conversion process for the immediately preceding frame, thereby tone-compressing the luminance values $L^{(n1)}(p)$. The mapping unit 191-1 outputs the luminance values $L_c^{(n1)}(p)$ to the contrast corrector 168. The mapping unit 191-2 converts the global luminance values $L_1^{(n1)}(p)$ into global luminance values $L_{c1}^{(n1)}(p)$ according to the tone curve calculated in the tone conversion process for the immediately preceding frame, thereby tone-compressing the global luminance values $L_1^{(n1)}(p)$. The mapping unit 191-2 outputs the global luminance values $L_{c1}^{(n1)}(p)$ to the contrast corrector 168.

In step S30, the contrast corrector 168 executes a contrast correcting process. The contrast correcting process will be described later in detail with reference to FIG. 22. In the contrast correcting process, the contrast of the image composed of the luminance values $L_c^{(n1)}(p)$ is corrected.

In step S31, the non-linear converters 162-1 to 162-3 non-linearly convert the RGB values, respectively. More specifically, in each of the non-linear converters 162-1 to 162-3, the mapping unit 201 (FIG. 5) reads a lookup table representing a conversion curve from the conversion-curve memory 202, and non-linearly converts the pixel value $R_w(p)$, $G_w(p)$, or $B_w(p)$ read in step S23 according to the lookup table. The mapping units 201 of the non-linear converters 162-1 to 162-3 output the non-linearly converted pixel values $R^{(n1)}(p)$, $G^{(n1)}(p)$, and $B^{(n1)}(p)$ to the tone correctors 169-1 to 169-3, respectively.

The lookup table used by the non-linear converters 162-1 to 162-3 is the same as the lookup table used by the non-linear converter 162-4 in step S25. That is, the pixel values $R_w(p)$, $G_w(p)$, and $B_w(p)$ are non-linearly converted in the same manner as the luminance value $L(p)$.

In step S32, the tone correctors 169-1 to 169-3 correct the tones of the non-linearly converted RGB values, respectively. More specifically, the tone correctors 169-1 to 169-3 calculate pixel values $R_u^{(n1)}(p)$, $G_u^{(n1)}(p)$, and $B_u^{(n1)}(p)$ by correcting the tones of the pixel values $R^{(n1)}(p)$, $G^{(n1)}(p)$, and $B^{(n1)}(p)$ according to equations (3) to (5) below:

$$R_u^{(n1)}(p) = \text{chromagain} \cdot (R^{(n1)}(p) - L^{(n1)}(p)) + L_u^{(n1)}(p) \quad (3)$$

$$G_u^{(n1)}(p) = \text{chromagain} \cdot (G^{(n1)}(p) - L^{(n1)}(p)) + L_u^{(n1)}(p) \quad (4)$$

$$B_u^{(n1)}(p) = \text{chromagain} \cdot (B^{(n1)}(p) - L^{(n1)}(p)) + L_u^{(n1)}(p) \quad (4)$$

where chromagain is a predetermined coefficient for adjusting the color saturation of each of the RGB components.

That is, the pixel value $R_u^{(n1)}(p)$, $G_u^{(n1)}(p)$, or $B_u^{(n1)}(p)$ is calculated by multiplying a pixel value of a differential image by chromagain, the differential image representing the difference between an image having the pixel value $R^{(n1)}(p)$, $G^{(n1)}(p)$, or $B^{(n1)}(p)$ and an image having the luminance value $L^{(n1)}(p)$ before tone conversion, and adding an image having the luminance value $L_u^{(n1)}(p)$ obtained through contrast correction. Thus, the luminance values obtained through tone conversion are reflected on the non-linearly converted RGB values.

The tone correctors 169-1 to 169-3 output the pixel values $R_u^{(n1)}(p)$, $G_u^{(n1)}(p)$, and $B_u^{(n1)}(p)$ having the corrected tones to the non-linear inverse converters 170-1 to 170-3, respectively.

In step S33, the non-linear inverse converters 170-1 to 170-3 execute non-linear inverse conversion on the RGB values having the corrected tones. More specifically, in each of the non-linear inverse converters 170-1 to 170-3, the inverse mapping unit 411 (FIG. 14) reads a lookup table representing a conversion curve from the conversion-curve memory 412, and executes non-linear inverse conversion on the pixel value $R_u^{(n1)}(p)$, $G_u^{(n1)}(p)$, or $B_u^{(n1)}(p)$ according to the lookup table, the non-linear inverse conversion being the inverse of the non-linear conversion executed in step S31.

In step S34, the non-linear inverse converters 170-1 to 170-3 output the RGB values obtained through the non-linear inverse conversion. More specifically, the inverse mapping units 411 of the non-linear inverse converters 170-1 to 170-3 output the pixel values $R_u(p)$, $G_u(p)$, and $B_u(p)$ to the gamma corrector 144, respectively.

In step S35, the tone converter 143 checks whether all the pixels in the frame have been processed. When it is determined that all the pixels in the frame have not been processed, the process returns to step S23, and the processing in steps S23 to S35 is repeated until it is determined in step S35 that all the pixels in the frame have been processed. That is, tone conversion is executed on all the pixels in the frame that is currently being processed, sequentially on a pixel-by-pixel basis (e.g., in order of raster scanning).

When it is determined in step S35 that all the pixels in the frame have been processed, the process proceeds to step S36.

In step S36, the tone-curve calculator 163 executes a tone-curve and γ_comp calculating process. The tone-curve and γ_comp calculating process will be described later in detail with reference to FIG. 24. In the tone-curve and γ_comp calculating process, a tone-curve and a γ_comp parameter for the current frame under tone conversion are calculated.

In step S37, the reduced-image generator 181 executes a reduced-image generating process. The reduced-image generating process will be described later in detail with reference to FIG. 26. In the reduced-image generating process, a reduced image is generated.

Figure 18:
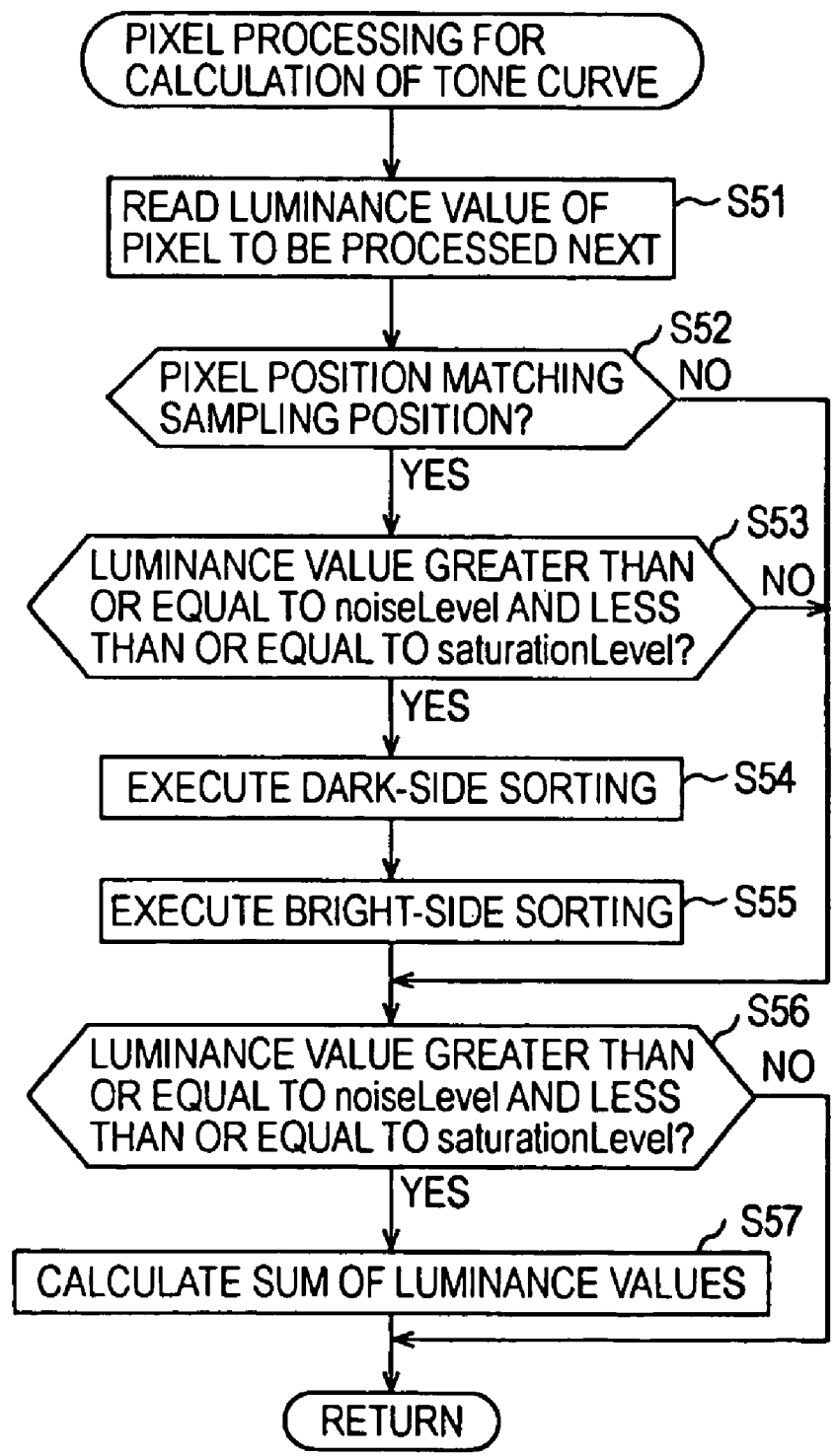
FIG. 18 is a flowchart for explaining details of pixel processing for calculation of a tone curve, executed in step S26 shown in FIG. 16.

Next, the pixel processing for calculation of a tone curve in step S26 shown in FIG. 16 will be described in detail with reference to a flowchart shown in FIG. 18.

In step S51, the tone-curve calculator 163 reads the luminance value of a next pixel to be processed. More specifically, in the tone-curve calculator 163, the decimator 241 (FIG. 7) of the luminance-range calculator 221 and the saturated-pixel remover 281 of the average-level calculator 222 read from the non-linear converter 162-4 the luminance value $L^{(n1)}(p)$ of a pixel at a pixel position p, the luminance value $L^{(n1)}(p)$ having been obtained through the non-linear conversion in step S25 described earlier with reference to FIG. 16.

In step S52, the decimator 241 checks whether the pixel position p coincides with a sampling position. More specifically, the decimator 241 checks whether the pixel position p of the luminance value $L^{(n1)}(p)$ that has been read coincides with one of sampling positions provided at predetermined intervals. The decimator 241 outputs the luminance value $L^{(n1)}(p)$ when it is determined that the pixel position p coincides with one of the sampling positions.

In step S53, the saturated-pixel remover 242 checks whether the luminance value $L^{(n1)}(p)$ is greater than or equal to noiseLevel$^{(n1)}$ and less than or equal to saturationLevel$^{(n1)}$. When it is determined that the luminance value $L^{(n1)}(p)$ is greater than or equal to noiseLevel$^{(n1)}$ and less than or equal to saturationLevel$^{(n1)}$, the saturated-pixel remover 242 outputs the luminance value $L^{(n1)}(p)$ to the sorters 243 and 244. The process then proceeds to step S54.

In step S54, the sorter 243 executes dark-side sorting. More specifically, in the sorter 243, the comparator 251-1 compares a value stored in the register 252-1 with the luminance value $L^{(n1)}(p)$. When the luminance value $L^{(n1)}(p)$ is less than the value of the register 252-1, the comparator 251-1 outputs the value stored in the register 252-1 to the succeeding comparator 251-2 and stores the luminance value $L^{(n1)}(p)$ in the register 252-1. On the other hand, when the luminance value $L^{(n1)}(p)$ is greater than or equal to the value of the register 252-1, the comparator 251-1 outputs the luminance value $L^{(n1)}(p)$ directly to the succeeding comparator 251-2. The succeeding comparators 251-2 to 251-$k$ execute processing in similar manners. Thus in the end, among the luminance values $L^{(n1)}(p)$ of pixels at the sampling positions in the frame, the smallest luminance value $L^{(n1)}(p)$ to the k-th smallest luminance value $L^{(n1)}(p)$ are stored in the registers 252-1 to 252-$k$ in ascending order.

In step S55, the sorter 244 executes bright-side sorting. More specifically, in the sorter 244, the comparator 261-1 compares a value stored in the register 262-1 with the luminance value $L^{(n1)}(p)$. When the luminance value $L^{(n1)}(p)$ is greater than the value of the register 262-1, the comparator 261-1 outputs the value stored in the register 262-1 to the succeeding comparator 261-2 and stores the luminance value $L^{(n1)}(p)$ in the register 262-1. On the other hand, when the luminance value $L^{(n1)}(p)$ is less than or equal to the value of the register 262-1, the comparator 261-1 outputs the luminance value $L^{(n1)}(p)$ directly to the succeeding comparator 261-2. The succeeding comparators 261-2 to 261-$k$ execute processing in similar manners. Thus, in the end, among the luminance values $L^{(n1)}(p)$ of pixels at the sampling positions in the frame, the largest luminance value $L^{(n1)}(p)$ to the k-th largest luminance value $L^{(n1)}(p)$ are stored in the registers 262-1 to 262-$k$ in descending order.

When it is determined in step S53 that the luminance value $L^{(n1)}(p)$ is less than noiseLevel$^{(n1)}$ or greater than saturation- Level$^{(n1)}$, the process skips steps S54 and S55 and proceeds to step S56. That is, luminance values $L^{(n1)}(p)$ less than noiseLevel$^{(n1)}$ or greater than saturationLevel$^{(n1)}$ are excluded from items that are considered in the dark-side sorting and bright-side sorting.

When it is determined in step S52 that the pixel position p does not coincide with any sampling position, the process skips steps S53 to S55 and proceeds to step S56. Thus, the number of pixels that are considered in the dark-side sorting and bright-side sorting is restricted.

In step S56, the saturated-pixel remover 281 (FIG. 8) of the average-level calculator 222 checks whether the luminance value $L^{(n1)}(p)$ is greater than or equal to noiseLevel$^{(n1)}$ and less than or equal to saturationLevel$^{(n1)}$, similarly to the processing in step S53 by the saturated-pixel remover 242 of the luminance-range calculator 221. When it is determined that the luminance value $L^{(n1)}(p)$ is greater than or equal to noiseLevel$^{(n1)}$ and less than or equal to saturationLevel$^{(n1)}$, the saturated-pixel remover 281 outputs the luminance value $L^{(n1)}(p)$ to the adder 291 and the counter 293 of the average calculator 282. The process then proceeds to step S57.

In step S57, the average-level calculator 222 calculates a total luminance value. The pixel processing for calculation of a tone curve is then exited. More specifically, the adder 291 reads a total luminance value representing a current sum of luminance values, stored in the register 292, and adds the input luminance value $L^{(n1)}(p)$. The adder 291 stores the result in the register 292. Furthermore, the counter 293 increments its counter value by 1. That is, the counter value of the counter 293 represents the number of pixels whose luminance values $L^{(n1)}(p)$ have been summed into the total luminance value.

When it is determined in step S56 that the luminance value $L^{(n1)}(p)$ is less than noiseLevel$^{(n1)}$ or greater than saturationLevel$^{(n1)}$, the process skips step S57, and the pixel processing for calculation of a tone curve is exited. That is, luminance values $L^{(n1)}(p)$ less than noiseLevel$^{(n1)}$ or greater than saturationLevel$^{(n1)}$ are excluded from items that are considered in calculating an average luminance value.

Figure 19:
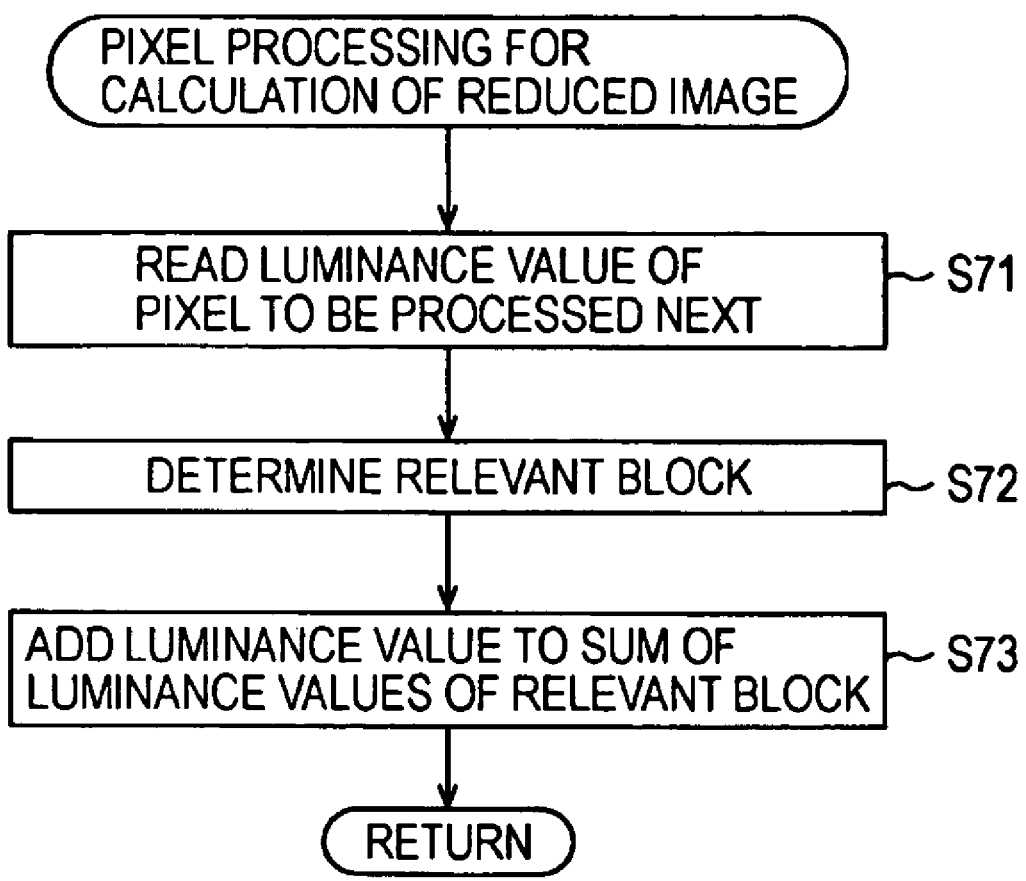
FIG. 19 is a flowchart for explaining details of pixel processing for generation of a reduced image, executed in step S27 shown in FIG. 16.

Next, the pixel processing for generation of a reduced image, executed in step S27 shown in FIG. 16, will be described in detail with reference to a flowchart shown in FIG. 19.

In step S71, the sorter 351 (FIG. 11) of the reduced-image generator 181 reads the luminance value of a next pixel to be processed. More specifically, the sorter 351 reads from the non-linear converter 162-4 the luminance value $L^{(n1)}(p)$ of the pixel at a pixel position p, the luminance value $L^{(n1)}(p)$ having been obtained through the non-linear conversion executed in step S25 described earlier with reference to FIG. 16.

In step S72, the sorter 351 determines a relevant block. More specifically, the sorter 351 determines which of the $w_r$ (horizontally)$\times h_r$ (vertically) predetermined blocks of the image the pixel position p belongs to.

In step S73, the average calculator 352 adds the luminance value $L^{(n1)}(p)$ to the total luminance value of the relevant block. The pixel processing for generation of a reduced image is exited. More specifically, the sorter 351 outputs the luminance value $L^{(n1)}(p)$ to the average calculator 352, which calculates an average luminance value of the block including the pixel position p. The average calculator 352 adds the luminance value $L^{(n1)}(p)$ to the total luminance value of the relevant block.

Next, the global-luminance calculating process executed in step S28 shown in FIG. 16 will be described with reference to a flowchart shown in FIG. 20.

In step S91, the neighbor selector 371 (FIG. 12) of the interpolator 183 reads the pixel position of a pixel to be processed next. More specifically, the neighbor selector 371 reads the pixel position p of a next pixel to be processed from the non-linear converter 162-4.

In step S92, the neighbor selector 371 calculates positional deviations between the next pixel to be processed and associated neighboring pixels on a reduced image. More specifically, assuming that the number of pixels of the mosaic image is $w_m$ (horizontally)$\times h_m$ (vertically) and that the number of pixels of the reduced image is $w_r$ (horizontally)$\times h_r$ (vertically), the neighbor selector 371 calculates a position q=(qx, qy) on the reduced image corresponding to the pixel position p=(px, py) according to equations (6) to (8) below:

$$bx = w_m / w_r \tag{6}$$

$$by = h_m / h_r \tag{7}$$

$$q = (qx, qy) = (px/bx - 0.5, py/by - 0.5) \tag{8}$$

Figure 21:
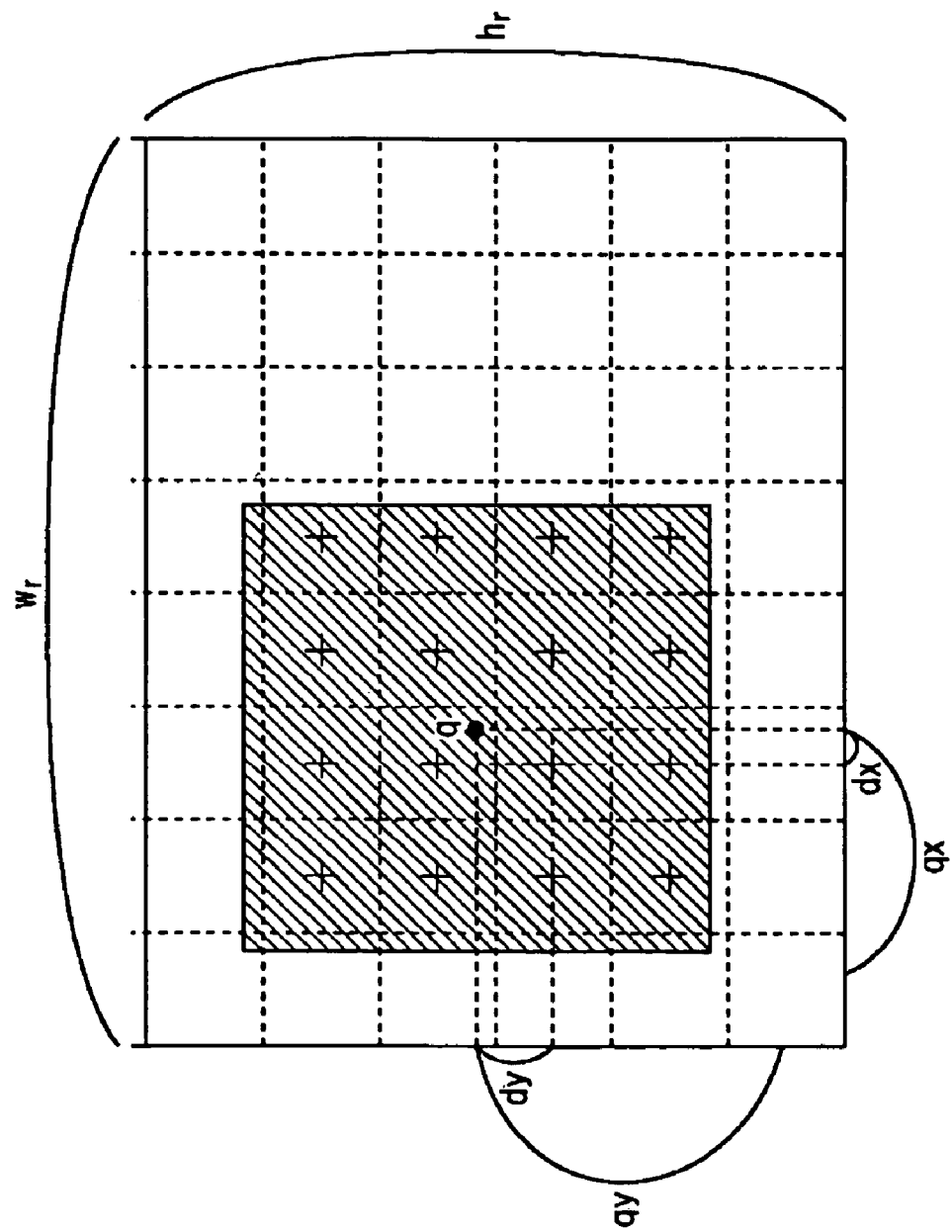
FIG. 21 is a diagram for explaining processing executed by the interpolator shown in FIG. 4.

The neighbor selector 371 extracts neighboring pixels, i.e., pixels in the range of 4 (horizontally)$\times$4 (vertically) pixels in the neighborhood of the position q. In the case of an example shown in FIG. 21, pixels indicated by "+" marks, located in the range of qx−2<x<qx+2 and qy−2<y<qy+2, are extracted as neighboring pixels.

The neighbor selector 371 defines the horizontal positional deviation dx and vertical positional deviation dy between the pixel position p and the neighboring pixels by the difference between the position q and the position of a pixel that is nearest to the position q in the left downward direction in the reduced image. That is, the positional deviations (dx, dy)= (fractional part of qx, fractional part of qy).

The neighbor selector 371 outputs the horizontal positional deviation dx to the horizontal-coefficient calculator 372, outputs the vertical positional deviation dy to the vertical-coefficient calculator 373, and outputs the pixel values a[i][j] (i and j are natural numbers in ranges of $1 \leq i \leq 4$ and $1 \leq j \leq 4$) of the neighboring pixels to the sum-of-products calculator 374.

In step S93, the horizontal-coefficient calculator 372 calculates third-order horizontal-interpolation coefficients. More specifically, on the basis of the horizontal positional deviation dx, the horizontal-coefficient calculator 372 calculates third-order horizontal-interpolation coefficients kx[i] (i is a natural number in a range of $1 \leq i \leq 4$) according to equations (9) and (10) below:

$$z = |dx - i + 2| \tag{9}$$

$$k_x[i] = \begin{cases} (3z^3 - 6z^2 + 4)/6 & (z < 1) \\ (-z^3 + 6z^2 - 12z + 8)/6 & (1 <= z < 2) \\ 0 & \text{Otherwise} \end{cases} \tag{10}$$

The horizontal-coefficient calculator 372 outputs the interpolation coefficients kx[i] to the sum-of-products calculator 374.

In step S94, the vertical-coefficient calculator 373 calculates third-order vertical-interpolation coefficients. More specifically, on the basis of the vertical positional deviation dy, the vertical-coefficient calculator 373 calculates third-order vertical-interpolation coefficients ky[j] (j is a natural number in a range of $1 \leq j \leq 4$) according to equations (11) and (12) below:

$$z = |dy - j + 2| \quad (11)$$

$$k_y[j] = \begin{cases} (3z^3 - 6z^2 + 4)/6 & (z < 1) \\ (-z^3 + 6z^2 - 12z + 8)/6 & (1 <= z < 2) \\ 0 & \text{Otherwise} \end{cases} \quad (12)$$

The vertical-coefficient calculator 373 outputs the interpolation coefficients ky[j] to the sum-of-products calculator 374.

Equations (9) to (12) given above are examples of equations that are often used for third-order interpolation. The interpolation coefficients kx[i] and ky[j] may be calculated according to other equations as long as sufficiently smooth interpolation can be achieved.

In step S95, the sum-of-products calculator 374 calculates a global luminance value. More specifically, the sum-of-products calculator 374 calculates a sum of products according to equation (13) below using the pixel values a[i][j] of the neighboring pixels, the horizontal-interpolation coefficients kx[i], and the vertical-interpolation coefficients ky[j], thereby calculating a global luminance value $L_1^{(n1)}(p)$ at the pixel position p:

$$L_1^{(n1)}(p) = \sum_{i=1}^{4} \sum_{j=1}^{4} a[i][j] \cdot k_x[i] \cdot k_y[j] \quad (13)$$

In step S96, the sum-of-products calculator 374 outputs the global luminance value $L_1^{(n1)}(p)$ to the mapping unit 191-2. The global-luminance calculating process is then exited.

A global-luminance image composed of global luminance values $L_1^{(n1)}(p)$ is an image generated by enlarging a reduced image composed of $w_r$ (horizontally)×$h_r$ (vertically) pixels into an original size (number of pixels) through third-order interpolation. That is, a global-luminance image is an image composed of components of quite low frequencies extracted from an original image (composed of luminance values $L^{(n1)}(p)$).

Next, a contrast correcting process in step S30 shown in FIG. 16 will be described with reference to a flowchart shown in FIG. 22.

In step S111, the contrast corrector 168 reads a tone-compressed luminance value and global luminance value of a pixel to be processed next. More specifically, in the contrast corrector 168, the gain calculator 391 and the contrast enhancer 392 (FIG. 13) read from the mapping unit 191-1 a luminance value $L_c^{(n1)}(p)$ that has been tone-compressed according to a tone curve in step S29 described earlier with reference to FIG. 16. Also, the contrast enhancer 392 reads from the mapping unit 191-2 a global luminance value $L_{c1}^{(n1)}(p)$ that has been tone-compressed according to a tone curve in step S29 described earlier with reference to FIG. 16.

In step S112, the gain calculator 391 calculates a gain on the basis of a tone-compressed luminance value and a γ_comp parameter. More specifically, the gain calculator 391 calculates a gain g(p) on the basis of a luminance value $L_c^{(n1)}(p)$ that has been tone-compressed according to a tone curve and on the basis of a γ_comp parameter, according to equations (14) and (15) below:

$$k(p) = \begin{cases} 1 & L_c^{(n1)}(p) > L_{max}^{(n1)} \\ \frac{L_c^{(n1)}(p) - L_{mid}^{(n1)}}{L_{max}^{(n1)} - L_{mid}^{(n1)}} & L_{mid}^{(n1)} \le L_c^{(n1)}(p) \le L_{max}^{(n1)} \\ \frac{L_c^{(n1)}(p) - L_{mid}^{(n1)}}{L_{min}^{(n1)} - L_{mid}^{(n1)}} & L_{min}^{(n1)} \le L_c^{(n1)}(p) < L_{mid}^{(n1)} \\ 1 & L_c^{(n1)}(p) < L_{min}^{(n1)} \end{cases} \quad (14)$$

$$g(p) = \left(\frac{contrastGain}{\gamma_{comp}} - 1\right) \cdot (1 - k(p)) \quad (15)$$

In equation (15), contrastGain is a predetermined constant.

The gain calculator 391 outputs the gain g(p) to the contrast enhancer 392.

In step S113, the contrast enhancer 392 calculates a contrast-corrected luminance value using the tone-compressed luminance value and global luminance value and the gain. More specifically, the contrast enhancer 392 calculates a contrast-corrected luminance value $L_u^{(n1)}(p)$ using the tone-compressed luminance value $L_c^{(n1)}(p)$ and global luminance value $L_{c1}^{(n1)}(p)$ and the gain g(p), according to equation (16) below:

$$L_u^{(n1)}(p) = g(p) \cdot (L_c^{(n1)}(p) - L_{c1}^{(n1)}(p)) + L_c^{(n1)}(p) \quad (16)$$

The image composed of luminance values ($L_c^{(n1)}(p) - L_{c1}^{(n1)}(p)$) is obtained by subtracting a global-luminance image from an image composed of luminance values $L_c^{(n1)}(p)$, the global luminance image being composed of components of quite low frequencies of the image composed of luminance values $L_c^{(n1)}(p)$. Thus, the image composed of luminance values $L_u^{(n1)}(p)$ is an image in which the frequency components other than components of quite low frequencies of the image composed of luminance values $L_c^{(n1)}(p)$ are enhanced by the gain g(p).

In the image composed of luminance values $L_c^{(n1)}(p)$ that have been tone-compressed according to a tone curve, contrast is reduced compared with the original image composed of luminance values $L^{(n1)}(p)$. The degree of reduction of contrast depends on the slope of the tone curve, and the degree of reduction increases as the slope of the tone curve decreases. Thus, by executing correction so as to enhance the contrast of a tone-compressed image in accordance with the reciprocal of the slope of the tone curve, it is possible to achieve a contrast that is global to the contrast of an image before tone compression. However, when correction is executed similarly for pixels having luminance value $L_c^{(n1)}(p)$ in the vicinity of noiseLevel$^{(n1)}$ or saturationLevel$^{(n1)}$, clipping could occur, i.e., corrected luminance values could be less than noise Level$^{(n1)}$ or greater than saturationLevel$^{(n1)}$. This results in loss of details of the image in some cases.

Figure 23:
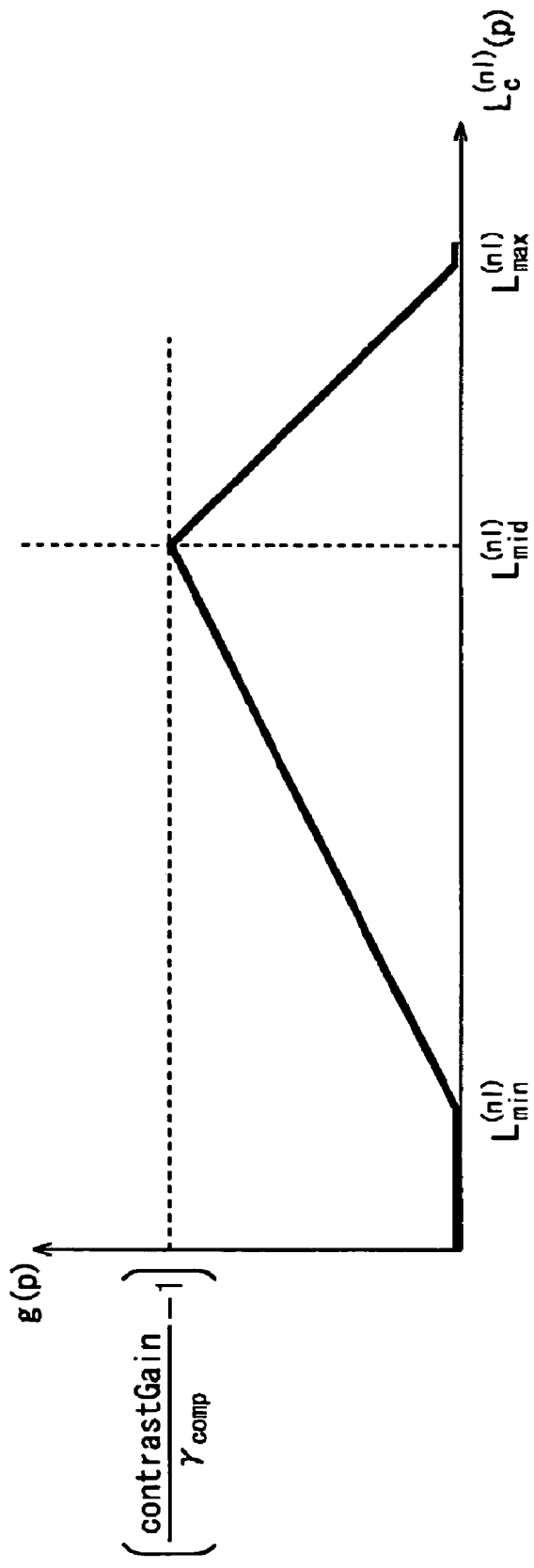
FIG. 23 is a graph showing relationship between gain g(p) and luminance value $L_c^{(n1)}(p)$.

FIG. 23 is a graph showing relationship between the luminance value $L_c^{(n1)}(p)$ and the gain g(p) calculated according to equations (14) and (15). The gain g(p) takes on a maximum value when the luminance value $L_c^{(n1)}(p)$ is at a predetermined intermediate luminance level $L_{mid}^{(n1)}$ that is substantially in the middle of a range of possible values of luminance values $L_c^{(n1)}(p)$, the gain g(p) linearly decreases as the luminance value $L_c^{(n1)}(p)$ approaches a minimum value $L_{min}^{(n1)}$ or a maximum value $L_{max}^{(n1)}$ of the range of possible values of luminance values $L_c^{(n1)}(p)$, and the gain g(p) is 0 when the luminance value $L_c^{(n1)}(p)$ is less than the minimum value $L_{min}^{(n1)}$ or greater than the maximum value $L_{max}^{(n1)}$. Thus, the contrast of luminance components in the vicinity of the intermediate luminance level $L_{mid}^{(n1)}$ is enhanced compared with the contrast of luminance components in the vicinity of the minimum value $L_{min}^{(n1)}$ or the maximum value $L_{max}^{(n1)}$. More specifically, contrast is enhanced more strongly as luminance values become closer to the intermediate luminance level $L_{mid}^{(n1)}$, and contrast is not substantially enhanced for luminance values in the vicinity of the minimum value $L_{min}^{(n1)}$ or the maximum value $L_{max}^{(n1)}$.

In step S114, the contrast enhancer 392 outputs the contrast-corrected luminance value. The contrast correcting process is then exited. More specifically, the contrast enhancer 392 outputs the contrast-corrected luminance value $L_u^{(n1)}(p)$ to the tone correctors 169-1 to 169-3.

As described above, the contrast corrector 168 enhances contrast of components of lower-intermediate to high frequencies, not including components of quite low frequencies, of the image composed of the luminance values $L_c^{(n1)}(p)$. Thus, local overshoot of edge portions, which become apparent when contrast of only high-frequency components is enhanced, does not occur, so that an image that appears natural with an enhanced contrast can be obtained.

Furthermore, since correction is executed so that contrast is enhanced more strongly as luminance levels become closer to the intermediate luminance level $L_{mid}^{(n1)}$ and contrast is not substantially corrected for luminance values in the vicinity of the minimum value $L_{min}^{(n1)}$ or the maximum value $L_{max}^{(n1)}$, white clipping or black clipping rarely occurs.

Next, the tone-curve and γ_comp calculating process executed in step S36 shown in FIG. 17 will be described with reference to FIG. 17.

In step S131, the luminance-range calculator 221 (FIG. 6) of the tone-curve calculator 163 calculates dark-side and bright-side luminance values from results of dark-side and bright-side sorting. More specifically, the sorter 243 (FIG. 7) of the luminance-range calculator 221 sets a luminance value stored in the register 252-$k$ to the skirt value $L_{dark}^{(n1)}$. Also, the sorter 244 of the luminance-range calculator 221 sets a luminance value stored in the register 262-$k$ as the skirt value $L_{bright}^{(n1)}$.

For example, if the number of pixels sampled per frame by the decimator 241 is 1,206 and the number of the registers 252 in the sorter 243 is 6 (k=6), when all the pixels in one frame have been processed, of the pixels sampled, the smallest to sixth smallest (strictly speaking, not necessarily the sixth smallest since pixels having luminance values $L^{(n1)}(p)$ less than noiseLevel$^{(n1)}$ have been removed) luminance values $L^{(n1)}(p)$ are stored in the registers 252-1 to 252-6. Thus, it is estimated that the ratio of the number of luminance values $L^{(n1)}(p)$ stored in the registers 252-1 to 252-6, i.e., the number of pixels having luminance values less than or equal to the skirt value $L_{dark}^{(n1)}$, to the number of pixels in the entire frame is approximately 0.5% (=6/1,200). Similarly, it is estimated that the ratio of the number of luminance values $L^{(n1)}(p)$ stored in the registers 262-1 to 262-6, i.e., the number of pixels having luminance values greater than or equal to the skirt value $L_{bright}^{(n1)}$, to the number of pixels in the entire frame is approximately 0.5% (=6/1,200).

The ratio of the number of pixels used for setting the skirt value $L_{dark}^{(n1)}$ or the skirt value $L_{bright}^{(n1)}$ may be values other than 0.5% in the example described above. Also, the number of registers in the sorter 243 or 244 is set in accordance with the number of pixels sampled and the ratio of the number of pixels used for setting the skirt value $L_{dark}^{(n1)}$ or the skirt value $L_{bright}^{(n1)}$.

The sorter 243 outputs the skirt value $L_{dark}^{(n1)}$ to the temporal smoother 223-1, and the sorter 244 outputs the skirt value $L_{bright}^{(n1)}$ to the temporal smoother 223-2.

In step S132, the average-level calculator 222 (FIG. 6) of the tone-curve calculator 163 calculates an average level from a total luminance value. More specifically, in the average-level calculator 222, the divider 294 (FIG. 8) of the average calculator 282 reads a total luminance value stored in the register 292 and the counter value (representing the number of pixels) of the counter 293. The divider 294 divides the total luminance value by the counter value of the counter 293, thereby calculating ah average level $L_{average}^{(n1)}$ of luminance values $L^{(n1)}(p)$ the divider 294 outputs the average level $L_{average}^{(n1)}$ to the temporal smoother 223-3.

In step S133, the temporal smoothing unit 223 temporally smoothes the skirt values and average level. More specifically, the multiplier 311 (FIG. 9) of the temporal smoother 223-1 multiplies the skirt value $L_{dark}^{(n1)}$ by the predetermined smoothing coefficient sc1, and outputs the result to the adder 313. The multiplier 312 of the temporal smoother 223-1 reads from the register 314 the temporally smoothed skirt value $L_{dark-ts-pre}^{(n1)}$ of the immediately preceding frame. The multiplier 312 multiplies the skirt value $L_{dark-ts-pre}^{(n1)}$ by the predetermined smoothing coefficient sc2, and outputs the result to the adder 313. The adder 313 adds together the value output from the multiplier 311 and the value output from the multiplier 312, thereby calculating a temporally smoothed skirt value $L_{dark-ts}^{(n1)}$. That is, the skirt value $L_{dark-ts}^{(n1)}$ can be expressed by equation (17) below:

$$L_{dark-ts}^{(n1)} = sc1 \cdot L_{dark}^{(n1)} + sc2 \cdot L_{dark-ts-pre}^{(n1)} \qquad (17)$$

That is, smoothing is executed between the skirt value $L_{dark}^{(n1)}$ of the current frame and the skirt value $L_{dark-ts-pre}^{(n1)}$ of the immediately preceding frame according to the smoothing coefficients sc1 and sc2.

The adder 313 outputs the skirt value $L_{dark-ts}^{(n1)}$ to the spline generator 224, and stores the skirt value $L_{dark-ts}^{(n1)}$ in the register 314.

Similarly, the temporal smoother 223-2 calculates a temporally smoothed skirt value $L_{bright-ts}^{(n1)}$ according to equation (18) below, and outputs the skirt value $L_{bright-ts}^{(n1)}$ to the spline generator 224 and stores the skirt value $L_{bright-ts}^{(n1)}$ in the register 314.

$$L_{bright-ts}^{(n1)} = sc1 \cdot L_{bright}^{(n1)} + sc2 \cdot L_{bright-ts-pre}^{(n1)} \qquad (18)$$

where $L_{bright-ts-pre}^{(n1)}$ denotes a temporally smoothed skirt value of the immediately preceding frame.

Similarly, the temporal smoother 223-3 calculates a temporally smoothed average level $L_{average-ts}^{(n1)}$ according to equation (19) below, and outputs the average level $L_{average-ts}^{(n1)}$ to the spline generator 224 and stores the average level $L_{average-ts}^{(n1)}$ in the register 314.

$$L_{average-ts}^{(n1)} = sc1 \cdot L_{average}^{(n1)} + sc2 \cdot L_{average-ts-pre}^{(n1)} \qquad (19)$$

where $L_{average-ts-pre}^{(n1)}$ denotes a temporally smoothed average level of the immediately preceding frame.

Thus, rapid change or fluctuation of the skirt values and average value between frames is prevented.

Figure 25:
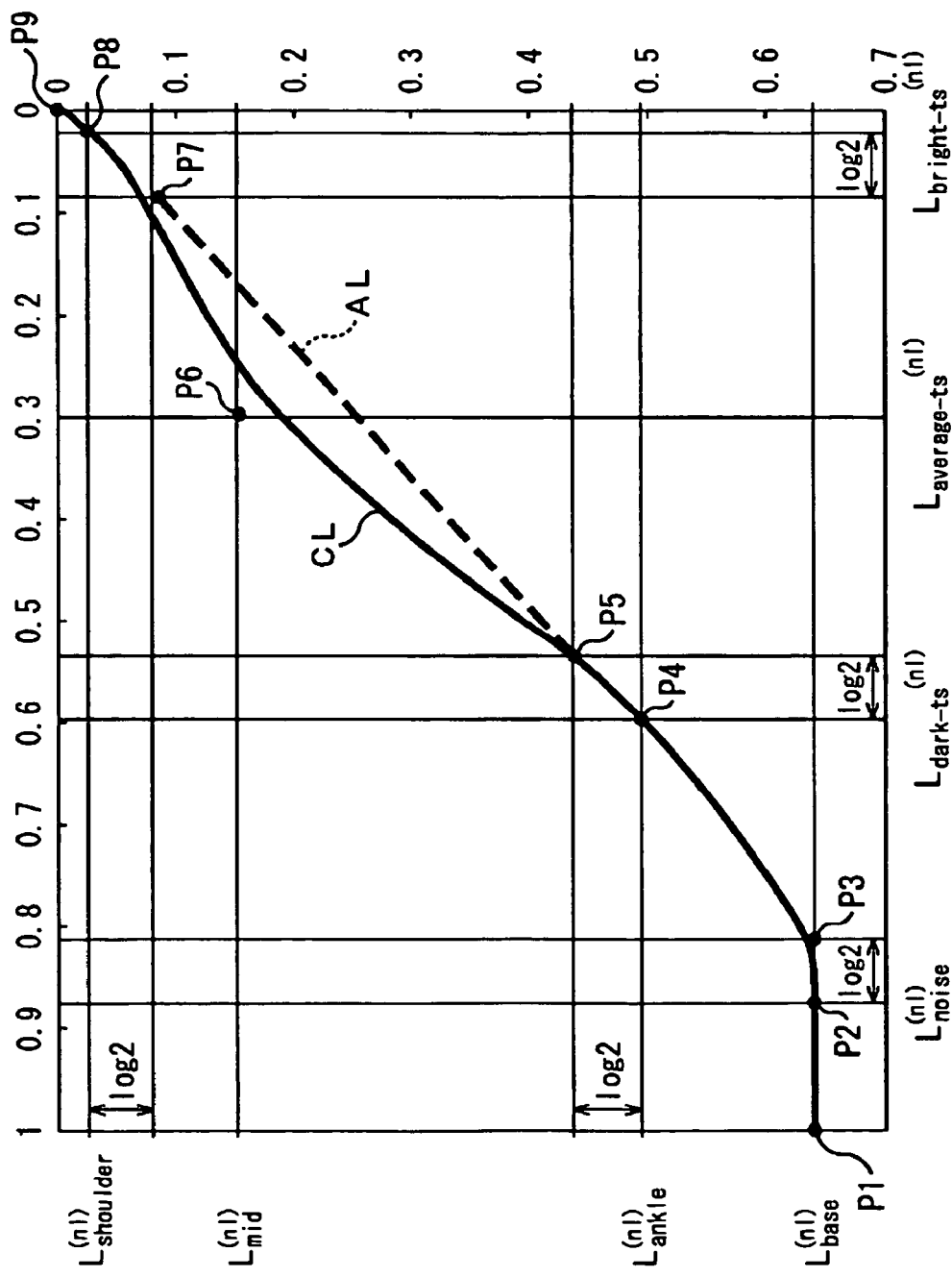
FIG. 25 is a graph showing an example of a tone curve.

In step S315, the spline generator 224 generates a tone curve. Now, a method of generating a tone curve will be described with reference to FIG. 25. FIG. 25 shows an example of a tone curve generated by the spline generator 224. In the graph shown in FIG. 25, the horizontal axis represents logarithmic value of input luminance before tone correction, and the vertical axis represents logarithmic value of output luminance after tone correction according to a tone curve CL.

The control-point setter 331 (FIG. 10) of the spline generator 224 sets nine control points P1 to P9. The control point P1 is set at a point where the input luminance is a predetermined minimum level and the output luminance is a predetermined minimum level $L_{base}^{(n1)}$. The control point P2 is set at a point where the input luminance is a predetermined noise level $L_{noise}^{(n1)}$ corresponding to a luminance value that can be considered as a noise level and the output luminance is the minimum level $L_{base}^{(n1)}$. The control point P3 is set at a point where the input luminance is a luminance value that is double the noise level $L_{noise}^{(n1)}$ and the output luminance is the minimum level $L_{base}^{(n1)}$.

The control point P4 is set at a point where the input luminance is the dark-side skirt value $L_{dark-ts}^{(n1)}$ and the output luminance is a luminance value $L_{ankle}^{(n1)}$ substantially corresponding to the black level. The control point P5 is set at a point where the input luminance is double the skirt value $L_{dark-ts}^{(n1)}$ and the output luminance is double a luminance value $L_{ankle}^{(n1)}$. The control point P6 is set at a point where the input luminance is the average level $L_{average-ts}^{(n1)}$ of input luminance values and the output luminance is a predetermined intermediate luminance level $L_{mid}^{(n1)}$ that is substantially in the middle of the luminance range of output luminance values. The control point P7 is set at a point where the input luminance is half the bright-side skirt value $L_{bright-ts}^{(n1)}$ and the output luminance is half a luminance value $L_{shoulder}^{(n1)}$ substantially corresponding to the white level. The control point P8 is set at a point where the input luminance is the skirt value $L_{bright-ts}^{(n1)}$ and the output luminance is the luminance value $L_{shoulder}^{(n1)}$. The control point P9 is set at a point where the input luminance is a predetermined maximum value of input luminance and the output luminance is a predetermined maximum value of output luminance.

The control-point setter 331 supplies a control point set representing the positions of the control points P1 to P9 to the curve drawer 332 and the γ calculator 333. The curve drawer 332 calculates coordinates on a third-order spline curve interpolating points between the control points P1 to P9, thereby generating a lookup table representing a tone curve CL.

By setting the control point P3 as an auxiliary point, it is ensured that the tone curve CL passes through the control point P2 or the proximity thereof. That is, when the input luminance is substantially the noise level $L_{noise}^{(n1)}$, the input luminance is mapped through tone conversion to a value substantially equal to the minimum level $L_{base}^{(n1)}$ of output luminance. Also, by setting the control point P5 as an auxiliary point, the slope of the tone curve CL in the proximity of the control point P4, where the input luminance is the skirt value $L_{dark-ts}^{(n1)}$ and the output luminance is the luminance value $L_{ankle}^{(n1)}$ substantially corresponding to the black level, is prevented from becoming extremely steep or flat. Also, by setting the control point P7 as an auxiliary point, the slope of the tone curve CL in the proximity of the control point P8, where the input luminance is the skirt value $L_{dark-ts}^{(n1)}$ and the output luminance is the luminance value $L_{shoulder}^{(n1)}$ substantially corresponding to the white level, is prevented from becoming extremely steep or flat.

Thus, the tone curve CL is an inverse-S-shaped, monotonically increasing curved line with the slope thereof becoming rather flat in the proximity of the control point P6 and substantially 1 in the proximity of the control point P4 and in the proximity of the control point P8. That is, the tone compression rate is relatively high in the proximity of the intermediate luminance level $L_{mid}^{(n1)}$ of output luminance, and the tone compression rate decreases as the output luminance becomes higher or lower. This is because when tone compression is executed according to the tone curve CL and then contrast is corrected, as described earlier, contrast is enhanced more strongly for luminance values in the proximity of the intermediate luminance level $L_{mid}^{(n1)}$ so that a contrast global to that in the original image before tone compression can be achieved, while contrast is not substantially corrected for luminance values in the proximity of the minimum value $L_{min}^{(n1)}$ or the maximum value $L_{max}^{(n1)}$ in order to prevent clipping of luminance values.

Thus, by combining tone compression according to the tone curve CL and contrast correction in step S30, it is possible to execute tone compression on an image while substantially maintaining details of the image and substantially preventing black clipping and white clipping.

Furthermore, since a tone curve CL is generated for each image on the basis of the skirt value $L_{dark-ts}^{(n1)}$, skirt value $L_{bright-ts}^{(n1)}$, and average level $L_{average-ts}^{(n1)}$ calculated from input image data, it is possible to execute tone compression suitably in accordance with the distribution of pixel values (luminance values) of input image data.

In step S135, the γ calculator 333 calculates a γ_comp parameter on the basis of the shape of the tone curve CL. More specifically, in order to obtain a global value of the slope of the tone curve CL in the proximity of the control point P6, the γ calculator 333 calculates the slope of a line segment AL connecting the control points P5 and P7, and sets the slope as the γ_comp parameter.

In step S136, the tone-curve calculator 163 stores the tone curve and the γ_comp parameter in memories. The tone-curve and γ_comp calculating process is then exited. More specifically, the curve drawer 332 stores a lookup table representing the tone curve in the tone-curve memory 164. Also, the γ_calculator 333 stores the γ_comp parameter in the γ_comp parameter memory 165.

Next, the reduced-image generating process executed in step S37 shown in FIG. 17 will be described with reference to a flowchart shown in FIG. 26.

In step S151, the reduced-image generator 181 calculates an average luminance value of pixels in a block. More specifically, the average calculator 352-1 (FIG. 11) of the reduced-image generator 181 calculates an average luminance value of the first block, for example, by dividing the total luminance value of pixels in the first block by the number of pixels in the block.

In step S152, the reduced-image generator 181 stores the block average luminance value at the position of a corresponding pixel on the reduced-image memory 182. More specifically, for example, the average calculator 352-1 stores the average luminance value of the first block at the position of a corresponding pixel (e.g., the top left pixel) on the reduced-image memory 182.

In step S153, the reduced-image generator 181 checks whether all the blocks have been processed. When it is determined that all the blocks have not been processed, the process returns to step S151, and the processing in steps S151 to S153 is repeated until it is determined in step S153 that all the blocks have been processed. That is, an average luminance value is calculated similarly for each of the second and subsequent blocks, and the average luminance values is stored at the position of a corresponding pixel on the reduced-image memory 182.

When it is determined in step S153 that all the blocks have been processed, the reduced-image generating process is exited.

Thus, an image composed of luminance values $L^{(n1)}(p)$ is divided into $w_r$ (horizontally)×$h_r$ (vertically) blocks, and average values of the luminance values $L^{(n1)}(p)$ in the individual blocks are arranged correspondingly to the order of the blocks, whereby a reduced image composed of $w_r$ (horizontally)×$h_r$ (vertically) pixels is generated.

As described above, it is possible to execute tone compression of an image while substantially maintaining details of the image and substantially preventing black clipping and white clipping. Also, tone compression can be executed suitably in accordance with the distribution of pixel values (luminance values) of input image data.

Furthermore, by executing tone conversion using a reduced image, tone curve, and γ_comp parameter generated and calculated in processing of an immediately preceding frame, compared with a case where tone conversion is executed using a reduced image, tone curve, and γ_comp parameter generated and calculated within the same frame, a delay does not substantially occur in the processing for generating a reduced image and calculating a tone curve and γ_comp parameter. Thus, processing time can be reduced. Furthermore, it is not needed to store, for example, an image of one frame in order to wait for completion of generation of a reduced image or calculation of a tone curve and γ_comp parameter. This serves to reduce the amount of memory used.

The reduced image, tone curve, and γ_comp parameter are information that does not depend on details of an image, so that temporal deviation associated with use of information of an immediately preceding frame does not raise a substantial problem. For example, in the case of information including high-frequency components, such as edge information of an object, deviation in the position of the object could occur between frames in a moving picture, so that processing is executed in order to compensate for the positional deviation. In contrast, such a problem does not arise in the case of a reduced image, tone curve, or γ_comp parameter.

Furthermore, even when tone conversion is executed using a reduced image, tone curve, and γ_comp parameter generated within the same frame, generation of a reduced image and calculation of a tone curve and γ_comp parameter can be executed in parallel, so that processing time can be reduced.

Next, another embodiment of the present invention, which is different from the embodiment described above, will be described.

Figure 27:
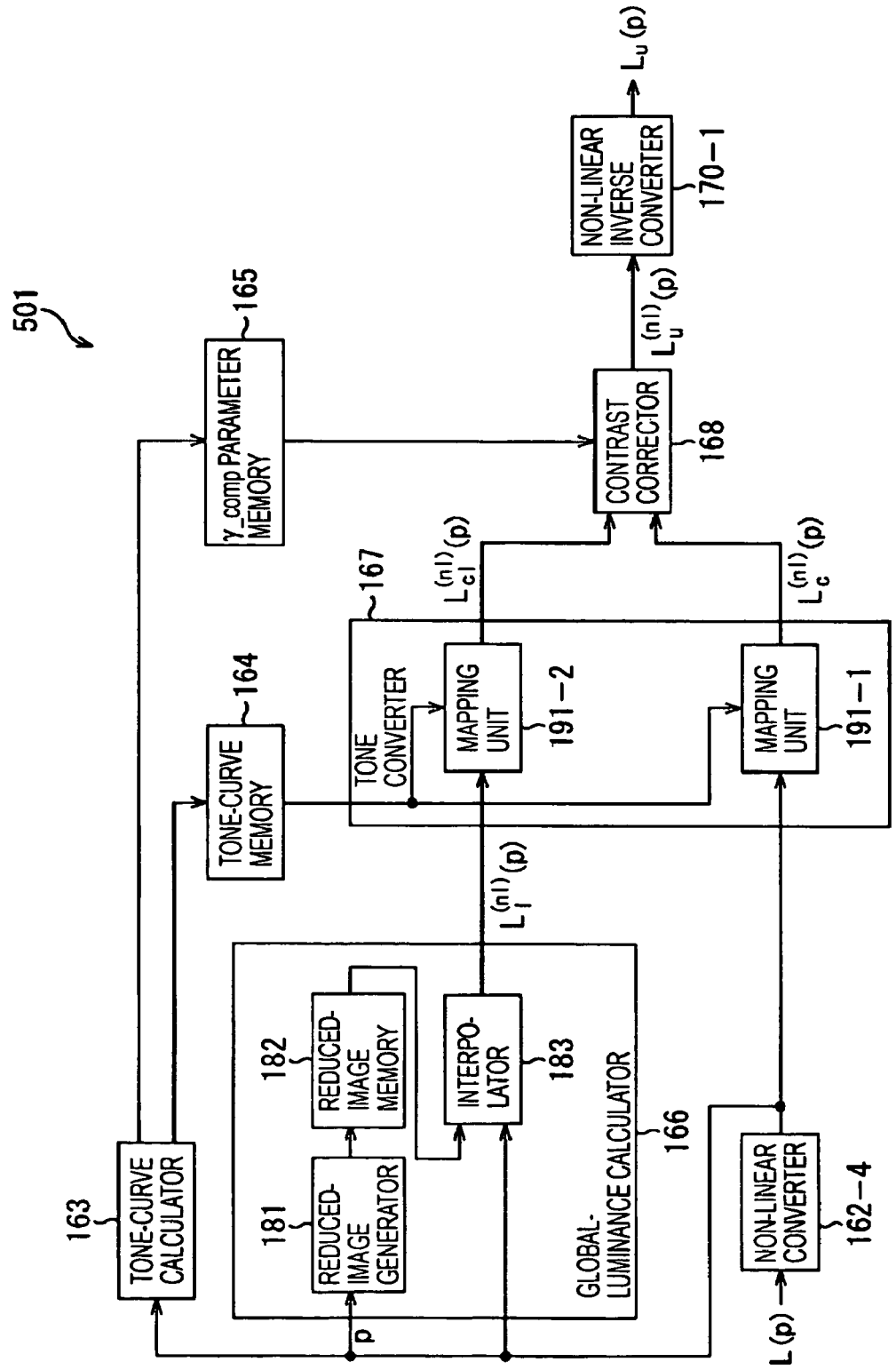
FIG. 27 is a block diagram of a tone converter in another embodiment of the present invention.

FIG. 27 is a block diagram showing an example of the functional configuration of a tone converter in a case where a black and white image is processed. A tone converter 501 includes the non-linear converter 162-4, the tone-curve calculator 163, the tone-curve memory 164, the γ_comp parameter memory 165, the global-luminance calculator 166, the tone converter 167, the contrast corrector 168, and the non-linear inverse converter 170-1 similarly to the tone converter 143 shown in FIG. 4, but differs in that the luminance calculator 161, the non-linear converters 162-1 to 162-3, the tone correctors 169-1 to 169-3, and the non-linear inverse converters 170-2 and 170-3 are not included.

That is, since color components (RGB components) of individual pixels need not be processed, the tone converter 501 has a configuration corresponding to the part of the tone converter 143 for processing luminance components. The non-linear inverse converter 170-1 of the tone converter 501 outputs a luminance value $L_u(p)$ obtained by non-linear inverse conversion of a contrast-corrected luminance value $L_u^{(n1)}(p)$ as an output of the tone converter 501, as opposed to the non-linear inverse converter 170-1 of the tone converter 143.

By replacing the processing for non-linear conversion by the non-linear converters 162-1 to 162-4 shown in FIG. 4 by gamma correction that is often used in camera signal processing, it is possible to simplify the configuration of the tone converter.

Figure 28:
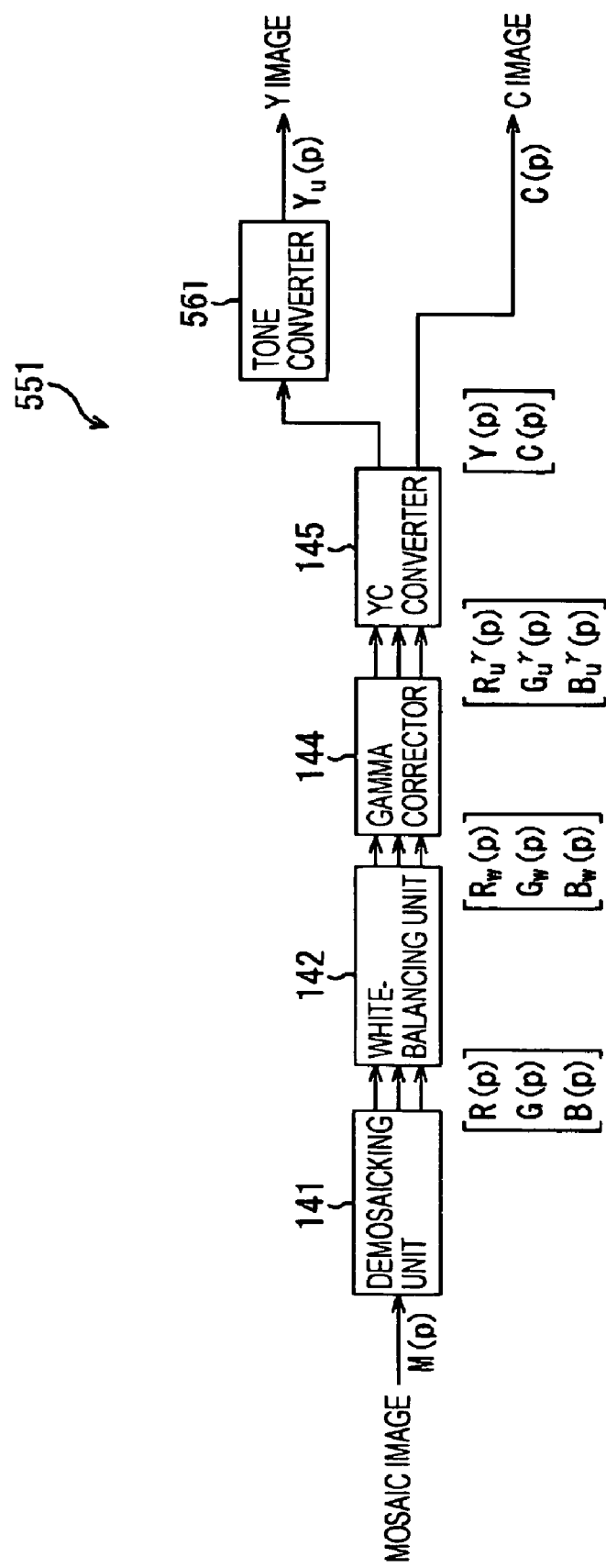
FIG. 28 is a block diagram of a DSP block in another embodiment of the present invention.

FIG. 28 is a diagram showing an example of the functional configuration of a DSP block in a case where non-linear conversion is replaced by gamma correction. A DSP 551 includes the demosaicking unit 141, the white-balancing unit 142, the gamma corrector 144, and the YC converter 145 similarly to the DSP 116 shown in FIG. 3, but differs in that a tone converter 561 is included instead of the tone converter 143.

Furthermore, in the DSP 551, as opposed to the DSP 116, the gamma corrector 144 executes gamma correction on pixel values $[R_w(p), G_w(p),$ and $B_w(p)]$ with the white balance thereof having been corrected by the white-balancing unit 142, and outputs the gamma corrected pixel values $[R_u^\gamma(p), G_u^\gamma(p),$ and $B_u^\gamma(p)]$ to the YC converter 145. Then, the YC converter 145 executes YC conversion, and outputs luminance values $Y(p)$ of a resulting Y image to the tone converter 561 and outputs chrominance values $C(p)$ of a resulting C image to the outside. Furthermore, the tone converter 561 executes tone conversion on the luminance values $Y(p)$ gamma-corrected by the gamma corrector 144, and outputs the results to the outside.

Figure 29:
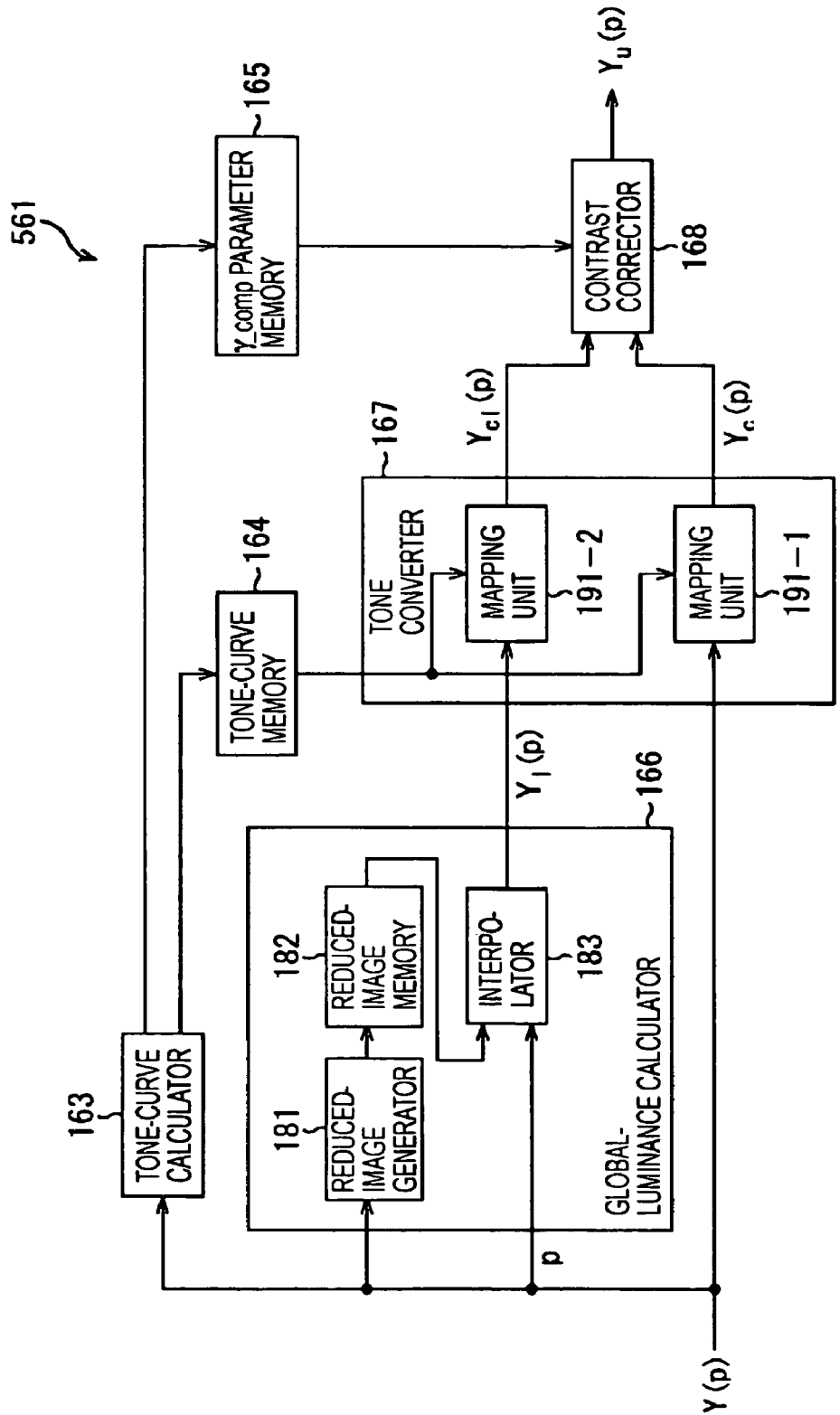
FIG. 29 is a block diagram showing an example of the functional configuration of the tone converter shown in FIG. 28.

FIG. 29 is a block diagram showing an example of the functional configuration of the tone converter 561 shown in FIG. 28. The tone converter 561 includes the tone-curve calculator 163, the tone-curve memory 164, the γ_comp parameter memory 165, the global-luminance calculator 166, the tone converter 167, and the contrast corrector 168 similarly to the tone converter 501 shown in FIG. 27, but differs in that the non-linear converter 162-4 and the non-linear inverse converter 170-1 are not included. That is, since the luminance values $Y(p)$ input to the tone converter 561 have already been gamma-corrected, i.e., non-linearly converted, by the gamma corrector 144, arrangement for non-linear conversion and non-linear inverse conversion can be omitted from the tone converter 561.

As described above, when a conversion curve that is used for tone-compressing luminance values is calculated on the basis of a distribution of input luminance values representing luminance values of an input image, global luminance values representing luminance values of a global-luminance image composed of low-frequency components of the input image are calculated, the input luminance values and the global luminance values are tone-compressed according to the conversion curve, and contrast of a tone-compressed input image composed of the tone-compressed input luminance values is corrected on the basis of a slope of the conversion curve and the tone-compressed global luminance values, it is possible to execute tone-compression of luminance values or color values of an image. Furthermore, it is possible to execute tone compression of luminance values or color values more quickly without degrading contrast, suitably in accordance with individual images.

Also, when input luminance values representing luminance values of individual pixels of an input image are calculated on the basis of color values representing values of color components of the input image, a conversion curve that is used for tone-compressing luminance values is calculated on the basis of a distribution of the input luminance values, global luminance values representing luminance values of a global-luminance image composed of low-frequency components of a luminance image composed of the input luminance values are calculated, the input luminance values and the global luminance values are tone-compressed according to the conversion curve, contrast of a tone-compressed luminance image composed of the tone-compressed input luminance values is compressed on the basis of a slope of the conversion curve and the tone-compressed global luminance values, and the color values of the input image are tone-converted by multiplying individual pixel values of a differential image by a predetermined coefficient, the differential image representing a difference between the input image and the luminance image, and adding the contrast-corrected tone-compressed luminance image, it is possible to execute tone-compression of luminance values or color values of an image. Furthermore, it is possible to execute tone compression of luminance values or color values more quickly without degrading contrast, suitably in accordance with individual images.

The orders of processes described above with reference to flowcharts are only examples, and the orders of processes may be changed or a plurality of processes may be executed concurrently without departing from the spirit of the present invention. For example, it is possible to execute non-linear conversion of RGB components of an input image and the calculate luminance values. Also, it is possible to generate a reduced image before executing non-linear conversion. Furthermore, it is possible to calculate skirt values and an average level of a histogram of luminance values from a histogram of luminance values before executing non-linear conversion.

Furthermore, arrangements for executing similar processing may be integrated or shared. For example, it is possible to form the mapping units 191-1 and 191-2, the mapping unit 201 of the non-linear converter 162, and the inverse mapping unit 411 of the non-linear inverse converter 170 using a common circuit.

Furthermore, although an average luminance value of the entire image is used as an average luminance level used for generating a tone curve in the embodiments described above, alternatively, for example, an average luminance value of a reduced image may be used. In this case, time taken for calculating an average level is reduced. Also, for example, it is possible to measure the brightness of the entirety or a part of an image using an auto exposure (AE) control mechanism, which is often included in control systems of cameras, or to measure the brightness of an object region recognized by the AE control mechanism as a main object, and to use a luminance value based on the measured brightness as an average level. Furthermore, it is possible to allow a user to specify a desired region in an image so that an average level can be calculated with an emphasis on the specified region. This allows calculating a tone curve more global to a tone curve desired by the user.

The present invention can be applied to devices that execute tone compression on luminance values or color values (pixel values) of images (e.g., image playback apparatuses, image recording apparatuses, or image display apparatuses) as well as digital video cameras described above.

The series of processes described above can be executed by hardware or by software. When the series of processes are executed by software, programs constituting the software are installed via a network or a recording medium onto a computer embedded in special hardware or onto a general-purpose computer or the like that is capable of executing various functions with various programs installed thereon.

FIG. 30 is a diagram showing an example of the internal configuration of a general-purpose personal computer 900. A central processing unit (CPU) 901 executes various processes according to programs stored in a read-only memory (ROM) 902 programs loaded from a recording unit 908 to a random access memory (RAM) 903. The RAM 903 also stores data or the like used for execution of various processes by the CPU 901 or data as needed.

The CPU 901, the ROM 902, and the RAM 903 are connected to each other via a bus 904. The bus 904 is also connected to an input/output interface 905.

The input/output interface 905 is connected to an input unit 906 including, for example, buttons, switches, a keyboard, and a mouse, an output unit 906 including a display such as a liquid crystal display (LCD) or a cathode ray tube (CRT) display and including a speaker, a recording unit 908 such as a hard disc, and a communication unit 909 such as a modem or a terminal adaptor. The communication unit 909 carries out communications via networks including the Internet.

The input/output interface 905 is also connected to a drive 910 as needed. A removable medium 911, such as a magnetic disc, an optical disc, a magneto-optical disc, or a semiconductor memory, is mounted on the drive 910 as needed, and computer programs read therefrom are installed on the recording unit 908.

As shown in FIG. 30, the recording medium for installing programs on a computer so that the programs can be executed by the computer may be, for example, the removable medium 911 having recorded the programs thereon and distributed separately from the main unit of the computer to provided the programs to a user, such as a magnetic disc (e.g., a flexible disc), an optical disc (e.g., a compact disc read-only memory (CD-ROM) or a digital versatile disc (DVD)), a magneto-optical (MO) disc (e.g., a Mini Disc® (MD)), or a semiconductor memory. Alternatively, the recording medium may be the ROM 902 or a hard disc included in the recording unit 908 having recorded the programs thereon, provided to a user as included in the main unit of the computer.

Steps defining the programs stored in the program recording medium need not necessarily be executed sequentially in the orders described herein, and may include steps executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus that tone-compresses input luminance values representing luminance values of an input image, the image processing apparatus comprising:
    conversion-curve calculating means for calculating a conversion curve that is used for tone-compressing luminance values, on the basis of a distribution of the input luminance values;
    global-luminance calculating means for calculating global luminance values representing luminance values of a global-luminance image composed of low-frequency components of the input image;
    tone compressing means for tone-compressing the input luminance values and the global luminance values according to the conversion curve; and
    contrast correcting means for correcting contrast of a tone-compressed input image composed of the tone-compressed input luminance values, on the basis of a slope of the conversion curve and the tone-compressed global luminance values.

2. The image processing apparatus according to claim 1,
    wherein the conversion-curve calculating means calculates the conversion curve on the basis of an average luminance value representing an average of the input luminance values, a first boundary value with which the ratio of the number of pixels having luminance values less than or equal to the first boundary value to the number of pixels in the input image is substantially a first predetermined value, and a second boundary value with which the ratio of the number of pixels having luminance values greater than or equal to the second boundary value to the number of pixels in the input image is substantially a second predetermined value.

3. The image processing apparatus according to claim 2, wherein the conversion-curve calculating means calculates the conversion curve so that the conversion curve monotonically increases and so that the slope of the conversion curve becomes smaller in the proximity of a point where the luminance value before tone compression becomes the average luminance value and becomes substantially in the proximities of points where the luminance value before tone compression becomes the first boundary value or the second boundary value.

4. The image processing apparatus according to claim 2, wherein the average luminance value is an average luminance value of luminance values in a user-specified region in the input image.

5. The image processing apparatus according to claim 2, further comprising:
temporal smoothing means for temporally smoothing the average luminance value, the first boundary value, and the second boundary value between a current frame and a frame preceding the current frame by one or more intervals,
wherein the conversion-curve calculating means calculates the conversion curve on the basis of the temporally smoothed average value, the temporally smoothed first boundary value, and the temporally smoothed second boundary value.

6. The image processing apparatus according to claim 1, wherein the global-luminance calculating means includes
reduced-image generating means for generating a reduced image by reducing the input image; and
interpolating means for calculating the global luminance values by interpolating the reduced image so that the global-luminance image has the same number of pixels as the input image.

7. The image processing apparatus according to claim 6, wherein the reduced image generating means generates the reduced image by dividing the input image into a predetermined number of blocks and arranging block average luminance values correspondingly to an order of the blocks, the block average luminance values representing averages of luminance values of pixels included in the individual blocks.

8. The image processing apparatus according to claim 6, wherein the interpolating means calculates the global luminance values by interpolating a reduced image corresponding to an input image of an immediately preceding frame.

9. The image processing apparatus according to claim 1, wherein the tone compressing means tone-compresses the input luminance values and the global luminance values according to a conversion curve that is based on a distribution of input luminance values of an input image of an immediately preceding frame.

10. The image processing apparatus according to claim 1, wherein the contrast correcting means corrects the contrast of the tone-compressed input image on the basis of the slope of the conversion curve in the proximity of a point where the luminance value before tone compression becomes an average luminance value.

11. The image processing apparatus according to claim 1, wherein the contrast correcting means corrects the contrast of the tone-compressed input image so that contrast of luminance values in the proximity of a predetermined intermediate level of the tone-compressed input image is enhanced compared with contrast of luminance values in the proximity of a minimum value or a maximum value of possible luminance values of the tone-compressed input image.

12. The image processing apparatus according to claim 1, wherein the contrast correcting means enhances contrast of frequency components of the tone-compressed input image except frequency components included in the tone-compressed global-luminance image.

13. The image processing apparatus according to claim 1, further comprising:
non-linear converting means for logarithm-converting or gamma-converting the input luminance values,
wherein the conversion-curve calculating means calculates the conversion curve on the basis of a distribution of the logarithm-converted or gamma-converted input luminance values,
wherein the global-luminance calculator calculates the global luminance values representing luminance values of the global-luminance image composed of low-frequency components of the input image composed of the logarithm-converted or gamma-converted input luminance values,
wherein the tone-compressing means tone-compresses the logarithm-converted or gamma-converted input luminance values, and
wherein the contrast correcting means corrects the contrast of the tone-compressed input image composed of the input luminance values that have been logarithm-converted or gamma-converted and that have been tone-compressed.

14. An image processing method for tone-compressing input luminance values representing luminance values of an input image, the image processing method comprising the steps of:
calculating a conversion curve that is used for tone-compressing the luminance values, on the basis of a distribution of the input luminance values;
calculating global luminance values representing luminance values of a global-luminance image composed of low-frequency components of the input image;
tone-compressing the input luminance values and the global luminance values according to the conversion curve; and
correcting contrast of a tone-compressed input image composed of the tone-compressed input luminance values, on the basis of a slope of the conversion curve and the tone-compressed global luminance values.

15. A program tangibly embodied on a computer-readable recording medium for allowing a computer to execute image processing for tone-compressing input luminance values representing luminance values of an input image, the image processing comprising the steps of:
calculating a conversion curve that is used for tone-compressing the luminance values, on the basis of a distribution of the input luminance values;
calculating global luminance values representing luminance values of a global-luminance image composed of low-frequency components of the input image;
tone-compressing the input luminance values and the global luminance values according to the conversion curve; and
correcting contrast of a tone-compressed input image composed of the tone-compressed input luminance values, on the basis of a slope of the conversion curve and the tone-compressed global luminance values.

16. An image processing apparatus that tone-compresses color values representing values of color components of an input image, the image processing apparatus comprising:

input-luminance calculating means for calculating input luminance values representing luminance values of individual pixels of the input image, on the basis of the color values;

conversion-curve calculating means for calculating a conversion curve that is used for tone-compressing luminance values, on the basis of a distribution of the input luminance values;

global-luminance calculating means for calculating global luminance values representing luminance values of a global-luminance image composed of low-frequency components of a luminance image composed of the input luminance values;

tone compressing means for tone-compressing the input luminance values and the global luminance values according to the conversion curve;

contrast correcting means for correcting contrast of a tone-compressed luminance image composed of the tone-compressed input luminance values, on the basis of a slope of the conversion curve and the tone-compressed global luminance values; and tone converting means for tone-converting the color values of the input image by multiplying individual pixel values of a differential image by a predetermined coefficient, the differential image representing a difference between the input image and the luminance image, and adding the contrast-corrected tone-compressed luminance image.

17. The image processing apparatus according to claim 16, further comprising first non-linear converting means for logarithm-converting or gamma-converting the input luminance values; and second non-linear converting means for logarithm-converting or gamma-converting the color values of the input image;

wherein the conversion-curve calculating means calculates the conversion curve on the basis of a distribution of the logarithm-converted or gamma-converted input luminance values, wherein the global-luminance calculator calculates the global luminance values representing luminance values of the global-luminance image composed of low-frequency components of the luminance image composed of the logarithm-converted or gamma-converted input luminance values, wherein the tone-compressing means tone-compresses the logarithm-converted or gamma-converted input luminance values, wherein the contrast correcting means corrects the contrast of the tone-compressed input image composed of the input luminance values that have been logarithm-converted or gamma-converted and that have been tone-compressed, and the tone converting means tone-converts the color values of the input image by multiplying individual pixel values of a differential image by a predetermined coefficient, the differential image representing a difference between the input image composed of the logarithm-converted or gamma-converted color values and the luminance image composed of the logarithm-converted or gamma converted input luminance values, and adding the contrast-corrected tone-compressed luminance image.

18. An image processing method for tone-compressing color values representing values of color components of an input image, the image processing method comprising the steps of:

calculating input luminance values representing luminance values of individual pixels of the input image, on the basis of the color values;

calculating a conversion curve that is used for tone-compressing luminance values, on the basis of a distribution of the input luminance values;

calculating global luminance values representing luminance values of a global-luminance image composed of low-frequency components of a luminance image composed of the input luminance values;

tone-compressing the input luminance values and the global luminance values according to the conversion curve;

correcting contrast of a tone-compressed luminance image composed of the tone-compressed input luminance values, on the basis of a slope of the conversion curve and the tone-compressed global luminance values; and tone-converting the color values of the input image by multiplying individual pixel values of a differential image by a predetermined coefficient, the differential image representing a difference between the input image and the luminance image, and adding the contrast-corrected tone-compressed luminance image.

19. A program tangibly embodied on a computer-readable recording medium that allows a computer to execute image processing for tone-compressing color values representing values of color components of an input image, the image processing comprising the steps of:

calculating input luminance values representing luminance values of individual pixels of the input image, on the basis of the color values;

calculating a conversion curve that is used for tone-compressing luminance values, on the basis of a distribution of the input luminance values;

calculating global luminance values representing luminance values of a global-luminance image composed of low-frequency components of a luminance image composed of the input luminance values;

tone-compressing the input luminance values and the global luminance values according to the conversion curve;

correcting contrast of a tone-compressed luminance image composed of the tone-compressed input luminance values, on the basis of a slope of the conversion curve and the tone-compressed global luminance values; and tone-converting the color values of the input image by multiplying individual pixel values of a differential image by a predetermined coefficient, the differential image representing a difference between the input image and the luminance image, and adding the contrast-corrected tone-compressed luminance image.

20. An image processing apparatus that tone-compresses input luminance values representing luminance values of an input image, the image processing apparatus comprising:

a conversion-curve calculator configured to calculate a conversion curve that is used for tone-compressing luminance values, on the basis of a distribution of the input luminance values;

a global-luminance calculator configured to calculate global luminance values representing luminance values of a global-luminance image composed of low-frequency components of the input image;

a tone compressor configured to tone-compress the input luminance values and the global luminance values according to the conversion curve; and a contrast corrector configured to correct contrast of a tone-compressed input image composed of the tone-compressed input luminance values, on the basis of a slope of the conversion curve and the tone-compressed global luminance values.

21. An image processing apparatus that tone-compresses color values representing values of color components of an input image, the image processing apparatus comprising:

an input-luminance calculator configured to calculate input luminance values representing luminance values of individual pixels of the input image, on the basis of the color values;

a conversion-curve calculator configured to calculate a conversion curve that is used for tone-compressing luminance values, on the basis of a distribution of the input luminance values;

a global-luminance calculator configured to calculate global-luminance values representing luminance values of a global-luminance image composed of low-frequency components of a luminance image composed of the input luminance values;

a tone compressor configured to tone-compress the input luminance values and the global luminance values according to the conversion curve;

a contrast corrector configured to correct contrast of a tone-compressed luminance image composed of the tone-compressed input luminance values, on the basis of a slope of the conversion curve and the tone-compressed global luminance values; and a tone converter configured to tone-convert the color values of the input image by multiplying individual pixel values of a differential image by a predetermined coefficient, the differential image representing a difference between the input image and the luminance image, and adding the contrast-corrected tone-compressed luminance image.

* * * * *